US011936892B2

(12) United States Patent
Ikai et al.

(10) Patent No.: US 11,936,892 B2
(45) Date of Patent: Mar. 19, 2024

(54) IMAGE DECODING APPARATUS

(71) Applicant: SHARP KABUSHIKI KAISHA, Sakai (JP)

(72) Inventors: Tomohiro Ikai, Sakai (JP); Tomoko Aono, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 17/958,731

(22) Filed: Oct. 3, 2022

(65) Prior Publication Data

US 2023/0021748 A1 Jan. 26, 2023

Related U.S. Application Data

(63) Continuation of application No. 17/472,398, filed on Sep. 10, 2021, now Pat. No. 11,503,319, which is a (Continued)

(30) Foreign Application Priority Data

Oct. 6, 2017 (JP) ................. 2017-196142

(51) Int. Cl.
*H04N 19/44* (2014.01)
*H04N 19/119* (2014.01)
(Continued)

(52) U.S. Cl.
CPC ........... *H04N 19/44* (2014.11); *H04N 19/119* (2014.11); *H04N 19/176* (2014.11);
(Continued)

(58) Field of Classification Search
CPC .... H04N 19/44; H04N 19/119; H04N 19/176; H04N 19/186; H04N 19/46; H04N 19/96; H04N 19/103; H04N 19/159; H04N 19/70

(Continued)

(56) References Cited

U.S. PATENT DOCUMENTS

| 9,762,927 | B2 | 9/2017 | Chen et al. |
| 10,390,050 | B2 | 8/2019 | An et al. |
| 2017/0180737 | A1 | 6/2017 | Ye et al. |
| 2018/0288446 | A1* | 10/2018 | An ......................... H04N 19/70 |

FOREIGN PATENT DOCUMENTS

WO 2017/137311 A1 8/2017

OTHER PUBLICATIONS

"Series H: Audiovisual and Multimedia Systems Infrastructure of audiovisual services—Coding of moving video", ITU-T H.265(Apr. 2015).
(Continued)

*Primary Examiner* — Susan E. Torgerson
(74) *Attorney, Agent, or Firm* — ScienBiziP, P.C.

(57) ABSTRACT

In a case that luminance information is used for a chrominance prediction in a separate coding tree structure, there is a problem that chrominance blocks cannot be decoded before all luminance blocks constituting a tree are decoded. An image decoding apparatus that splits an image into coding tree units (CTUs) that are rectangular for processing includes a CT information decoding unit configured to split a CTU of the CTUs into coding trees CTs and to process one or more color components as a single coding tree using one coding tree CT of the coding trees CTs or process two or more color components as a separate coding tree using two or more coding trees CTs of the coding trees CTs depending on a tree mode, a CU decoding unit configured to decode a split flag indicating whether to further split a CT of the CTs and to recursively perform block splitting, and an intra predictor configured to use a decoded image of one color component to generate a prediction image of another color component. The CU decoding unit does not decode the split flag from coded data but configures 1 in the split flag in a case of an intra slice, the separate coding tree, and a target CT size being larger than a prescribed maximum intra size.

1 Claim, 49 Drawing Sheets

Related U.S. Application Data continuation of application No. 16/753,736, filed as application No. PCT/JP2018/036943 on Oct. 2, 2018, now abandoned.

(51) Int. Cl.
  *H04N 19/176* (2014.01)
  *H04N 19/186* (2014.01)
  *H04N 19/46* (2014.01)
  *H04N 19/96* (2014.01)
(52) U.S. Cl.
  CPC ........... *H04N 19/186* (2014.11); *H04N 19/46* (2014.11); *H04N 19/96* (2014.11)
(58) Field of Classification Search
  USPC ........................................................ 375/240
  See application file for complete search history.

(56) References Cited

OTHER PUBLICATIONS

Jianle Chen et al.:"Algorithm Description of Joint Exploration Test Model 7 (JEM 7)", Joint Video Exploration Team (JVET) of ITU-T SG 16 WP 3 and ISO/IEC JTC 1/SC 29/WG 11, 7th Meeting: Torino, IT, Jul. 13-21, 2017, JVET-G1001-v1.
Non-Final Office Action dated Oct. 27, 2020 for U.S. Appl. No. 16/753,736.
Final Office Action dated Feb. 23, 2021 for U.S. Appl. No. 16/753,736.
Notice of Allowance and Fee(s) Due dated Jun. 17, 2021 for U.S. Appl. No. 16/753,736.
Notice of Allowance dated Jul. 19, 2022 for U.S. Appl. No. 17/472,398 which is the parent application of the instant application.

* cited by examiner

| coding_quadtree( x0, y0, log2CbSize, cqtDepth, comp_mode ) { | Descriptor | |
|---|---|---|
| if( x0 + ( 1 << log2CbSize ) <= pic_width_in_luma_samples && y0 + ( 1 << log2CbSize ) <= pic_height_in_luma_samples && log2CbSize > MinCbLog2SizeY | | ←SYN1420B |
| split_cu_flag[ x0 ][ y0 ] | ae(v) | ←SYN1421 |
| if( cu_qp_delta_enabled_flag && log2CbSize >= Log2MinCuQpDeltaSize ) { | | ←SYN2300 |
| IsCuQpDeltaCoded = 0 | | ←SYN2301 |
| CuQpDeltaVal = 0 | | ←SYN2302 |
| } | | |
| if( split_cu_flag[ x0 ][ y0 ] ) { | | ←SYN1450 |
| x1 = x0 + ( 1 << ( log2CbSize − 1 ) ) | | |
| y1 = y0 + ( 1 << ( log2CbSize − 1 ) ) | | |
| coding_quadtree( x0, y0, log2CbSize − 1, cqtDepth + 1, comp_mode ) | | ←SYN1451A |
| if( x1 < pic_width_in_luma_samples ) | | |
| coding_quadtree( x1, y0, log2CbSize − 1, cqtDepth + 1, comp_mode ) | | ←SYN1451B |
| if( y1 < pic_height_in_luma_samples ) | | |
| coding_quadtree( x0, y1, log2CbSize − 1, cqtDepth + 1, comp_mode ) | | ←SYN1451C |
| if( x1 < pic_width_in_luma_samples && y1 < pic_height_in_luma_samples ) | | |
| coding_quadtree( x1, y1, log2CbSize − 1, cqtDepth + 1, comp_mode ) | | ←SYN1451D |
| } else | | |
| coding_binarytree(x0, y0, log2CbSize, log2CbSize, cqtDepth, 0, comp_mode ) | | ←SYN1460 |
| } | | |

FIG. 9

| | Descriptor | |
|---|---|---|
| coding_binarytree( x0, y0, log2CbWidth, log2CbHeight, cqtDepth, cbtDepth, comp_mode ) { | | |
| if ( ((1 << log2CbWidth) > minBTSize || (1 << log2CbHeight) > minBTSize ) && (1 << log2CbWidth) <= maxBTSize && (1 << log2CbHeight) <= maxBTSize && cbtDepth < maxBTDepth ) | | ←SYN1461 |
| split_bt_mode[ x0 ][ y0 ] | ae(v) | ←SYN1471 |
| if( cu_qp_delta_enabled_flag && log2CbSize >= Log2MinCuQpDeltaSize ) { | | ←SYN2300 |
| IsCuQpDeltaCoded = 0 | | ←SYN2301 |
| CuQpDeltaVal = 0 | | ←SYN2302 |
| } | | |
| if( split_bt_mode[ x0 ][ y0 ] == 1 ) { // !split_bt_flag | | ←SYN1481A |
| x1 = x0 + ( 1<<( log2CbWidth − 1 ) ) | | |
| coding_binarytree( x0, y0, log2CbWidth − 1, log2CbHeight, cqtDepth, cbtDepth + 1, comp_mode ) | | ←SYN1491A |
| if( x1 < pic_width_in_luma_samples ) | | |
| coding_binarytree( x1, y0, log2CbWidth − 1, log2CbHeight, cqtDepth, cbtDepth + 1, comp_mode ) | | ←SYN1491B |
| else if( split_bt_mode[ x0 ][ y0 ] == 2 ) { | | ←SYN1481B |
| y1 = y0 + ( 1<<( log2CbHeight − 1 ) ) | | |
| coding_binarytree( x0, y0, log2CbWidth, log2CbHeight − 1, cqtDepth, cbtDepth + 1, comp_mode ) | | ←SYN1491C |
| if( y1 < pic_height_in_luma_samples ) | | |
| coding_binarytree( x0, y1, log2CbWidth, log2CbHeight − 1, cqtDepth, cbtDepth + 1, comp_mode ) | | ←SYN1491D |
| } | | |
| else | | |
| coding_unit( x0, y0, log2CbWidth, log2CbHeight ) | | ←SYN1500 |
| } | | |

FIG. 11

| | Descriptor | |
|---|---|---|
| coding_unit( x0, y0, log2CbWidth, log2CbHeight ) { | | ←SYN1500 |
|   if( transquant_bypass_enabled_flag ) | | ←SYN1505 |
|     cu_transquant_bypass_flag | ae(v) | |
|   if( slice_type!=I ) | | |
|     cu_skip_flag[ x0 ][ y0 ] | ae(v) | ←SYN1511 |
|   nCbW = ( 1<<log2CbWidth ) | | |
|   nCbH = ( 1<<log2CbHeight ) | | |
|   if( cu_skip_flag[ x0 ][ y0 ] ) | | ←SYN1512 |
|     prediction_unit( x0, y0, nCbW, nCbH ) | | ←SYN1632 |
|   else { | | |
|     if( slice_type!=I ) | | |
|       pred_mode_flag | ae(v) | ←SYN1513 |
|     if( CuPredMode[ x0 ][ y0 ]!=MODE_INTRA \|\| log2CbSize==MinCbLog2SizeY ) | | |
|       part_mode | ae(v) | ←SYN1514 |
|     if( CuPredMode[ x0 ][ y0 ]==MODE_INTRA ) { | | |
|     ... | | |
|     } else { | | |
|       if( PartMode==PART_2Nx2N ) | | |
|         prediction_unit( x0, y0, nCbW, nCbH ) | | ←SYN1631A |
|       else if( PartMode==PART_2NxN ) { | | |
|         prediction_unit( x0, y0, nCbW, nCbH / 2 ) | | ←SYN1631B |
|         prediction_unit( x0, y0 + ( nCbW / 2 ), nCbS, nCbH / 2 ) | | ←SYN1631C |
|       } else if( PartMode==PART_Nx2N ) { | | |
|         prediction_unit( x0, y0, nCbW / 2, nCbH ) | | ←SYN1631D |
|         prediction_unit( x0 + ( nCbW / 2 ), y0, nCbW / 2, nCbH ) | | ←SYN1631E |
|       } else { /* PART_NxN */ | | |
|         prediction_unit( x0, y0, nCbW / 2, nCbH / 2 ) | | ←SYN1631F |
|         prediction_unit( x0 + ( nCbW / 2 ), y0, nCbW / 2, nCbH / 2 ) | | ←SYN1631G |
|         prediction_unit( x0, y0 + ( nCbW / 2 ), nCbW / 2, nCbH / 2 ) | | ←SYN1631H |
|         prediction_unit( x0 + ( nCbW / 2 ), y0 + ( nCbH / 2 ), nCbW / 2, nCbH / 2 ) | | ←SYN1631I |
|       } | | |
|     } | | |
|     rqt_root_cbf | | ←SYN1515 |
|     if( rqt_root_cbf ) { | | ←SYN1516 |
|       transform_tree( x0, y0, x0, y0, log2CbWidth, log2CbHeight, 0, 0 ) | | ←SYN1700 |
|     } | | |
| } | | |

FIG. 15

| | Descriptor |
|---|---|
| prediction_unit( x0, y0, nPbW, nPbH ) { | | ←SYN1600
|   if( cu_skip_flag[ x0 ][ y0 ] ) { | |
|     if( MaxNumMergeCand > 1 ) | |
|       merge_idx[ x0 ][ y0 ] | ae(v) |
|   } else { /* MODE_INTER */ | |
|     merge_flag[ x0 ][ y0 ] | ae(v) |
|     if( merge_flag[ x0 ][ y0 ] ) { | |
|       if( MaxNumMergeCand > 1 ) | |
|         merge_idx[ x0 ][ y0 ] | ae(v) |
|     } else { | |
|       if( slice_type==B ) | |
|         inter_pred_idc[ x0 ][ y0 ] | ae(v) |
|       if( inter_pred_idc[ x0 ][ y0 ] !=PRED_L1 ) { | |
|         if( num_ref_idx_l0_active_minus1 > 0 ) | |
|           ref_idx_l0[ x0 ][ y0 ] | ae(v) |
|         mvd_coding( x0, y0, 0 ) | |
|         mvp_l0_flag[ x0 ][ y0 ] | ae(v) |
|       } | |
|       if( inter_pred_idc[ x0 ][ y0 ] !=PRED_L0 ) { | |
|         if( num_ref_idx_l1_active_minus1 > 0 ) | |
|           ref_idx_l1[ x0 ][ y0 ] | ae(v) |
|         if( mvd_l1_zero_flag && | |
|           inter_pred_idc[ x0 ][ y0 ]==PRED_BI ) { | |
|           MvdL1[ x0 ][ y0 ][ 0 ] = 0 | |
|           MvdL1[ x0 ][ y0 ][ 1 ] = 0 | |
|         } else | |
|           mvd_coding( x0, y0, 1 ) | |
|         mvp_l1_flag[ x0 ][ y0 ] | ae(v) |
|       } | |
|     } | |
|   } | |
| } | |

FIG. 16

| | Descriptor | |
|---|---|---|
| transform_tree( x0, y0, xBase, yBase, log2TrafoWidth, log2TrafoHeight, trafoDepth, blkIdx ) { | Descriptor | ←SYN1700 |
| log2TrafoSize = Max (log2TrafoWidth, log2TrafoHeight) | | |
| if( log2TrafoSize <= MaxTbLog2SizeY && <br> log2TrafoSize > MinTbLog2SizeY && <br> trafoDepth < MaxTrafoDepth && !( IntraSplitFlag && ( trafoDepth = = 0 ))) | | ←SYN1721 |
| split_transform_flag[ x0 ][ y0 ][ trafoDepth ] | ae(v) | ←SYN1731 |
| cbf_cb[ x0 ][ y0 ][ trafoDepth ] | ae(v) | |
| cbf_cr[ x0 ][ y0 ][ trafoDepth ] | ae(v) | |
| } | | |
| if( split_transform_flag[ x0 ][ y0 ][ trafoDepth ] ) { | | |
| x1 = x0 + ( 1 << ( log2TrafoWidth − 1 ) ) | | |
| y1 = y0 + ( 1 << ( log2TrafoHeight − 1 ) ) | | |
| if (trafoDepth == 0) | | ←SYN1754 |
| amt_flag [ x0 ][ y0 ][ trafoDepth ] | ae(v) | ←SYN1755 |
| | | |
| transform_tree( x0, y0, x0, y0, log2TrafoWidth − 1, log2TrafoHeight − 1, trafoDepth + 1, 0 ) | | |
| transform_tree( x1, y0, x0, y0, log2TrafoWidth − 1, log2TrafoHeight − 1, trafoDepth + 1, 1 ) | | ⎫ SYN1756 |
| transform_tree( x0, y1, x0, y0, log2TrafoWidth − 1, log2TrafoHeight − 1, trafoDepth + 1, 2 ) | | |
| transform_tree( x1, y1, x0, y0, log2TrafoWidth − 1, log2TrafoHeight − 1, trafoDepth + 1, 3 ) | | |
| } else { | | |
| if( CuPredMode[ x0 ][ y0 ] = = MODE_INTRA || trafoDepth != 0 || <br> cbf_cb[ x0 ][ y0 ][ trafoDepth ] || cbf_cr[ x0 ][ y0 ][ trafoDepth ] ) | | |
| cbf_luma[ x0 ][ y0 ][ trafoDepth ] | ae(v) | ←SYN1751 |
| if (cbf_luma[ x0 ][ y0 ][ trafoDepth ] && trafoDepth == 0) | | |
| amt_flag [ x0 ][ y0 ][ trafoDepth ] | ae(v) | ←SYN1753 |
| transform_unit( x0, y0, xBase, yBase, log2TrafoWidth, log2TrafoHeight, trafoDepth, blkIdx ) | | ←SYN1760 |
| | | |
| } | | |
| } | | |

FIG. 17

| | Descriptor | |
|---|---|---|
| transform_unit( x0, y0, xBase, yBase, log2TrafoWidth, log2TrafoHeight, trafoDepth, blkIdx ) { | Descriptor | ←SYN1760 |
|   log2TrafoSize = Max (log2TrafoWidth, log2TrafoHeight) | | |
|   log2TrafoWidthC = Max( 2, log2TrafoWidth − ( ChromaArrayType = = 3 ? 0 : 1 ) ) | | |
|   log2TrafoHeightC = Max( 2, log2TrafoHeight − ( ChromaArrayType = = 3 ? 0 : 1 ) ) | | |
|   cbfDepthC = trafoDepth − ( ChromaArrayType != 3 && log2TrafoSize = = 2 ) ? 1 : 0 ) | | |
|   xC = ( ChromaArrayType != 3 && log2TrafoSize = = 2 ) ? xBase : x0 | | |
|   yC = ( ChromaArrayType != 3 && log2TrafoSize = = 2 ) ? yBase : y0 | | |
|   cbfLuma = cbf_luma[ x0 ][ y0 ][ trafoDepth ] | | |
|   cbfChroma = <br>     cbf_cb[ xC ][ yC ][ cbfDepthC ] || <br>     cbf_cr[ xC ][ yC ][ cbfDepthC ] ) | | |
|   if( cbfLuma || cbfChroma ) { | | ←SYN1761 |
|     delta_qp( ) | | |
|     chroma_qp_offset( ) | | |
|     if( cbfLuma ) | | ←SYN1781 |
|       residual_coding( x0, y0, log2TrafoWidth, log2TrafoHeight, 0 ) | | ←SYN1800 |
|     if( blkIdx = = 3 ) { | | |
|       if( cbf_cb[ xBase ][ yBase ][ trafoDepth − 1 ] ) | | |
|   residual_coding( xBase, yBase, log2TrafoWidthC, log2TrafoHeightC, 1 ) | | ←SYN1800 |
|       if( cbf_cr[ xBase ][ yBase ][ trafoDepth − 1 ] ) | | |
|         residual_coding( xBase, yBase + tIdx, log2TrafoWidthC, log2TrafoHeightC, 2 ) | | ←SYN1800 |
|     } | | |
|     if (amt_flag != 0 && numCoeff > coreSIGNUM) | | |
|       amt_idx[ x0 ][ y0 ][ trafoDepth ] | ae(v) | ←SYN1811, SYN1812 |
|   } | | |
| } | | |

FIG. 18

(a) LUMINANCE CODING TREE
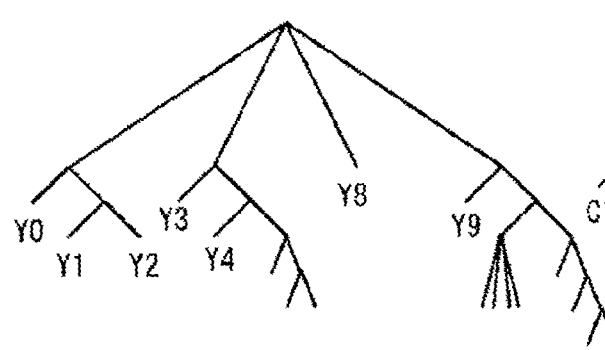
(b) CHROMINANCE CODING TREE
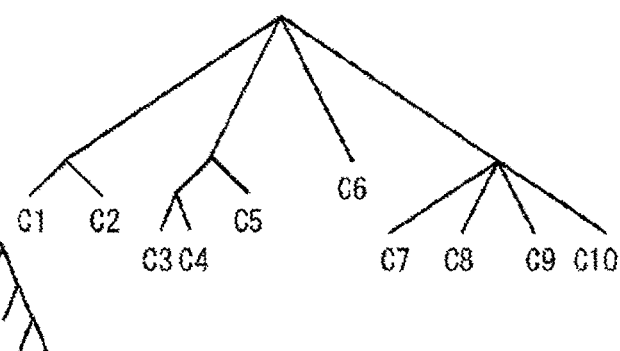
(c) LUMINANCE BLOCK SPLIT
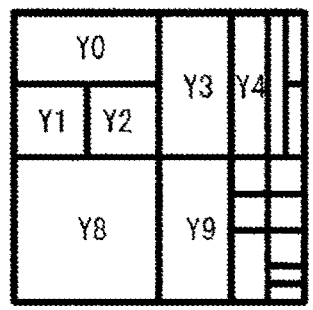
(d) CHROMINANCE BLOCK SPLIT
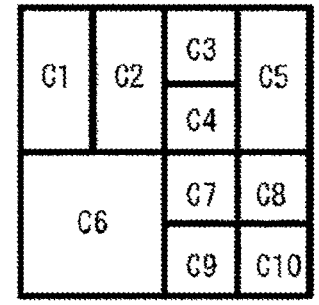
FIG. 22

(a)

| ctu_tree_mode | Name |
|---|---|
| 0 | CTU_SINGLE_TREE / CTU_SHARED_TREE |
| 1 | CTU_SEPARATE_TREES |

(b)

| ctu_tree_mode | Name |
|---|---|
| 0 | CTU_SINGLE_TREE |
| 1 | CTU_SHARED_TREE |
| 2 | CTU_SEPARATE_TREES |

(c)

| ctu_tree_mode | ChromaArrayType | Name |
|---|---|---|
| 0 | 0 | CTU_SINGLE_TREE |
| 0 | 1-3 | CTU_SHARED_TREE |
| 1 | 1-3 | CTU_SEPARATE_TREES |

(d)

| ctu_tree_mode | NumColourComponent | Name |
|---|---|---|
| 0 | 1 | CTU_SINGLE_TREE |
| 0 | >1 | CTU_SHARED_TREE |
| 1 | >1 | CTU_SEPARATE_TREES |

| ChromaArrayType | Name | NumColourComponent |
|---|---|---|
| 0 | 4:0:0 (monochrome or separate) | 1 |
| 1 | 4:2:0 | 3 |
| 2 | 4:2:2 | 3 |
| 3 | 4:4:4 | 3 |

(b)

| ctu_comp | Name | NumColourComponent |
|---|---|---|
| 0 | COMP_0 | 1 |
| 1 | COMP_012 | 3 |
| 2 | COMP_12 | 2 |

| coding_tree_unit( ) { | Descriptor | |
|---|---|---|
| xCtb = ( CtbAddrInRs % PicWidthInCtbsY )<<CtbLog2SizeY | | |
| yCtb = ( CtbAddrInRs / PicWidthInCtbsY )<<CtbLog2SizeY | | |
| if( slice_sao_luma_flag \|\| slice_sao_chroma_flag ) | | |
|   sao( xCtb >> CtbLog2SizeY, yCtb >> CtbLog2SizeY ) | | |
| ctu_comp = (ctu_tree_mode != CTU_SEPARATE) ? COMP_012 : COMP_0 | | ←SYN1310 |
| coding_quadtree( xCtb, yCtb, CtbLog2SizeY, 0, ctu_comp ) | | ←SYN1311 |
| if (ctu_tree_mode == CTU_SEPARATE) | | |
| { | | |
|   ctu_comp = COMP_12 | | ←SYN1320 |
|   coding_quadtree( xCtb, yCtb, CtbLog2SizeY, 0, COMP_12 ) | | ←SYN1321 |
| } | | |
| } | | |

(b)

| coding_tree_unit( ) { | Descriptor | |
|---|---|---|
| xCtb = ( CtbAddrInRs % PicWidthInCtbsY )<<CtbLog2SizeY | | |
| yCtb = ( CtbAddrInRs / PicWidthInCtbsY )<<CtbLog2SizeY | | |
| ctu_tree_mode | ae(v) | ←SYN1301 |
| if( slice_sao_luma_flag \|\| slice_sao_chroma_flag ) | | |
|   sao( xCtb >> CtbLog2SizeY, yCtb >> CtbLog2SizeY ) | | |
| ctu_comp = (ctu_tree_type != CTU_SEPARATE) ? COMP_012 : COMP_0 | | ←SYN1310 |
| coding_quadtree( xCtb, yCtb, CtbLog2SizeY, 0, ctu_comp ) | | ←SYN1311 |
| if (ctu_tree_mode == CTU_SEPARATE) | | |
| { | | |
|   ctu_comp = COMP_12 | | ←SYN1320 |
|   coding_quadtree( xCtb, yCtb, CtbLog2SizeY, 0, COMP_12 ) | | ←SYN1321 |
| } | | |
| } | | |

(c)

| coding_tree_unit( ) { | Descriptor | |
|---|---|---|
| xCtb = ( CtbAddrInRs % PicWidthInCtbsY )<<CtbLog2SizeY | | |
| yCtb = ( CtbAddrInRs / PicWidthInCtbsY )<<CtbLog2SizeY | | |
| if (slice_type == I) | | ←SYN1300A |
|   ctu_tree_mode | ae(v) | ←SYN1301 |
| if( slice_sao_luma_flag \|\| slice_sao_chroma_flag ) | | |
|   sao( xCtb >> CtbLog2SizeY, yCtb >> CtbLog2SizeY ) | | |
| ctu_comp = (ctu_tree_type != CTU_SEPARATE) ? COMP_012 : COMP_0 | | ←SYN1310 |
| coding_quadtree( xCtb, yCtb, CtbLog2SizeY, 0, ctu_comp ) | | ←SYN1311 |
| if (ctu_tree_mode == CTU_SEPARATE) | | |
| { | | |
|   ctu_comp = COMP_12 | | ←SYN1320 |
|   coding_quadtree( xCtb, yCtb, CtbLog2SizeY, 0, COMP_12 ) | | ←SYN1311 |
| } | | |
| } | | |

| coding_quadtree( x0, y0, log2CbSize, cqtDepth, comp_mode ) { | Descriptor | |
|---|---|---|
| if( x0 + ( 1 << log2CbSize ) <= pic_width_in_luma_samples && | | ←SYN1420B |
| y0 + ( 1 << log2CbSize ) <= pic_height_in_luma_samples && | | ←SYN1420A |
| log2CbSize > MinCbLog2SizeY | | |
| && !(slice_type == I && (1<<log2CbSize) > | | |
| maxIntraLumaBlockSize) ) | | |
| split_cu_flag[ x0 ][ y0 ] | ae(v) | ←SYN1421 |
| if( split_cu_flag[ x0 ][ y0 ] ) { | | |
| x1 = x0 + ( 1 << ( log2CbSize − 1 ) ) | | |
| y1 = y0 + ( 1 << ( log2CbSize − 1 ) ) | | |
| coding_quadtree( x0, y0, log2CbSize − 1, cqtDepth + 1, comp_mode ) | | |
| coding_quadtree( x1, y0, log2CbSize − 1, cqtDepth + 1, comp_mode ) | | |
| coding_quadtree( x0, y1, log2CbSize − 1, cqtDepth + 1, comp_mode ) | | |
| coding_quadtree( x1, y1, log2CbSize − 1, cqtDepth + 1, comp_mode ) | | |
| } else | | |
| coding_binarytree(x0, y0, log2CbSize, log2CbSize, cqtDepth, 0, comp_mode ) | | |
| } | | |

(b)

| coding_quadtree( x0, y0, log2CbSize, cqtDepth, comp_mode ) { | Descriptor | |
|---|---|---|
| if( x0 + ( 1 << log2CbSize ) <= pic_width_in_luma_samples && | | ←SYN1420B |
| y0 + ( 1 << log2CbSize ) <= pic_height_in_luma_samples && | | ←SYN1420A2 |
| log2CbSize > MinCbLog2SizeY | | |
| && !(slice_type == I && ctu_tree_mode == CTU_SEPARATE && | | |
| (1<<log2CbSize) > maxIntraLumaBlockSize) ) | | |
| split_cu_flag[ x0 ][ y0 ] | ae(v) | ←SYN1421 |
| if( split_cu_flag[ x0 ][ y0 ] ) { | | |
| x1 = x0 + ( 1 << ( log2CbSize − 1 ) ) | | |
| y1 = y0 + ( 1 << ( log2CbSize − 1 ) ) | | |
| coding_quadtree( x0, y0, log2CbSize − 1, cqtDepth + 1, comp_mode ) | | |
| coding_quadtree( x1, y0, log2CbSize − 1, cqtDepth + 1, comp_mode ) | | |
| coding_quadtree( x0, y1, log2CbSize − 1, cqtDepth + 1, comp_mode ) | | |
| coding_quadtree( x1, y1, log2CbSize − 1, cqtDepth + 1, comp_mode ) | | |
| } else | | |
| coding_binarytree(x0, y0, log2CbSize, log2CbSize, cqtDepth, 0, comp_mode ) | | |
| } | | |

(c)

| coding_quadtree( x0, y0, log2CbSize, cqtDepth, comp_mode ) { | Descriptor | |
|---|---|---|
| if( x0 + ( 1 << log2CbSize ) <= pic_width_in_luma_samples && | | ←SYN1420B |
| y0 + ( 1 << log2CbSize ) <= pic_height_in_luma_samples && | | ←SYN1420A2 |
| log2CbSize > MinCbLog2SizeY | | |
| && !(ctu_tree_mode == CTU_SEPARATE && (1<<log2CbSize) > | | |
| maxIntraLumaBlockSize) ) | | |
| split_cu_flag[ x0 ][ y0 ] | ae(v) | ←SYN1421 |
| if( split_cu_flag[ x0 ][ y0 ] ) { | | |
| x1 = x0 + ( 1 << ( log2CbSize − 1 ) ) | | |
| y1 = y0 + ( 1 << ( log2CbSize − 1 ) ) | | |
| coding_quadtree( x0, y0, log2CbSize − 1, cqtDepth + 1, comp_mode ) | | |
| coding_quadtree( x1, y0, log2CbSize − 1, cqtDepth + 1, comp_mode ) | | |
| coding_quadtree( x0, y1, log2CbSize − 1, cqtDepth + 1, comp_mode ) | | |
| coding_quadtree( x1, y1, log2CbSize − 1, cqtDepth + 1, comp_mode ) | | |
| } else | | |
| coding_binarytree(x0, y0, log2CbSize, log2CbSize, cqtDepth, 0, comp_mode ) | | |
| } | | |

FIG. 30

| (a) | coding_quadtree( x0, y0, log2CbSize, cqtDepth, comp_mode ) { | Descriptor | |
|---|---|---|---|
| | if( x0 + ( 1 << log2CbSize ) <= pic_width_in_luma_samples && | | ←SYN1420B |
| | y0 + ( 1 << log2CbSize ) <= pic_height_in_luma_samples && | | ←SYN1420A1 |
| | log2CbSize > MinCbLog2SizeY | | CC |
| | && !(slice_type == I && cclm_enabled_flag && (1<<log2CbSize) > maxIntraLumaBlockSize) ) | | |
| | split_cu_flag[ x0 ][ y0 ] | ae(v) | ←SYN1421 |
| | if( split_cu_flag[ x0 ][ y0 ] ) { | | |
| | x1 = x0 + ( 1 << ( log2CbSize − 1 ) ) | | |
| | y1 = y0 + ( 1 << ( log2CbSize − 1 ) ) | | |
| | coding_quadtree( x0, y0, log2CbSize − 1, cqtDepth + 1, comp_mode ) | | |
| | coding_quadtree( x1, y0, log2CbSize − 1, cqtDepth + 1, comp_mode ) | | |
| | coding_quadtree( x0, y1, log2CbSize − 1, cqtDepth + 1, comp_mode ) | | |
| | coding_quadtree( x1, y1, log2CbSize − 1, cqtDepth + 1, comp_mode ) | | |
| | } else | | |
| | coding_binarytree(x0, y0, log2CbSize, log2CbSize, cqtDepth, 0, comp_mode ) | | |
| | } | | |

| (b) | coding_quadtree( x0, y0, log2CbSize, cqtDepth, comp_mode ) { | Descriptor | |
|---|---|---|---|
| | if( x0 + ( 1 << log2CbSize ) <= pic_width_in_luma_samples && | | ←SYN1420B |
| | y0 + ( 1 << log2CbSize ) <= pic_height_in_luma_samples && | | ←SYN1420A2 |
| | log2CbSize > MinCbLog2SizeY | | CC |
| | && !(slice_type == I && cclm_enabled_flag && ctu_tree_type == CTU_SEPARATE && (1<<log2CbSize) > maxIntraLumaBlockSize) ) | | |
| | split_cu_flag[ x0 ][ y0 ] | ae(v) | ←SYN1421 |
| | if( split_cu_flag[ x0 ][ y0 ] ) { | | |
| | x1 = x0 + ( 1 << ( log2CbSize − 1 ) ) | | |
| | y1 = y0 + ( 1 << ( log2CbSize − 1 ) ) | | |
| | coding_quadtree( x0, y0, log2CbSize − 1, cqtDepth + 1, comp_mode ) | | |
| | coding_quadtree( x1, y0, log2CbSize − 1, cqtDepth + 1, comp_mode ) | | |
| | coding_quadtree( x0, y1, log2CbSize − 1, cqtDepth + 1, comp_mode ) | | |
| | coding_quadtree( x1, y1, log2CbSize − 1, cqtDepth + 1, comp_mode ) | | |
| | } else | | |
| | coding_binarytree(x0, y0, log2CbSize, log2CbSize, cqtDepth, 0, comp_mode ) | | |
| | } | | |

| (c) | coding_quadtree( x0, y0, log2CbSize, cqtDepth, comp_mode ) { | Descriptor | |
|---|---|---|---|
| | if( x0 + ( 1 << log2CbSize ) <= pic_width_in_luma_samples && | | ←SYN1420B |
| | y0 + ( 1 << log2CbSize ) <= pic_height_in_luma_samples && | | ←SYN1420A3 |
| | log2CbSize > MinCbLog2SizeY | | CC |
| | && !(ctu_tree_type == CTU_SEPARATE && cclm_enabled_flag && (1<<log2CbSize) > maxIntraLumaBlockSize) ) | | |
| | split_cu_flag[ x0 ][ y0 ] | ae(v) | ←SYN1421 |
| | if( split_cu_flag[ x0 ][ y0 ] ) { | | |
| | x1 = x0 + ( 1 << ( log2CbSize − 1 ) ) | | |
| | y1 = y0 + ( 1 << ( log2CbSize − 1 ) ) | | |
| | coding_quadtree( x0, y0, log2CbSize − 1, cqtDepth + 1, comp_mode ) | | |
| | coding_quadtree( x1, y0, log2CbSize − 1, cqtDepth + 1, comp_mode ) | | |
| | coding_quadtree( x0, y1, log2CbSize − 1, cqtDepth + 1, comp_mode ) | | |
| | coding_quadtree( x1, y1, log2CbSize − 1, cqtDepth + 1, comp_mode ) | | |
| | } else | | |
| | coding_binarytree(x0, y0, log2CbSize, log2CbSize, cqtDepth, 0, comp_mode ) | | |
| | } | | |

| coding_unit( x0, y0, log2CbWidth, log2CbHeight ) { | Descriptor | |
|---|---|---|
| if( slice_type!=I ) | | |
| cu_skip_flag[ x0 ][ y0 ] | ae(v) | ←SYN1511 |
| nCbW = ( 1<<log2CbWidth ) | | |
| nCbH = ( 1<<log2CbHeight ) | | |
| if( cu_skip_flag[ x0 ][ y0 ] ) | | ←SYN1512 |
| prediction_unit( x0, y0, nCbW, nCbH ) | | |
| else { | | |
| if( slice_type!=I && ctu_tree_mode != CTB_SEPARATE_TREES && (nCbW + nCbH) <= maxIntraLumaBlockSize*2) | | ←SYN1610A SYN1610B2 |
| pred_mode_flag | ae(v) | ←SYN1611 |
| if(CuPredMode[ x0 ][ y0 ] == MODE_INTRA) | | |
| intra_mode( x0, y0, nCbW, nCbH ) | | |
| else | | |
| prediction_unit( x0, y0, nCbW, nCbH ) | | ←SYN1631 |
| rqt_root_cbf | | ←SYN1513 |
| if( rqt_root_cbf ) { | | ←SYN1514 |
| transform_tree( x0, y0, x0, y0, log2CbWidth, log2CbHeight, 0, 0 ) | | |
| } | | |
| } | | |

(b)

| coding_unit( x0, y0, log2CbWidth, log2CbHeight ) { | Descriptor | |
|---|---|---|
| if( slice_type!=I ) | | |
| cu_skip_flag[ x0 ][ y0 ] | ae(v) | ←SYN1511 |
| nCbW = ( 1<<log2CbWidth ) | | |
| nCbH = ( 1<<log2CbHeight ) | | |
| if( cu_skip_flag[ x0 ][ y0 ] ) | | ←SYN1512 |
| prediction_unit( x0, y0, nCbW, nCbH ) | | |
| else { | | |
| if( slice_type!=I && (nCbW + nCbH) <= maxIntraLumaBlockSize*2) | | ←SYN1610A SYN1610B |
| pred_mode_flag | ae(v) | ←SYN1611 |
| if(CuPredMode[ x0 ][ y0 ] == MODE_INTRA) | | |
| intra_mode( x0, y0, nCbW, nCbH ) | | |
| else | | |
| prediction_unit( x0, y0, nCbW, nCbH ) | | ←SYN1631 |
| rqt_root_cbf | | ←SYN1513 |
| if( rqt_root_cbf ) { | | ←SYN1514 |
| transform_tree( x0, y0, x0, y0, log2CbWidth, log2CbHeight, 0, 0 ) | | |
| } | | |
| } | | |

| coding_unit( x0, y0, log2CbWidth, log2CbHeight ) { | Descriptor | |
|---|---|---|
| if( slice_type!=I && ctu_tree_type != CTU_SEPARATE) | | ←SYN1500, ←SYN1510C |
|    cu_skip_flag[ x0 ][ y0 ] | ae(v) | ←SYN1511 |
| nCbW = ( 1<<log2CbWidth ) | | |
| nCbH = ( 1<<log2CbHeight ) | | |
| if( cu_skip_flag[ x0 ][ y0 ] ) | | ←SYN1512 |
|    prediction_unit( x0, y0, nCbW, nCbH ) | | |
| else { | | |
|    if( slice_type!=I && | | ←SYN1610A |
|      ctu_tree_type != CTU_SEPARATE) | | ←SYN1610C |
|      pred_mode_flag | ae(v) | ←SYN1611 |
|    if(CuPredMode[ x0 ][ y0 ] == MODE_INTRA) | | |
|      intra_mode( x0, y0, nCbW, nCbH ) | | |
|    else | | |
|      prediction_unit( x0, y0, nCbW, nCbH ) | | ←SYN1631 |
|    rqt_root_cbf | | ←SYN1513 |
|    if( rqt_root_cbf ) { | | ←SYN1514 |
|      transform_tree( x0, y0, x0, y0, log2CbWidth, log2CbHeight, 0, 0 ) | | |
|    } | | |
| } | | |

(b)

| coding_unit( x0, y0, log2CbWidth, log2CbHeight ) { | Descriptor | |
|---|---|---|
| if( slice_type!=I && | | ←SYN1510A, |
|    NumColourComponent > 2 && ctu_tree_type != CTU_SEPARATE) | | ←SYN1510C2 |
|    cu_skip_flag[ x0 ][ y0 ] | ae(v) | ←SYN1511 |
| nCbW = ( 1<<log2CbWidth ) | | |
| nCbH = ( 1<<log2CbHeight ) | | |
| if( cu_skip_flag[ x0 ][ y0 ] ) | | ←SYN1512 |
|    prediction_unit( x0, y0, nCbW, nCbH ) | | |
| else { | | |
|    if( slice_type!=I && | | ←SYN1610A |
|      NumColourComponent > 2 && ctu_tree_type != CTU_SEPARATE) | | ←SYN1610C2 |
|      pred_mode_flag | ae(v) | ←SYN1611 |
|    if(CuPredMode[ x0 ][ y0 ] == MODE_INTRA) | | |
|      intra_mode( x0, y0, nCbW, nCbH ) | | |
|    else | | |
|      prediction_unit( x0, y0, nCbW, nCbH ) | | ←SYN1631 |
|    rqt_root_cbf | | ←SYN1513 |
|    if( rqt_root_cbf ) { | | ←SYN1514 |
|      transform_tree( x0, y0, x0, y0, log2CbWidth, log2CbHeight, 0, 0 ) | | |
|    } | | |
| } | | |

FIG. 41

(a)
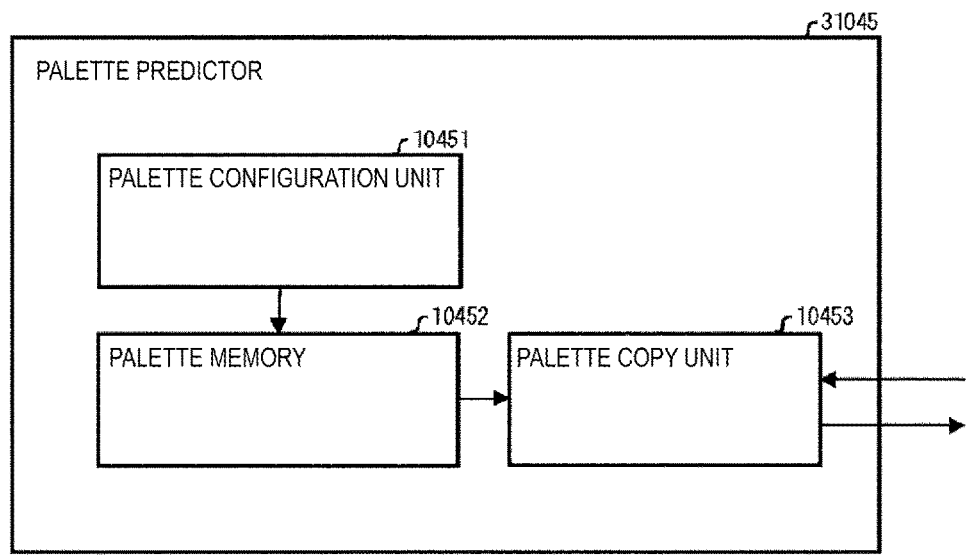
(b)
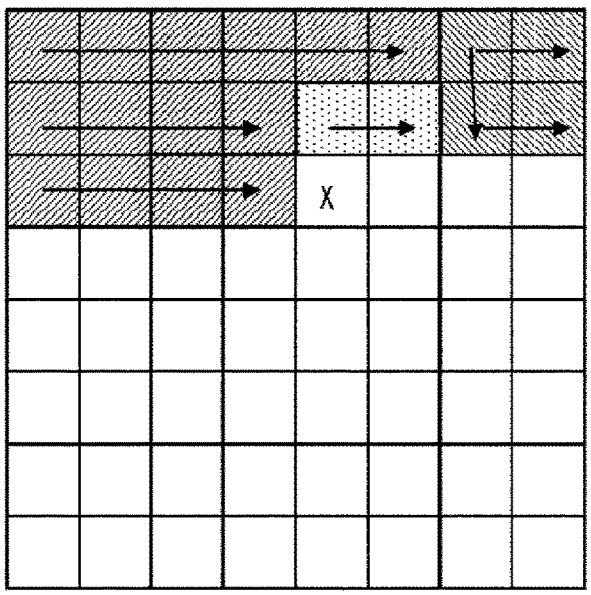
FIG. 42

| palette_coding( x0, y0, nCbS ) { | Descriptor |
|---|---|
|   PaletteScanPos = 0 | |
|   log2BlockSize = Log2( nCbS ) | |
|   while( PaletteScanPos < nCbS * nCbS ) { | |
|     xC = x0 + ScanOrder[ log2BlockSize ][ 3 ][ PaletteScanPos ][ 0 ] | |
|     yC = y0 + ScanOrder[ log2BlockSize ][ 3 ][ PaletteScanPos ][ 1 ] | |
|     if( PaletteScanPos > 0 ) { | |
|       xcPrev = x0 + ScanOrder[ log2BlockSize ][ 3 ][ PaletteScanPos − 1 ][ 0 ] | |
|       ycPrev = y0 + ScanOrder[ log2BlockSize ][ 3 ][ PaletteScanPos − 1 ][ 1 ] | |
|     } | |
|     PaletteRun = nCbS * nCbS − PaletteScanPos − 1 | |
|     CopyAboveIndicesFlag[ xC ][ yC ] = 0 | |
|     if( MaxPaletteIndex > 0 ) | |
|       if( PaletteScanPos >= nCbS && CopyAboveIndicesFlag[ xcPrev ][ ycPrev ] == 0 ) | |
|         if( remainingNumIndices > 0 && PaletteScanPos < nCbS * nCbS − 1 ) { | |
|           copy_above_palette_indices_flag | ae(v) |
|           CopyAboveIndicesFlag[ xC ][ yC ] = copy_above_palette_indices_flag | |
|         } else | |
|           if( PaletteScanPos == nCbS * nCbS − 1 && remainingNumIndices > 0 ) | |
|             CopyAboveIndicesFlag[ xC ][ yC ] = 0 | |
|           else | |
|             CopyAboveIndicesFlag[ xC ][ yC ] = 1 | |
|     if ( CopyAboveIndicesFlag[ xC ][ yC ] == 0 ) { | |
|       currNumIndices = num_palette_indices_minus1 + 1 − remainingNumIndices | |
|       CurrPaletteIndex = PaletteIndexIdc[ currNumIndices ] | |
|     } | |
|     if( MaxPaletteIndex > 0 ) { | |
|       if ( CopyAboveIndicesFlag[ xC ][ yC ] == 0 ) | |
|         remainingNumIndices − = 1 | |
|       PaletteMaxRun = nCbS * nCbS − PaletteScanPos − 1 − remainingNumIndices − copy_above_indices_for_final_run_flag | |
|       if( remainingNumIndices > 0 | | CopyAboveIndicesFlag[ xC ][ yC ] != copy_above_indices_for_final_run_flag ) | |
|         if( PaletteMaxRun > 0 ) { | |
|           palette_run_prefix | ae(v) |
|           if( ( palette_run_prefix > 1 ) && ( PaletteMaxRun != ( 1 << ( palette_run_prefix − 1 ) ) ) ) | |
|             palette_run_suffix | ae(v) |
|         } | |
|     } | |
|     runPos = 0 | |
|     while ( runPos <= PaletteRun ) { | |
|       xR = x0 + ScanOrder[ log2BlockSize ][ 3 ][ PaletteScanPos ][ 0 ] | |
|       yR = y0 + ScanOrder[ log2BlockSize ][ 3 ][ PaletteScanPos ][ 1 ] | |
|       if( CopyAboveIndicesFlag[ xC ][ yC ] == 0 ) { | |
|         CopyAboveIndicesFlag[ xR ][ yR ] = 0 | |
|         PaletteIndexMap[ xR ][ yR ] = CurrPaletteIndex | |
|       } else { | |
|         CopyAboveIndicesFlag[ xR ][ yR ] = 1 | |
|         PaletteIndexMap[ xR ][ yR ] = PaletteIndexMap[ xR ][ yR − 1 ] | |
|       } | |
|       runPos++ | |
|       PaletteScanPos++ | |
|     } | |
|   } | |
|   if( palette_escape_val_present_flag ) { | |
|     for( cIdx = 0; cIdx < numComps; cIdx++ ) | |
|       for (sPos = 0; sPos < nCbS * nCbS; sPos++ ) { | |
|         xC = x0 + ScanOrder[ log2BlockSize ][ 3 ][ sPos ][ 0 ] | |
|         yC = y0 + ScanOrder[ log2BlockSize ][ 3 ][ sPos ][ 1 ] | |
|         if( PaletteIndexMap[ xC ][ yC ] == MaxPaletteIndex ) | |
|           if( cIdx == 0 | | ( xC % 2 == 0 && yC % 2 == 0 && ChromaArrayType == 1 ) | | ChromaArrayType == 3 ) { | |
|             palette_escape_val | ae(v) |
|             PaletteEscapeVal[ cIdx ][ xC ][ yC ] = palette_escape_val | |
|           } | |
|       } | |
|   } | |
| } | |

FIG. 43

| coding_unit( x0, y0, log2CbWidth, log2CbHeight ) { | Descriptor | |
|---|---|---|
|   if( transquant_bypass_enabled_flag ) | | ←SYN1505 |
|     cu_transquant_bypass_flag | ae(v) | |
|   if( slice_type!=I ) | | |
|     cu_skip_flag[ x0 ][ y0 ] | ae(v) | ←SYN1511 |
|   nCbW = ( 1<<log2CbWidth ) | | |
|   nCbH = ( 1<<log2CbHeight ) | | |
|   if( cu_skip_flag[ x0 ][ y0 ] ) | | ←SYN1512 |
|     prediction_unit( x0, y0, nCbW, nCbH ) | | |
|   else { | | |
|     if( slice_type!=I) | | ←SYN1610 |
|       pred_mode_flag | ae(v) | ←SYN1611 |
|     if( palette_mode_enabled_flag && CuPredMode[ x0 ][ y0 ] == MODE_INTRA && log2CbSize <= MaxTbLog2SizeY && ctu_tree_type != CTU_SEPARATE ) | | ←SYN1620 |
|       palette_mode_flag[ x0 ][ y0 ] | ae(v) | ←SYN1621 |
|     if( palette_mode_flag[ x0 ][ y0 ] ) | | ←SYN1623 |
|       palette_mode( x0, y0, nCbW, nCbH ) | | ←SYN1624 |
|     else if(CuPredMode[ x0 ][ y0 ] == MODE_INTRA) | | |
|       intra_mode( x0, y0, nCbW, nCbH ) | | |
|     else | | |
|       prediction_unit( x0, y0, nCbW, nCbH ) | | ←SYN1631 |
|   rqt_root_cbf | | ←SYN1513 |
|   if( rqt_root_cbf ) { | | ←SYN1514 |
|     transform_tree( x0, y0, x0, y0, log2CbWidth, log2CbHeight, 0, 0 ) | | |
|   } | | |
| } | | |

FIG. 45

| transform_unit( x0, y0, log2TrafoW, log2TrafoH, trafoDepth, blkIdx ) { | Descriptor | |
|---|---|---|
|   cbfDepthC = trafoDepth | | |
|   xC = ( ChromaArrayType != 3 && log2TrafoSize == 2 ) ? xBase : x0 | | |
|   yC = ( ChromaArrayType != 3 && log2TrafoSize == 2 ) ? yBase : y0 | | |
|   cbfLuma = cbf_luma[ x0 ][ y0 ][ trafoDepth ] | | |
|   cbfChroma = cbf_cb[ xC ][ yC ][ cbfDepthC ] \|\| cbf_cr[ xC ][ yC ][ cbfDepthC ] | | |
|   if( cbfLuma \|\| cbfChroma ) { | | ←SYN1781 |
|     xP = ( x0 >> MinCbLog2SizeY ) << MinCbLog2SizeY | | |
|     yP = ( y0 >> MinCbLog2SizeY ) << MinCbLog2SizeY | | |
|     nCbS = 1 << MinCbLog2SizeY | | |
|     delta_qp( ) | | |
|     if( cbfChroma && !cu_transquant_bypass_flag ) | | |
|       chroma_qp_offset( ) | | |
|     if( cbfLuma ) | | ←SYN1781 |
|       residual_coding( x0, y0, log2TrafoSize, 0 ) | | ←SYN1800 |
|     if( ChromaArrayType == 3 ) { | | |
|       if( cross_component_prediction_enabled_flag && ctu_type != CTU_SEPARATE && cbfLuma && ( CuPredMode[ x0 ][ y0 ] == MODE_INTER \|\| intra_chroma_pred_mode[ x0 ][ y0 ] == 4 ) ) { | | ←SYN1790 |
|         cross_comp_pred( x0, y0, 0 ) | | ←SYN1791 |
|         cross_comp_pred( x0, y0, 1 ) | | ←SYN1791 |
|       } | | |
|       residual_coding( x0, y0, log2TrafoSizeC, 1 ) | | ←SYN1800 |
|       residual_coding( x0, y0, log2TrafoSizeC, 2 ) | | ←SYN1800 |
|     } | | |
|   } | | |
| } | | |

| cross_comp_pred( x0, y0, c ) { | Descriptor | |
|---|---|---|
|   log2_res_scale_abs_plus1[ c ] | ae(v) | ←SYN1791 |
|   if( log2_res_scale_abs_plus1[ c ] != 0 ) | | ←SYN1792 |
|     res_scale_sign_flag[ c ] | ae(v) | ←SYN1793 |
| } | | |

FIG. 47

| | Descriptor | |
|---|---|---|
| coding_unit( x0, y0, log2CbWidth, log2CbHeight ) { | | |
|   if( transquant_bypass_enabled_flag ) | | ←SYN1505 |
|     cu_transquant_bypass_flag | ae(v) | |
|   if( slice_type != I && ctu_tree_type != CTU_SEPARATE) | | |
|     cu_skip_flag[ x0 ][ y0 ] | ae(v) | ←SYN1511 |
|   nCbW = ( 1<<log2CbWidth ) | | |
|   nCbH = ( 1<<log2CbHeight ) | | |
|   if( cu_skip_flag[ x0 ][ y0 ] ) | | ←SYN1512 |
|     prediction_unit( x0, y0, nCbW, nCbH ) | | |
|   else { | | |
|     if( slice_type != I && ctu_tree_type != CTU_SEPARATE) | | |
|       pred_mode_flag | ae(v) | ←SYN1611 |
|     if( palette_mode_enabled_flag && CuPredMode[ x0 ][ y0 ] == MODE_INTRA && log2CbSize <= MaxTbLog2SizeY && ctu_tree_type != CTU_SEPARATE ) | | |
|       palette_mode_flag[ x0 ][ y0 ] | ae(v) | |
|     if( palette_mode_flag[ x0 ][ y0 ] ) | | |
|       palette_mode( x0, y0, nCbW, nCbH ) | | |
|     else if(CuPredMode[ x0 ][ y0 ] == MODE_INTRA) | | |
|       intra_mode( x0, y0, nCbW, nCbH ) | | |
|     else | | |
|       prediction_unit( x0, y0, nCbW, nCbH ) | | ←SYN1631A |
|     rqt_root_cbf | | ←SYN1513 |
|     if( rqt_root_cbf ) { | | ←SYN1514 |
|       transform_tree( x0, y0, x0, y0, log2CbWidth, log2CbHeight, 0, 0 ) | | |
|     } | | |
|   } | | |
| } | | |

FIG. 49

IMAGE DECODING APPARATUS

TECHNICAL FIELD

An aspect of the present invention relates to an image decoding apparatus, and an image coding apparatus.

BACKGROUND ART

An image coding apparatus (video coding apparatus), which codes a video to generate coded data, and an image decoding apparatus (video decoding apparatus), which decodes the coded data to generate a decoded image, are used to efficiently transmit or record videos.

Specific video coding schemes include, for example, schemes suggested in H.264/AVC and High-Efficiency Video Coding (HEVC).

In such a video coding scheme, images (pictures) constituting a video are managed by a hierarchy structure including slices obtained by splitting each of the images, Coding Tree Units (CTUs) obtained by splitting each of the slices, Coding Units (CUs) obtained by splitting each of the coding tree units, Prediction Units (PUs) which are blocks obtained by splitting each of the coding units, and Transform Units (TUs), and are coded/decoded on a per CU basis.

In such a video coding scheme, usually, a prediction image is generated based on local decoded images obtained by coding/decoding input images, and prediction residual (also sometimes referred to as "difference images" or "residual images") obtained by subtracting the prediction images from the input images (original images) are coded. Generation methods of prediction images include an inter-picture prediction (an inter prediction) and an intra-picture prediction (intra prediction).

The following are recently known from NPL 1: a single coding tree (a shared coding tree) in which multiple color components are coded in a single tree in units of regions (CTUs or CTBs); and a separate coding tree in which coding is performed using multiple trees according to color components. In addition, a Coloer Component Linear Model (CCLM) prediction scheme for performing intra prediction between color components is known.

The following are known from NPL 2: a palette coding for simultaneously coding multiple color components, an intra block copy method for generating a prediction image with reference to already coded regions such as intra images, and cross component residual prediction for predicting chrominance residuals from luminance residuals. Also known from NPL 2 is a method for transmitting QP update information and changing quantization parameters in units of blocks.

CITATION LIST

Non Patent Literature

NPL 1: "Algorithm Description of Joint Exploration Test Model 7", JVET-G1001, Joint Video Exploration Team (JVET) of ITU-T SG 16 WP 3 and ISO/IEC JTC 1/SC 29/WG 11, 13 to 21 Jul. 2017

NPL 2: ITU-T H.265 (March 2015) SERIES H: AUDIOVISUAL AND MULTIMEDIA SYSTEMS Infrastructure of audiovisual services—Coding of moving video High efficiency video coding

SUMMARY OF INVENTION

Technical Problem

In general, luminance processing and chrominance processing are performed in parallel as much as possible, but in a case of using luminance information for chrominance prediction in the separate coding tree structure as in NPL 1, there is a problem that the chrominance block fail to be decoded until all the luminance blocks constituting the tree are decoded.

Even in a case that a structure different from the separate coding tree is used, there is a problem that luminance processing is performed before chrominance processing, and this increases a delay.

In addition, NPL 2 poses a problem that the separate coding tree structure is used only in units of intra slices, so coding efficiency is insufficient.

In addition, there is a problem that palette coding, intra block copy processing, and cross component residual prediction in NPL 2 do not operate in NPL 1 that uses the separate coding tree.

Solution to Problem

An image decoding apparatus according to an aspect of the present invention includes a CT information decoding unit configured to split, into coding trees CTs, a coding tree unit CTU of coding tree units CTUs resulting from splitting of an image into rectangles and to process one or more color components as a single coding tree using one coding tree CT of the coding trees CTs (route coding tree node) or processing of two or more color components as a separate coding tree using two or more coding trees CTs of the coding trees CTs (route coding tree nodes) depending on a tree mode, a CU decoding unit configured to decode a split flag indicating whether to further split a CT of the CTs and to perform recursive block splitting, an intra predictor configured to use a decoded image of one color component to generate a prediction image of another color component, and a prediction mode decoding unit configured to decode a prediction mode indicating an intra mode or an inter mode, wherein the prediction mode decoding unit does not decode the prediction mode from coded data but configures the intra mode in a case that the CTU is an intra slice, and the CU decoding unit does not decode the split flag from the coded data but configures 1 (a value indicating a split) in the split flag in a case that the CTU is an intra slice, that the tree mode is the separate coding tree, and that a target CT size is larger than a prescribed maximum intra size.

Advantageous Effects of Invention

According to an aspect of the present invention, even in an image coding apparatus and an image decoding apparatus that can utilize a separate coding tree structure, the degree of being able to perform luminance processing and chrominance processing can be increased. In other words, the latency (delay) due to the luminance processing before the chrominance processing can be reduced.

The use of the separate coding tree structure also for inter slices increases coding efficiency.

Even in the image coding apparatus and image decoding apparatus that can utilize the separate coding tree structure, palette coding or intra block copy processing can be selected, and unwanted overhead can be reduced.

BRIEF DESCRIPTION OF DRAWINGS

FIG. 9 is a configuration diagram of a syntax table of QT information according to an embodiment of the present invention.

FIG. 11 is a configuration diagram of a syntax table of BT information according to an embodiment of the present invention.

FIG. 15 is a diagram illustrating a configuration example of a syntax table of CU information, PT information PTI, and TT information TTI according to an embodiment of the present invention.

FIG. 16 is a diagram illustrating a configuration example of a syntax table of PU information PUI according to an embodiment of the present invention.

FIG. 17 is a diagram illustrating a configuration example of a syntax table of the TT information TTI according to an embodiment of the present invention.

FIG. 18 is a diagram illustrating a configuration example of a syntax table of TU information TUI according to an embodiment of the present invention.

FIG. 22 is a diagram illustrating tree structures and partition structures in a separate coding tree.

FIG. 23 is a diagram illustrating a relationship between a parameter ctu_tree_mode indicating a tree mode and a tree structure (Name).

FIG. 24 is a diagram illustrating a relationship between a color component (Name) and parameters ChromaArrayType and ctu_comp indicating a color arrangement.

FIG. 26 is a diagram illustrating an example of a syntax table in the configuration using the separate coding tree.

FIG. 30 is a syntax table illustrating a configuration of coded data targeted by the CT information decoding unit 11 according to the present embodiment.

FIG. 32 is a syntax table illustrating a structure of coded data targeted by the CT information decoding unit 11 according to the present embodiment.

FIG. 37 is a syntax table illustrating the configuration of coded data targeted by the CU decoding unit 20 according to the present embodiment.

FIG. 41 is a syntax table illustrating the configuration of coded data targeted by the CU decoding unit 20 according to the present embodiment.

FIG. 42 is a block diagram illustrating a configuration of a palette predictor 31045 according to the present embodiment and a diagram illustrating operation of palette prediction.

FIG. 43 is an example of a syntax table of palette information to be decoded by the palette predictor 31045 according to the present embodiment.

FIG. 45 is a syntax table illustrating a configuration of coded data targeted by the CU decoding unit 20 according to the present embodiment.

FIG. 47 is a syntax table illustrating the configuration of the coded data targeted by the TU decoding unit 22 according to an embodiment of the present invention.

FIG. 49 is a syntax table illustrating a configuration of coded data targeted by the CU decoding unit 20 according to an embodiment of the present invention.

DESCRIPTION OF EMBODIMENTS

First Embodiment

Hereinafter, embodiments of the present invention are described with reference to the drawings.

Figure 21:
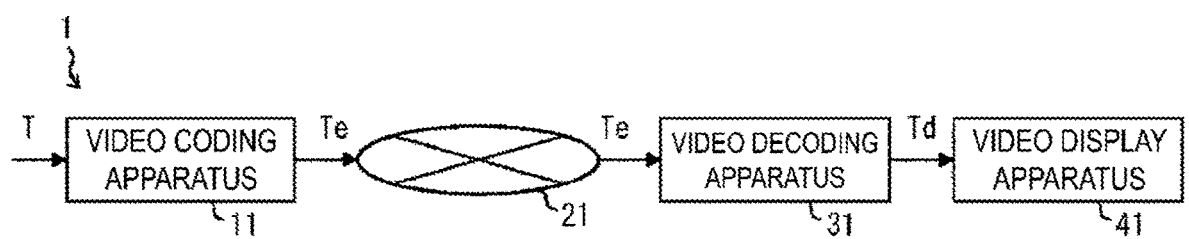
FIG. 21 is a schematic diagram illustrating a configuration of an image transmission system according to the present embodiment.

FIG. 21 is a schematic diagram illustrating a configuration of an image transmission system 1 according to the present embodiment.

The image transmission system 1 is a system configured to transmit codes of a coding target image having been coded, decode the transmitted codes, and display an image. The image transmission system 1 includes an image coding apparatus (video coding apparatus) 11, a network 21, an image decoding apparatus (video decoding apparatus) 31, and an image display apparatus (video display apparatus) 41.

An image T indicating an image of a single layer or multiple layers is input to the image coding apparatus 11. A layer is a concept used to distinguish multiple pictures in a case that there are one or more pictures constituting a certain time. For example, coding an identical picture in multiple layers having different image qualities or resolutions is scalable coding, and coding pictures having different viewpoints in multiple layers is view scalable coding. In a case of performing a prediction (an inter-layer prediction, an inter-view prediction) between pictures in multiple layers, coding efficiency greatly improves. Also in a case of not performing a prediction, in a case of (simulcast), coded data can be compiled.

The network 21 transmits a coding stream Te generated by the image coding apparatus 11 to the image decoding apparatus 31. The network 21 is the Internet (internet), Wide Area Network (WAN), Local Area Network (LAN), or combinations thereof. The network 21 is not necessarily a bidirectional communication network, but may be a unidirectional communication network configured to transmit broadcast wave such as digital terrestrial television broadcasting and satellite broadcasting. The network 21 may be substituted by a storage medium having recorded thereon the coding stream Te, such as a Digital Versatile Disc (DVD) and a Blue-ray Disc (BD).

The image decoding apparatus 31 decodes each of coding streams Te transmitted by the network 21, and generates one or multiple decoded images Td.

The image display apparatus 41 displays all or part of the one or multiple decoded images Td generated by the image decoding apparatus 31. For example, the image display apparatus 41 includes a display device such as a liquid crystal display or an organic Electro-luminescence (EL) display. The display may have a stationary configuration, a mobile configuration, an HMD, or the like. In spatial scalable coding and SNR scalable coding, in a case that the image decoding apparatus 31 and the image display apparatus 41 have high processing capability, an enhanced layer image having high image quality is displayed, and in a case that the image decoding apparatus 31 have lower processing capability, a base layer image, which does not require as high processing capability and display capability as an enhanced layer, is displayed.

Operators

Operators used herein will be described below.

$>>$ is a right bit shift, $<<$ is a left bit shift, & is a bitwise AND, | is a bitwise OR, and |= is an OR assignment operator.

X?y:z is a ternary operator to take y in a case that x is true (other than 0), and take z in a case that x is false (0).

Clip3(a, b, c) is a function to clip c in a value equal to or greater than a and equal to or less than b, and a function to return a in a case that c is less than a (c<a), return b in a case that c is greater than b (c>b), and return c otherwise (however, a is equal to or less than b (a<=b)).

x && y represents a logical product (logical and), x||y represents a logical sum (logical or), and ! represents a logical not.

abs(a) is a function that returns an absolute value of a.

Int(a) is a function that returns an integer value of a.

Max(a, b) and Min(a, b) are functions that respectively return a maximum value of a and b and a minimum value of a and b.

floor(a) is a function that returns a maximum integer of a or less.

a/d represents a division of a by d (truncated to an integer).

Structure of Coding Stream Te

Prior to the detailed description of the image coding apparatus 11 and the image decoding apparatus 31 according to the present embodiment, a data structure of the coding stream Te generated by the image coding apparatus 11 and decoded by the image decoding apparatus 31 will be described.

Figure 1:
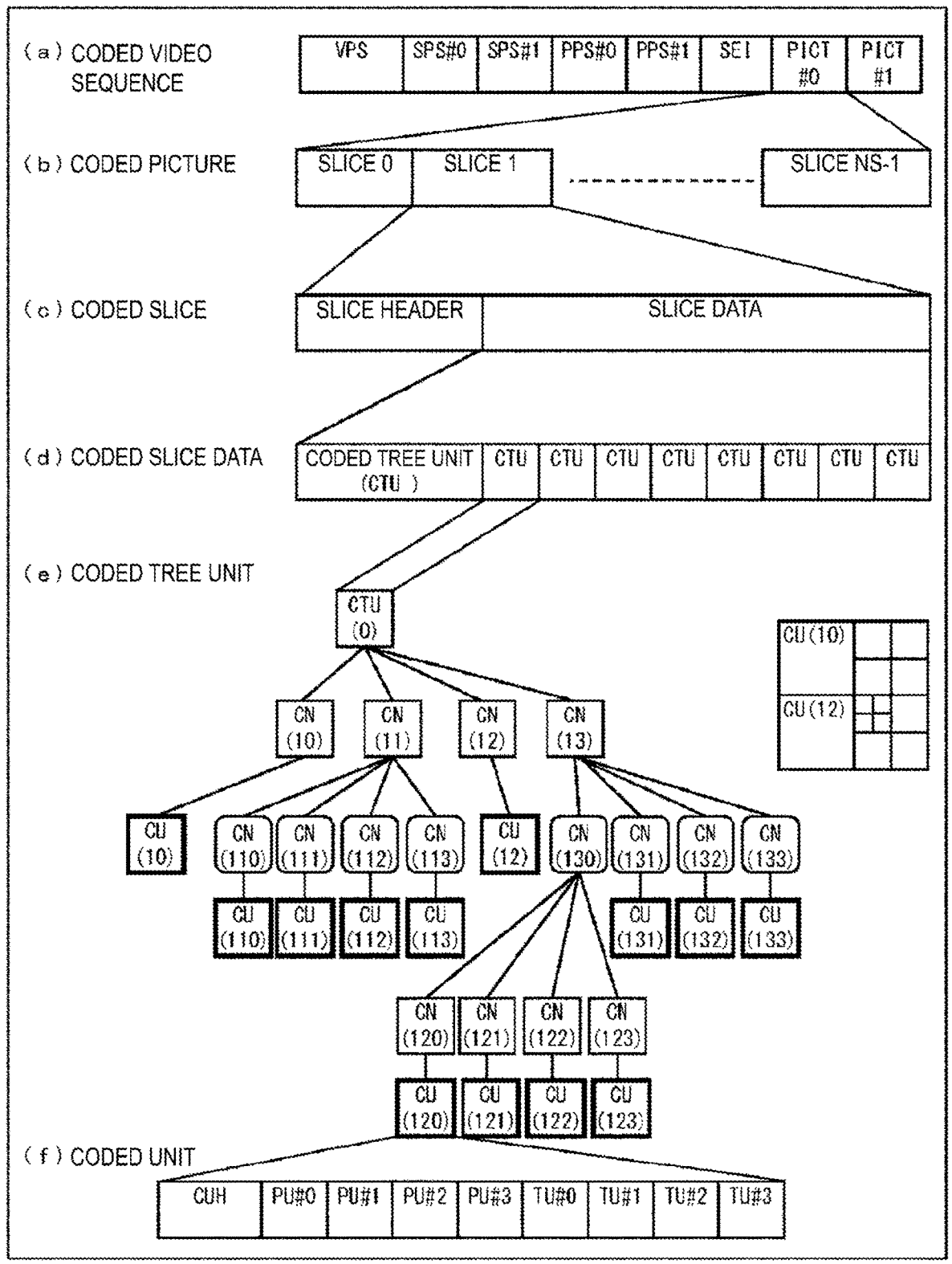
FIG. 1 is a diagram illustrating a hierarchy structure of data of a coding stream according to the present embodiment.

FIG. 1 is a diagram illustrating a hierarchy structure of data in the coding stream Te. The coding stream Te includes a sequence and multiple pictures constituting the sequence illustratively. (a) to (f) of FIG. 1 are diagrams illustrating a coding video sequence prescribing a sequence SEQ, a coding picture prescribing a picture PICT, a coding slice prescribing a slice S, coding slice data prescribing slice data, a coding tree unit included in the coding slice data, and Coding Units (CUs) included in the coding tree unit, respectively.

Coding Video Sequence

In the coding video sequence, a set of data referred to by the image decoding apparatus 31 to decode a processing target sequence SEQ of a processing target is prescribed. As illustrated in (a) of FIG. 1, the sequence SEQ includes a Video Parameter Set (VPS), a Sequence Parameter Set (SPS), a Picture Parameter Set (PPS), a picture PICT, and Supplemental Enhancement Information (SEI). Here, a value indicated after #indicates a layer ID. In FIG. 1, although an example is illustrated where coded data of #0 and #1, in other words, layer 0 and layer 1 exist, types of layers and the number of layers are not limited to this.

In the video parameter set VPS, in a video including multiple layers, a set of coding parameters common to multiple videos and a set of coding parameters associated with multiple layers and individual layers included in the video are prescribed.

In the sequence parameter set SPS, a set of coding parameters referred to by the image decoding apparatus 31 to decode a target sequence is prescribed. For example, width and height of a picture are prescribed. Note that multiple SPSs may exist. In that case, any of the multiple SPSs is selected from the PPS.

In the picture parameter set PPS, a set of coding parameters referred to by the image decoding apparatus 31 to decode each picture in a target sequence is prescribed. For example, a reference value (pic_init_qp_minus26) of a quantization step size used for decoding of a picture and a flag (weighted_pred_flag) indicating an application of a weighted prediction are included. Note that multiple PPSs may exist. In that case, any of the multiple PPSs is selected from each slice header in the target sequence.

Coding Picture

In the coding picture, a set of data referred to by the image decoding apparatus 31 to decode a processing target picture PICT is prescribed. As illustrated in (b) of FIG. 1, the picture PICT includes slices S0 to $S_{NS-1}$ (NS is the total number of slices included in the picture PICT).

Note that in a case not necessary to distinguish the slices S0 to $S_{NS-1}$ below, subscripts of reference signs may be omitted in description. The same applies to other data included in the coding stream Te described below and described with subscripts.

Coding Slice

In the coding slice, a set of data referred to by the image decoding apparatus 31 to decode a processing target slice S is prescribed. As illustrated in (c) of FIG. 1, the slice S includes a slice header SH and a slice data SDATA.

The slice header SH includes a coding parameter group referred to by the image decoding apparatus 31 to determine a method of decoding a target slice. Slice type specification information (slice_type) to specify a slice type is one example of a coding parameter included in the slice header SH.

Examples of slice types that can be specified by the slice type specification information include (1) I slice using only an intra prediction in coding, (2) P slice using a unidirectional prediction or an intra prediction in coding, and (3) B slice using a unidirectional prediction, a bidirectional prediction, or an intra prediction in coding, and the like. Note that the inter prediction is not limited to a uni-prediction or a bi-prediction, and a larger number of reference pictures may be used to generate a prediction image. Hereinafter, in a case that the term P slice or B slice is used, a slice is referred to that includes blocks for which an inter prediction can be used.

Note that, the slice header SH may include a reference (pic_parameter_set_id) to the picture parameter set PPS included in the coding video sequence.

Coding Slice Data

In the coding slice data, a set of data referred to by the image decoding apparatus 31 to decode the processing target slice data SDATA is prescribed. As illustrated in (d) of FIG. 1, the slice data SDATA includes Coding Tree Units (CTUs) (CTU blocks). The CTU is a block of a fixed size (for example, 64×64) constituting a slice, and may be also referred to as a Largest Coding Unit (LCU) or a Coding Tree Block (CTB). Additionally, the CTU corresponds to a block (first block) that is a region obtained by dividing a picture. The CTU may be a rectangle of 16×16, 32×32, 64×64, 128×128, 256×256, or the like.

Coding Tree Unit

As illustrated in (e) of FIG. 1, a set of data referred to by the image decoding apparatus 31 to decode a processing target coding tree unit is prescribed. The coding tree unit (first block) is split, by recursive quad tree split (QT split) or binary tree split (BT split), into Coding Units (CUs, second blocks) corresponding to basic units of coding processing. A Coding Tree (CT) refers to a tree structure obtained by the recursive quad tree split or binary tree split, and a Coding Node (CN) refers to a node of the tree structure. Note that CT may be used for the meaning of CN. Intermediate nodes of a quad tree and a binary tree are coding nodes, and the coding tree unit itself is also prescribed as the highest coding node (route node or route coding tree node). Note that, in addition to the quad tree split (QT split) and the binary tree split (BT split), another splitting method such as a Triple Tree (TT split), or the like may be performed. In the separate coding tree, multiple coding trees can be provided for the set of color components in a single block.

The CT includes a QT split flag (split_cu_flag) indicating whether to perform a QT split or not and a BT split mode (split_bt_mode) indicating a split method of a BT split as CT information. split_cu_flag and/or split_bt_mode are transmitted for each coding node CN. In a case that split_cu_flag is 1, the coding node CN is split into four coding node CNs. In a case that split_cu_flag has a value of 0, the coding node CN is horizontally split into two coding nodes CNs in a case that the split_bt_mode is 1, and is vertically split into two coding nodes CNs in a case that the split_bt_mode is 2, while not being split and having one coding unit CU as a node in a case that the split_bt_mode is 0. The coding unit CU is a terminal node (leaf node) of the coding node, and involves no further splitting. split_bt_mode may be categorized as a flag split_bt_flag indicating whether to perform splitting or not and a flag split_bt_dir indicating a direction of splitting and the direction.

split_bt_flag=!split_bt_mode
split_bt_dir=split_bt_mode−1
split_bt_mode=split_bt_flag ? split_bt_dir+1:0

Coding Unit

As illustrated in (f) of FIG. 1, a set of data referred to by the image decoding apparatus 31 to decode a processing target coding unit is prescribed. Specifically, the coding unit includes a prediction tree, a transform tree, and a CU header CUH. In the CU header, a prediction mode, a split method (PU split mode), and the like are prescribed.

In the prediction tree, prediction parameters (a reference picture index, a motion vector, and the like) are prescribed for each of one or more prediction units (PU) obtained by splitting the coding unit. In another expression, the prediction unit is one or multiple non-overlapping regions constituting the coding unit. The prediction tree includes one or multiple prediction units obtained by the above-mentioned split. Note that, in the following, a unit of prediction where a prediction unit is further split is referred to as a "subblock". The prediction processing may be performed for each of these prediction units (subblocks).

Generally speaking, there are two types of prediction in the prediction tree, including a case of an intra prediction and a case of an inter prediction. The intra prediction is a prediction within one picture, and the inter prediction refers to prediction processing using a reference picture. Note that the reference picture may be a temporally preceding picture, a temporally subsequent picture, or a target picture itself, the pictures having already been processed. In a case that the reference picture is a target picture, the reference picture is an already processed region.

In a case of an intra prediction, examples of the split method include 2N×2N (the same size as that for the coding units) and N×N. In a case of an inter prediction, the split method is coded in a PU split mode (part_mode), and examples of the spit method include 2N×2N (the same size as that for the coding units), 2N×N, 2N×nU, 2N×nD, N×2N, nL×2N, nR×2N, N×N, and the like. Note that 2N×N and N×2N indicate symmetric splits of 1:1, and 2N×nU, 2N×nD and nL×2N, nR×2N indicate asymmetric splits of 1:3 and 3:1. The PUs included in the CU are expressed as PU0, PU1, PU2, and PU3 sequentially. Instead of coding the PU split mode (part_mode), regions having the same size as that for the coding units may be used for the PUs. Instead of coding the part_mode, the PUs may be automatically split into subblocks.

In the transform tree, the coding unit is split into one or multiple transform units TU, and the position and size of each transform unit are prescribed. In another expression, the transform units are one or multiple non-overlapping regions constituting the coding unit. The transform tree includes one or multiple transform units obtained by the above-mentioned split.

Examples of splits in the transform tree include a split to allocate a region having the same size as that of the coding units as a transform unit, and a split by a recursive quad tree split similar to the above-mentioned split of CU. Transform processing is performed for each of these transform units.

Prediction Parameter

A prediction image of Prediction Units (PUs) is derived by prediction parameters attached to the PUs. The prediction parameters include a prediction parameter of an intra prediction or a prediction parameter of an inter prediction. The prediction parameter of an inter prediction (inter prediction parameters) will be described below. The inter prediction parameter is constituted by prediction list utilization flags predFlagL0 and predFlagL1, reference picture indexes refIdxL0 and refIdxL1, and motion vectors mvL0 and mvL1. Each of the prediction list utilization flags predFlagL0 and predFlagL1 is a flag indicating whether a reference picture list referred to as an L0 list or L1 list is used or not, and a corresponding reference picture list is used in a case that the value is 1. Note that, in a case that the present specification mentions "a flag indicating whether or not XX", it is assumed that a flag being other than 0 (for example, 1) indicates a case of XX, and a flag being 0 indicates a case of not XX, and 1 is treated as true and 0 is treated as false in a logical negation, a logical product, and the like (the same holds true hereinafter). However, other values can be used for true values and false values in real apparatuses and methods.

Syntax elements to derive inter prediction parameters included in the coded data, for example, the PU split mode part_mode, a merge flag merge_flag, a merge index merge_idx, an inter prediction indicator inter_pred_idc, a reference picture index ref_idx_lX (refIdxLX), a prediction vector index mvp_lX_idx, and a difference vector mvdLX.

REFERENCE PICTURE LIST

A reference picture list is a list constituted by reference pictures stored in a reference picture memory 306.

Motion Vector

The motion vector mvLX indicates the amount of displacement (shift) between blocks in two different pictures. A prediction vector and a difference vector related to the motion vector mvLX are referred to as a prediction vector mvpLX and a difference vector mvdLX respectively.

Intra Prediction

Next, intra prediction prediction parameters will be described.

The intra prediction parameters are parameters used in processing of predicting a CU, based on information in the picture, and are, for example, an intra prediction mode IntraPredMode. A luminance intra prediction mode IntraPredModeY and a chrominance intra prediction mode IntraPredModeC may be different from each other. For example, 67 types of intra prediction mode are present and include planar prediction, DC prediction, and Angular (direction) prediction. The chrominance prediction mode IntraPredModeC uses, for example, any of the planar prediction, the DC prediction, the Angular prediction, a direct mode (mode using a luminance prediction mode), and a CCLM prediction (mode for linear prediction from luminance pixels). Whether the CCLM prediction is applicable is indicated using SPS, PPS, or cclm_enabled_flag in the slice header.

The luminance intra prediction mode IntraPredModeY may be derived by using a MPM (Most Probable Mode) candidate list including an intra prediction mode estimated to have a high probability of being applied to the target block, and derived by using an REM, which is a prediction mode not included in the MPM candidate list. Which method is to be used is notified using a flag prev_intra_luma_pred_flag, and in the former case, IntraPredModeY is derived by using the MPM candidate list derived from an index mpm_idx and the intra prediction mode for neighboring blocks. In the latter case, the intra prediction mode is derived by using a flag rem_selected_mode_flag and modes rem_selected_mode and rem_non_selected_mode.

Figure 4:
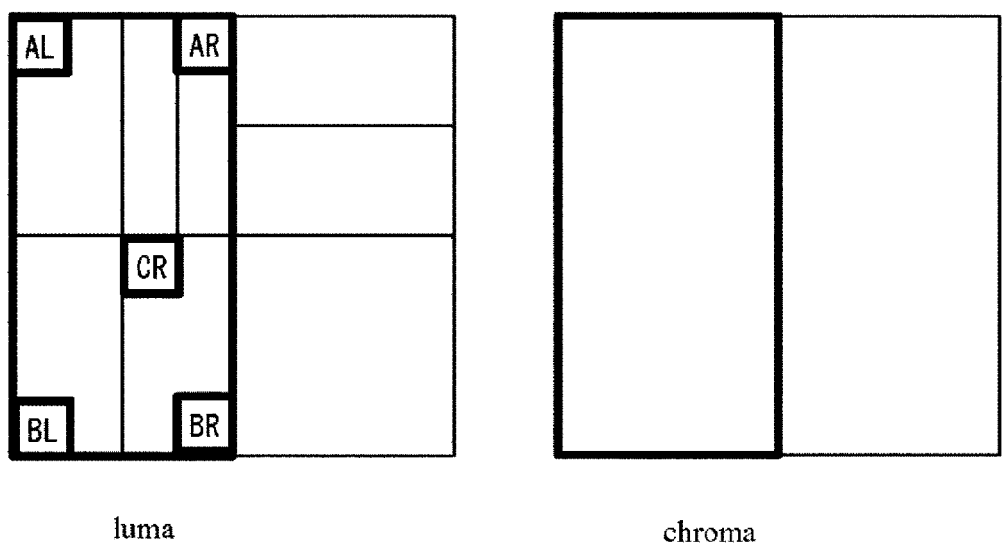
FIG. 4 is a diagram illustrating DM prediction according to the present embodiment.

The chrominance intra prediction mode IntraPredModeC may use the CCLM prediction or the MPM list mode. In a case that the CCLM prediction is available (CCLM applicable, cclm_enabled_flag=1), a flag cclm_flag indicating whether to use the CCLM prediction or not is decoded. In a case that cclm_flag is 1, a CCLM mode is used, and furthermore an index indicating which the CCLM mode is used (SMLM mode or MMLM mode) is decoded. In a case that cclm_flag has a value of 0, a chrominance MPM list is generated, and an index mpm_index_chroma in the MPM list is decoded. The chrominance MPM list uses a DM intra mode in the DM mode (direct mode), a default intra mode, a neighboring intra mode for color-difference neighboring blocks of the target block, a derivation intra mode that is an intra mode corresponding to the neighboring intra mode to which a prescribed value is added, and the like. For example, an intra prediction mode used in luminance blocks corresponding to the target block is used as the DM intra mode. For example, as illustrated in FIG. 4, center (CR), top left (AL), top right (AR), bottom left (BL), and bottom right (BR) are used. For the default intra mode, planar, DC, vertical, horizontal, and top left are used. For the neighboring intra mode uses the left, top, bottom left, top right, and top left neighboring blocks. Derivation of the chrominance intra mode by using the luminance intra mode (DM intra mode) is referred to as a DM prediction.

Loop Filter

A loop filter is a filter provided in a coding loop to eliminate block noise and ringing noise to improve image quality. Examples of the loop filter primarily include a deblocking filter, a Sample Adaptive Offset (SAO), and an Adaptive Loop Filter (ALF).

Entropy Coding

Entropy coding includes a method of performing variable-length coding on a syntax using a context (probability model) that is adaptively selected depending on the type of the syntax or the surrounding situation and a method of performing variable-length coding on a syntax by using a prescribed table or a calculation expression. In the former CABAC (Context Adaptive Binary Arithmetic Coding), an updated probability model for each coded or decoded picture is stored in a memory. Then, in P pictures or B pictures using a subsequent inter prediction, in the initial state of the context of a target picture, probability models for pictures using quantization parameters with the same slice type and the same slice level are selected from among the probability models stored in the memory and used for coding and decoding processing.

Configuration of Image Decoding Apparatus

Figure 3:
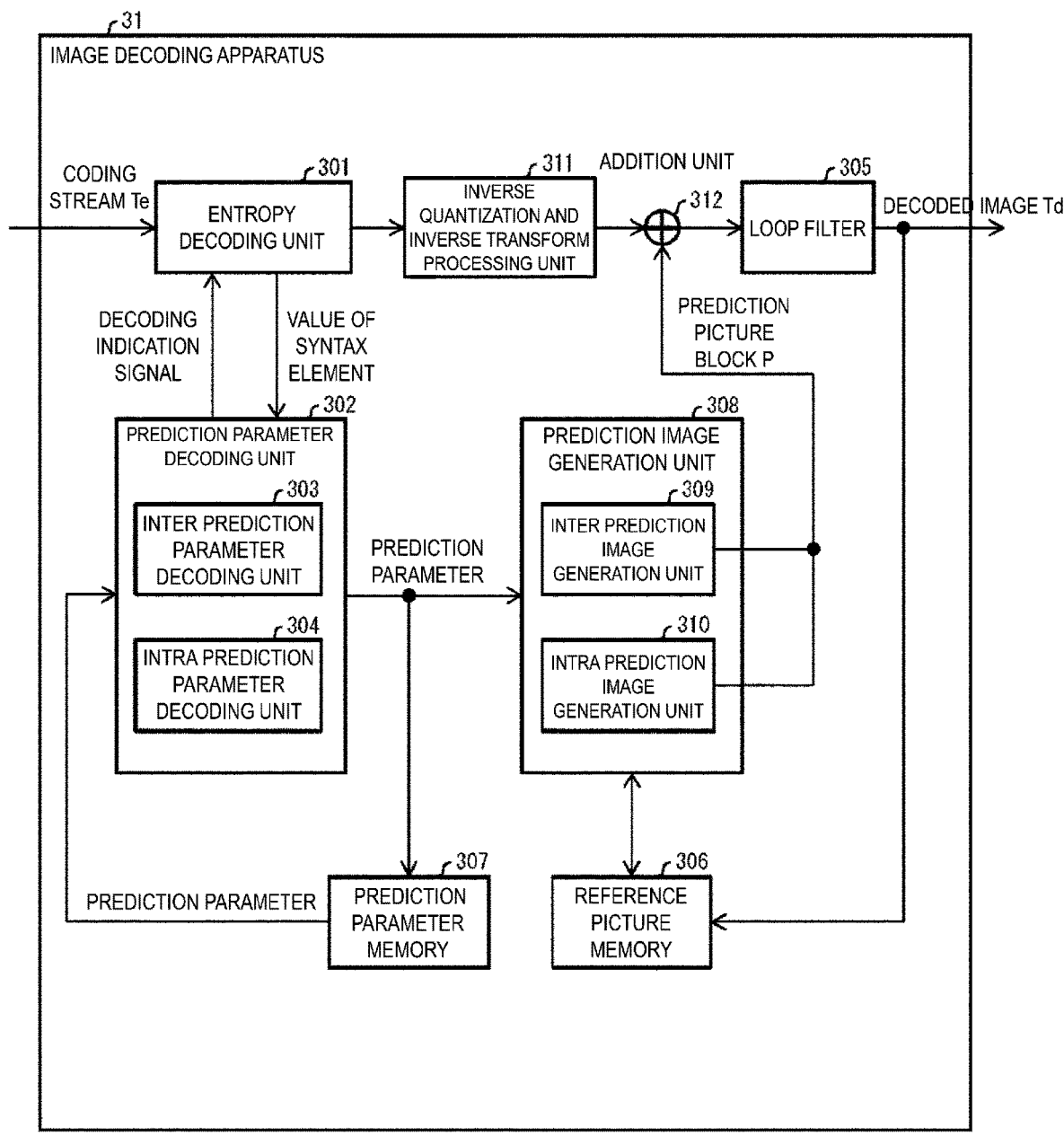
FIG. 3 is a diagram illustrating a configuration of an image decoding apparatus according to the present embodiment.

A configuration of an image decoding apparatus 31 will be described. As an example, the configuration of the image decoding apparatus 31 will be described below by using FIG. 3. FIG. 3 is a block diagram illustrating the configuration of the image decoding apparatus 31. The image decoding apparatus 31 includes an entropy decoding unit 301, a prediction parameter decoding unit (a prediction image decoding apparatus or CT information decoding unit 10) 302, a loop filter 305, a reference picture memory 306, a prediction parameter memory 307, a prediction image generation unit (prediction image generation device) 308, an inverse quantization and inverse transform processing unit 311, and an addition unit 312. Note that the loop filter 305 may be omitted from the image decoding apparatus 31 in conformity to an image coding apparatus 11 described below.

The prediction parameter decoding unit 302 includes an inter prediction parameter decoding unit 303 and an intra prediction parameter decoding unit 304. The prediction image generation unit 308 includes an inter prediction image generation unit 309 and an intra prediction image generation unit 310 (intra predictor).

In addition, in an example described below, CTUs, CUs, PUs, and TUs are used as processing units. However, no limitation to this example is intended, and units of CUs may be used for processing instead of units of TUs or PUs. Alternatively, the CTUs, CUs, PUs, and TUs may be replaced with blocks, and processing may be performed in units of blocks.

The entropy decoding unit 301 performs entropy decoding on the coding stream Te input from the outside, and separates and decodes individual codes (syntax elements). Separated codes include prediction parameters for generating a prediction image, residual information for generating a difference image, and the like.

The entropy decoding unit 301 outputs a part of the separated codes to the prediction parameter decoding unit 302. For example, the part of the separated codes includes a prediction mode predMode (pred_mode_flag or CuPredMode), a PU split mode part_mode, a merge flag merge_f-lag, a merge index merge_idx, an inter prediction indicator inter_pred_idc, a reference picture index ref_idx_IX, a prediction vector index mvp_IX_idx, and a difference vector mvdLX. The control of which code to decode is performed based on an indication from the prediction parameter decoding unit 302. The prediction mode takes MODE_INTRA (=0) or MODE_INTER (=1), for example. The entropy decoding unit 301 outputs a quantization transform coefficient to the inverse quantization and inverse transform processing unit 311. The quantization transform coefficient is a coefficient obtained by performing, in the coding processing, a frequency transform such as Discrete Cosine Transform (DCT), Discrete Sine Transform (DST), or Karyhnen Loeve Transform (KLT) on a residual signal for quantization. The inverse quantization and inverse transform processing unit 311 may further include a cross component residual predictor 1793 that predicts and decodes residuals and that performs addition and subtraction on the decoded residuals.

Adaptive Core Conversion

In addition to the inverse transform described above, the inverse quantization and inverse transform processing unit 311 can restore prediction residuals D by using an adaptive core transform (Adaptive Multiple Core Transform: AMT) adaptively selected in accordance with the intra/inter prediction method, a block size, and a luminance/chrominance signal, and a Secondary Transform corresponding to a transform selected in the intra prediction mode.

In the inverse quantization and inverse transform processing unit 311, the method for transform can be switched adaptively, and the transform switched by an explicit flag or index, prediction mode, and the like is referred to herein as an adaptive core transform. The transform used in the adaptive core transform (core transform) is a separable transform including a vertical transform and a horizontal transform. Transform bases for the core transform are DCT2, DST7, DCT8, DCT1, and DCT5. In the adaptive core transform, the transform basis is independently switched for the vertical transform and for the horizontal transform. Note that the selectable transforms are not limited to the transforms described above, and another transform (transform basis) can be used. The adaptive core transform refers to the AMT flag (amt_flag) decoded from the coded data and switches between a fixed transform without indexed switching, and a selective transform with indexed switching. For amt_flag=0, the fixed transform is used, and for amt_flag=1, the selective transform is used. In the fixed transform (amt_flag=0), the AMT index amt_idx is not referred to, and transform is performed by using the fixed transform, in this case, DCT2 or DST7. In the selective transform (amt_flag=1), the AMT index amt_idx used for selection is further decoded from the coded data, and the transform is switched according to the prediction mode and the AMT index amt_idx. For example, the following switching is performed in the intra prediction according to amt_idx.

{DST7, DST1}

In addition, switching based on amt_idx may be changed depending on the intra prediction mode as follows.

{DST7, DCT8} or {DST7, DCT5}

In the inter prediction, {DST7, DCT8} switching is performed.

The inter prediction parameter decoding unit 303 decodes an inter prediction parameter with reference to a prediction parameter stored in the prediction parameter memory 307, based on a code input from the entropy decoding unit 301. The inter prediction parameter decoding unit 303 outputs a decoded inter prediction parameter to the prediction image generation unit 308, and also stores the decoded inter prediction parameter in the prediction parameter memory 307. Details of the inter prediction parameter decoding unit 303 will be described later.

The intra prediction parameter decoding unit 304 decodes an intra prediction parameter with reference to a prediction parameter stored in the prediction parameter memory 307, based on a code input from the entropy decoding unit 301. The intra prediction parameter is a parameter used in a processing to predict a CU in one picture, for example, an intra prediction mode IntraPredMode. The intra prediction parameter decoding unit 304 outputs a decoded intra prediction parameter to the prediction image generation unit 308, and also stores the decoded intra prediction parameter in the prediction parameter memory 307.

Figure 7:
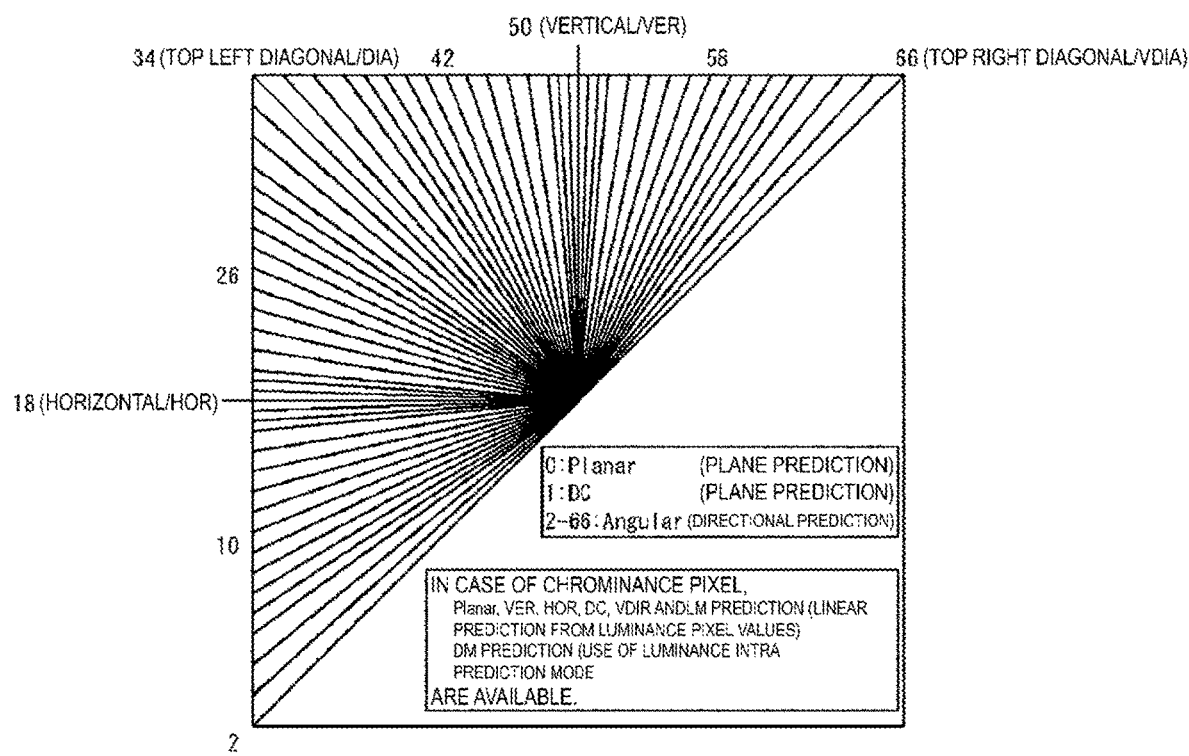
FIG. 7 is a diagram illustrating an intra prediction mode according to the present embodiment.

The intra prediction parameter decoding unit 304 may derive different intra prediction modes depending on luminance and chrominance. In this case, the intra prediction parameter decoding unit 304 decodes a luminance prediction mode IntraPredModeY as a prediction parameter of luminance, and decodes a chrominance prediction mode IntraPredModeC as a prediction parameter of chrominance. The luminance prediction mode IntraPredModeY includes 67 modes, and corresponds to a Planar prediction (0), a DC prediction (1), and Angular (directional) predictions (2 to 66). The chrominance prediction mode IntraPredModeC uses any of the Planar prediction (0), the DC prediction (1), the Angular (directional) predictions (2 to 66), and CCLM predictions (67 to 72). The intra prediction parameter decoding unit 304 decodes a flag indicating whether the chrominance prediction is a CCLM prediction or not, and in a case that the flag indicates a Cross Component Linear Model prediction (CCLM prediction), decodes information related to the CCLM prediction (information indicating whether the chrominance prediction is an MMLM prediction or not and information indicating a downsampling method). Here, the CCLM prediction will be described. The CCLM prediction is a prediction scheme using a correlation between a luminance component and a color component, and is a method for generating a prediction image for a chrominance image (Cb, Cr) by using a linear model based on the decoded luminance image. The CCLM prediction may include a Single Model Linear Model (SMLM) prediction and a Multiple Model Linear Model (MMLM) prediction. The SMLM prediction is a prediction scheme using, for one block, one linear model for predicting a chrominance from luminance. The MMLM prediction is a prediction scheme using, for one block, two or more linear models for predicting chrominance from luminance. In a case that the chrominance format is 4:2:0, the luminance image is downsampled to have the same size as that of the chrominance image, for creating a linear model. This down-sampling method may include a method of using a fixed sampling filter (default sampling filter) and a method of adaptively switching between multiple sampling filters (additional sampling filters) for use. Here, information indicating a down-sampling method is obtained by decoding information indicating whether the CCLM prediction is an SMLM prediction or an MMLM prediction and information indicating whether the sampling filter is a default sampling filter or not, and also decoding an index indicating the sampling filter in a case that the additional sampling filter is used. In a case that the flag indicates a prediction different from the CCLM prediction, the Planar prediction (0), DC prediction (1), Angular prediction (2 to 66), and DM prediction (chrominance prediction using the same prediction mode as the luminance prediction mode) are decoded as IntraPredModeC. FIG. 7 is a diagram illustrating an intra prediction mode. The direction of each of straight lines corresponding to 2 to 66 in FIG. 7 represents a prediction direction, and to be more exact, indicates the direction of a pixel in a reference region R (described below) to which a prediction target pixel refers. FIG. 4 is a diagram illustrating the DM mode.

The loop filter 305 applies filters such as a deblocking filter 313, a sample adaptive offset (SAO) 314, and an adaptive loop filter (ALF) 315 to a decoded image of a CU generated by the addition unit 312. Note that the loop filter 305 need not necessarily include the three types of filters as long as the loop filter 305 is paired with the image coding apparatus 11, and may exclusively include the deblocking filter 313, for example.

The reference picture memory 306 stores the decoded image of the CU generated by the addition unit 312 in a prescribed position for each picture to be decoded and for each CTU or CU.

The prediction parameter memory 307 stores a prediction parameter in a prescribed position for each picture and prediction unit (or a subblock, a fixed size block, and a pixel) of a decoding target. Specifically, the prediction parameter memory 307 stores an inter prediction parameter decoded by the inter prediction parameter decoding unit 303, an intra prediction parameter decoded by the intra prediction parameter decoding unit 304 and a prediction mode predMode separated by the entropy decoding unit 301. For example, stored inter prediction parameters include a prediction list utilization flag predFlagLX (the inter prediction indicator inter_pred_idc), the reference picture index refIdxLX, and the motion vector mvLX.

To the prediction image generation unit 308, a prediction mode predMode input from the entropy decoding unit 301 is input, and a prediction parameter is input from the prediction parameter decoding unit 302. The prediction image generation unit 308 reads a reference picture from the reference picture memory 306. The prediction image generation unit 308 generates a prediction image of a PU (block) or a subblock in a prediction mode indicated by the prediction mode predMode, by using an input prediction parameter and a read reference picture (reference picture block).

Here, in a case that the prediction mode predMode indicates an inter prediction mode, the inter prediction image generation unit 309 generates the prediction image of the PU (block) or the subblock by an inter prediction by using the inter prediction parameter input from the inter prediction parameter decoding unit 303 and the read reference picture (reference picture block).

For a reference picture list (an L0 list or an L1 list) where a prediction list utilization flag predFlagLX is 1, the inter prediction image generation unit 309 reads a reference picture block from the reference picture memory 306 in a position indicated by a motion vector mvLX, based on a decoding target PU from reference pictures indicated by the reference picture index refIdxLX. The inter prediction image generation unit 309 performs interpolation based on the read reference picture block to generate a prediction image of the PU (interpolation image or motion compensation image). The inter prediction image generation unit 309 outputs the generated prediction image of the PU to the addition unit 312. Here, the reference picture block is a set of pixels (referred to as blocks because the set is normally rectangular) on a reference picture, and is a region that is referred to, to generate the prediction image of the PU or the subblock.

In a case that the prediction mode predMode indicates an intra prediction mode, the intra prediction image generation unit 310 performs an intra prediction by using an intra prediction parameter input from the intra prediction parameter decoding unit 304 and a read reference picture. Specifically, the intra prediction image generation unit 310 reads an adjacent PU, which is a picture of a decoding target, in a prescribed range from a decoding target PU among PUs already decoded, from the reference picture memory 306. The prescribed range is, for example, any of adjacent PUs in left, top left, top, and top right in a case that a decoding target PU moves in order of so-called raster scan sequentially, and varies according to intra prediction modes. The order of the raster scan is an order to move sequentially from the left edge to the right edge in each picture for each row from the top edge to the bottom edge.

The intra prediction image generation unit 310 performs a prediction in a prediction mode indicated by the intra prediction mode IntraPredMode, based on a read neighboring PU, to generate a prediction image of the PU. The intra prediction image generation unit 310 outputs the generated prediction image of the PU to the addition unit 312.

In a case that the intra prediction parameter decoding unit 304 derives different intra prediction modes for luminance and chrominance, the intra prediction image generation unit 310 generates a prediction image of a luminance PU by any of the Planar prediction (0), the DC prediction (1), and the Angular predictions (2 to 66) depending on the luminance prediction mode IntraPredModeY, and generates a prediction image of a chrominance PU by any of the Planar prediction (0), the DC prediction (1), the Angular predictions (2 to 66), and CCLM modes (67 to 72) depending on the chrominance prediction mode IntraPredModeC.

In the Planar prediction, DC prediction, and Angular prediction, a decoded peripheral region neighboring (proximate to) the prediction target block is configured as the reference region R. In general, these prediction modes are prediction schemes for generating a prediction image by extrapolating the pixels in the reference region R in a particular direction. For example, the reference region R can be configured as an inverse L-shaped region including the left and top blocks (or further top left, top right, and bottom left blocks) of the prediction target block.

Details of Prediction Image Generation Unit

Now, the configuration of the intra prediction image generation unit 310 will be described in detail using FIG. 10.

Figure 10:
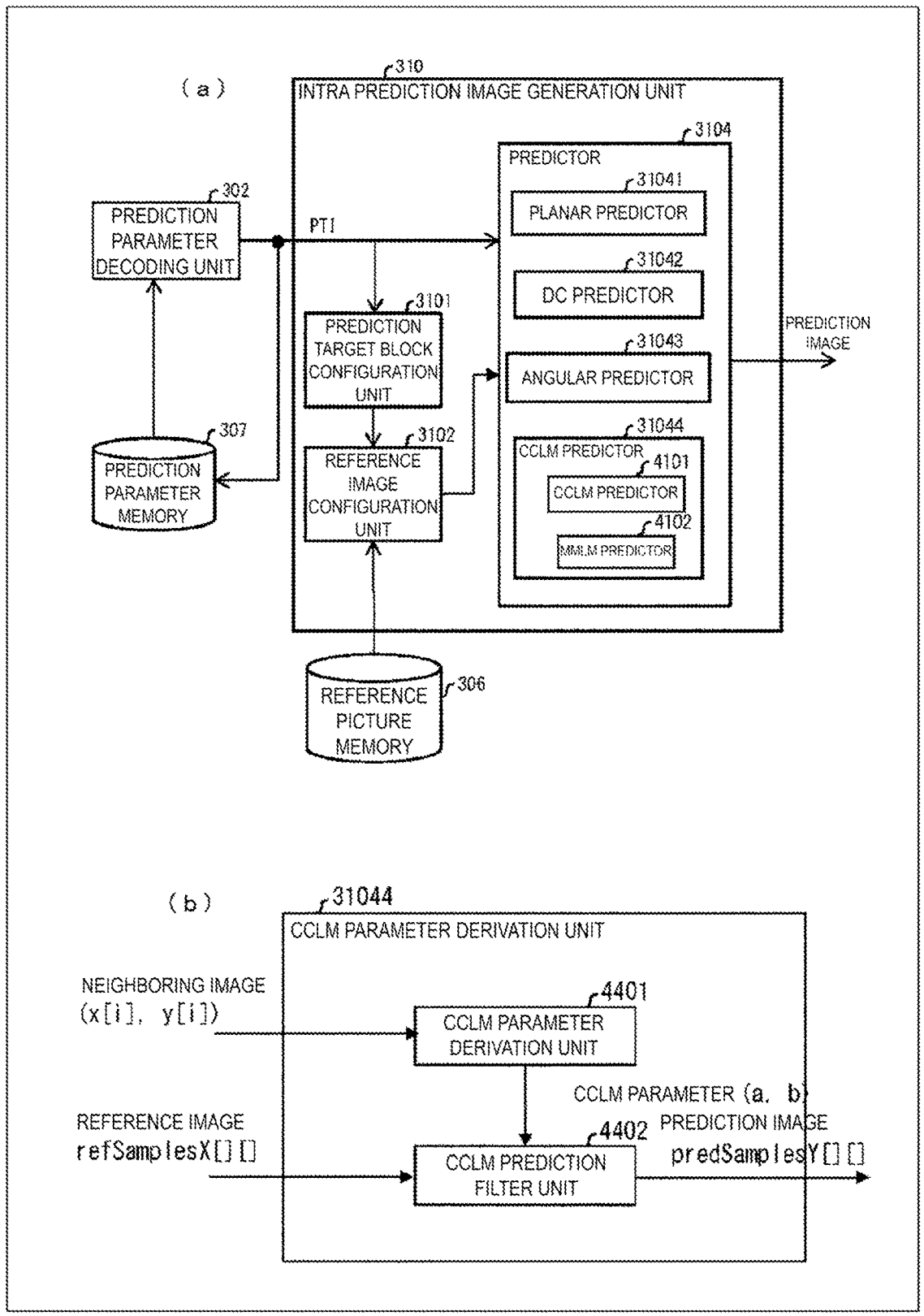
FIG. 10 is a block diagram illustrating a configuration of an intra prediction image generation unit 310 according to the present embodiment.

As illustrated in FIG. 10, the intra prediction image generation unit 310 includes a prediction target block configuration unit 3101, a reference image configuration unit 3102, and a predictor 3104.

The prediction target block configuration unit 3101 configures the target CU as a prediction target block. The reference image configuration unit 3102 outputs each reference pixel in the input reference region R to the predictor 3104. Based on the input intra prediction mode and reference image, the predictor 3104 generates a prediction image of the prediction target block and outputs the generated image to an adder 15.

Hereinafter, the units of the intra prediction image generation unit 310 will be described.

Prediction Target Block Configuration Unit 3101

The prediction target block configuration unit 3101 configures the target CU as a prediction target block, and outputs information related to the prediction target block (prediction target block information). The prediction target block information includes at least information indicating a prediction target block size, a prediction target block position, and whether the prediction target block is of luminance or chrominance.

REFERENCE IMAGE CONFIGURATION UNIT 3102

The reference image configuration unit 3102 configures a peripheral region neighboring the prediction target block as the reference region R, based on the prediction target block size and prediction target block position in the prediction target block information. Subsequently, for each of the pixel values (boundary pixels) in the reference region R, a decoded pixel value at the corresponding position on the reference picture memory 306 is set. In other words, a reference image r[x][y] is set by the following expressions using a decoded pixel value u[px][py] for the target picture expressed based on the upper left coordinates of the target picture.

$$r[x][y]=u[xB+x][yB+y] \qquad \text{(Expression INTRAP-1)}$$

$$x=-1, y=-1 \ldots (BS*2-1) \text{ and } x=0 \ldots (BS*2-1),$$
$$y=-1$$

Here, (xB, yB) denotes the upper left coordinate of the prediction target block, and BS denotes the larger value of the width W and height H of the prediction target block.

Configuration of Predictor 3104

The predictor 3104 generates a prediction image of the prediction target block, based on the intra prediction mode and the reference image, and outputs the generated prediction image to the adder 15. The predictor 3104 internally includes a Planar predictor 31041, a DC predictor 31042, an Angular predictor 31043, and a CCLM predictor 31044. The predictor 3104 may further include a palette predictor 31045. The predictor 3104 selects a specific predictor depending on the input intra prediction mode, and inputs a reference image. The relationship between the intra prediction modes and the corresponding predictors is as follows.

Planar prediction . . . Planar predictor 31041
DC prediction . . . DC predictor 31042
Angular prediction . . . Angular predictor 31043
CCLM prediction . . . CCLM predictor 31044
Palette prediction . . . palette predictor 31045

Planar Prediction

The Planar predictor 31041 linearly adds multiple reference images filtered by the reference image configuration unit 3102 according to the distance between the prediction target pixel position and the reference pixel position, and further performs correction using a reference image not filtered by the reference image configuration unit 3102 to generate a prediction image.

DC Prediction

The DC predictor 31042 derives an average value (DC predicted value) of the input reference image filtered by the input reference image configuration unit 3102, and outputs a prediction image with the derived DC predicted value as a pixel value.

Angular Prediction

The Angular predictor 31043 generates a prediction image using the reference image in the prediction direction (reference direction) indicated by the intra prediction mode, the reference image being filtered by the reference image configuration unit 3102.

CCLM Prediction

FIG. 10(b) is a block diagram illustrating an example of a configuration of the CCLM predictor 31044. The CCLM predictor 31044 includes a CCLM parameter derivation unit 4401 and a CCLM prediction filter unit 4402.

The CCLM parameter derivation unit 4401 derives a CCLM prediction parameter by using, as an input signal, a pixel value (x[i], y[i], i=0, . . . , N) of a processed image neighboring the target block. The CCLM parameter derivation unit 31044 outputs the derived CCLM prediction parameter (a, b) to the CCLM prediction filter unit 4402. Note that the pixel value x[i] indicates the value of a luminance pixel (Luma) in a region neighboring the target block, and the pixel value y[i] indicates the value of a chrominance pixel (Cb, Cr) in a region neighboring the target block.

The CCLM prediction filter unit 4402 performs a CCLM prediction on a luminance decoded image refSamplesX[ ][ ] of the target block, which is an input signal, to generate a chrominance prediction image predSamplesY[ ][ ] of the target block (where Y denotes Cb and Cr). In other words, the CCLM prediction filter unit 4402 generates the prediction image predSamplesY[ ][ ] from the reference image refSamplesX[ ][ ], which is an input signal.

Based on the input reference pixels x[ ] and the target reference pixels y[ ] of these neighboring blocks, the CCLM parameter derivation unit 4401 derives a parameter for a case where the target reference pixel y[ ] is linearly predicted from the input reference pixel x[ ], as a CCLM prediction parameter (a, b) to be applied to the target block.

Specifically, the CCLM parameter derivation unit 4401 derives, by a least squares method, the CCLM prediction parameter (a, b) that minimizes a cost E of a least squared error represented by the following expression. Note that in the following description, $\Sigma(x)$ means a sum of x ranging from 0 to N−1.

$$E=\Sigma(y[i]-a^*x[i]-b)^2$$

The CCLM prediction parameter (a, b) is derived by the following expressions.

$$a=(N^*\Sigma x[i]y[i]-\Sigma x[i]\Sigma y[i])/(N^*\Sigma(x[i]x[i])-\Sigma x[i]\Sigma x[i])$$

$$=a1/a2=((a1^*\text{invTable}[a2]+\text{roundInv})\text{>>shiftInv})$$

$$b=(\Sigma y[i]-\Sigma x[i]^*a)/N$$

More specifically, the following processing is performed for integer calculation.

First, X, Y, XX, and YY are derived by the following expressions:

$$X=\Sigma x[i]$$

$$Y=\Sigma y[i]$$

$$XX=\Sigma(x[i]^*x[i])$$

$$XY=\Sigma(y[i]^*y[i])$$

Then, a count shift value iCountShift is calculated by the following expression.

Note that N is the number of pixels in the reference region.

$$i\text{CountShift}=\log 2(N)$$

Then, a first parameter a1 and a second parameter a2 are derived by the following expressions.

$$\text{ave}X=X\text{>>}i\text{CountShift}$$

$$\text{rem}X=X-\text{ave}X$$

$$\text{ave}Y=Y\text{>>}i\text{CountShift}$$

$$\text{rem}X=Y-\text{ave}Y$$

$$a1=XY-(\text{ave}Y^*\text{ave}X)\text{<<}i\text{CountShift})+(\text{ave}X^*\text{rem}Y)+(\text{ave}Y^*\text{rem}X)$$

$$a2=XX-((\text{ave}X^*\text{ave}X)\text{<<}i\text{CountShift})+2^*(\text{ave}X^*\text{rem}X)$$

Then, a table invTable is utilized to derive a1/a2.

$$a=a1/a2=(a1^*\text{invTable}[a2]+\text{roundInv})\text{>>shiftInv}$$

$$b=(Y-X^*a)\text{>>}i\text{CountShift}$$

The CCLM prediction filter unit 4402 uses, as an input signal, a reference image refSamplesLuma related to luminance to derive chrominance signals Cb and Cr for prediction images, based on Expressions (24) and (25) below respectively using prediction parameters (a, b) and (a', b'). The CCLM prediction filter unit 4402 outputs the chrominance signals Cb and Cr as prediction images related to chrominance predSamplesCb and predSamplesCr.

$$\text{predSamplesCb}=(a^*\text{refSamplesLuma})\text{>>shift}+b \quad \text{Expression (24)}$$

$$\text{predSamplesCr}=(a'^*\text{refSamplesLuma})\text{>>shift}+b' \quad \text{Expression (25)}$$

Here, (a, b) is a CCLM prediction parameter for the chrominance Cb (in a case that y[i] is Cb), and (a', b') is a CCLM prediction parameter for the chrominance Cr (if y[i] is Cr).

Configuration of Image Decoding Apparatus

Figure 6:
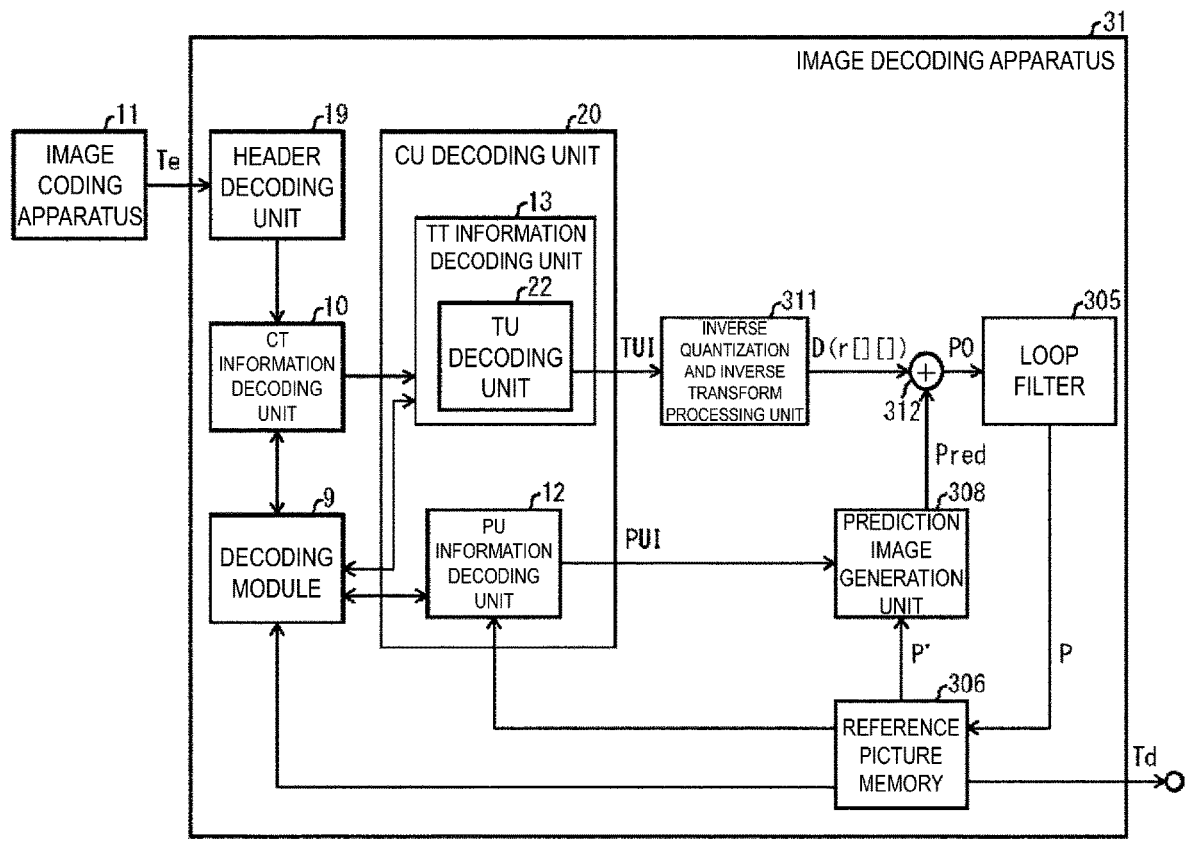
FIG. 6 is a block diagram illustrating a configuration of an image decoding apparatus according to an embodiment of the present invention.

FIG. 6 illustrates a block diagram illustrating a configuration of the image decoding apparatus according to the present embodiment. In FIG. 6, for the sake of simplifying the drawing, some members included in the block diagram illustrated in FIG. 6 are omitted. For the sake of convenience of description, members having the same functions as those of the members illustrated in FIG. 3 are denoted by the same reference signs, and descriptions of the members are omitted.

As illustrated in FIG. 6, the image decoding apparatus 31 includes a decoding module 9, a CT information decoding unit 10, a prediction image generation unit 308, an inverse quantization and inverse transform processing unit 311, a reference picture memory 306, an addition unit 312, a loop filter 305, a header decoding unit 19, and a CU decoding unit 20 (prediction mode decoding unit). The CU decoding unit 20 further includes a PU information decoding unit 12 and a TT information decoding unit 13. The TT information decoding unit 13 further includes a TU decoding unit 22.

Decoding Module

General operation of each module will now be described. The decoding module 9 performs decoding processing of decoding syntax values from binary data. More specifically, the decoding module 9 decodes syntax values coded by an entropy coding scheme such as CABAC, based on coded data and a syntax type supplied from sources of supply. Then, the decoding module 9 returns decoded syntax values to the sources of supply.

In the example given below, sources of supply of coded data and a syntax type are the CT information decoding unit 10 and the CU decoding unit 20 (the PU information decoding unit 12 and the TT information decoding unit 13) (prediction unit decoding unit). The prediction parameter decoding unit 302 in FIG. 3 corresponds to the CU decoding unit 20 and the PU information decoding unit 12.

Basic Flow

Figure 5:
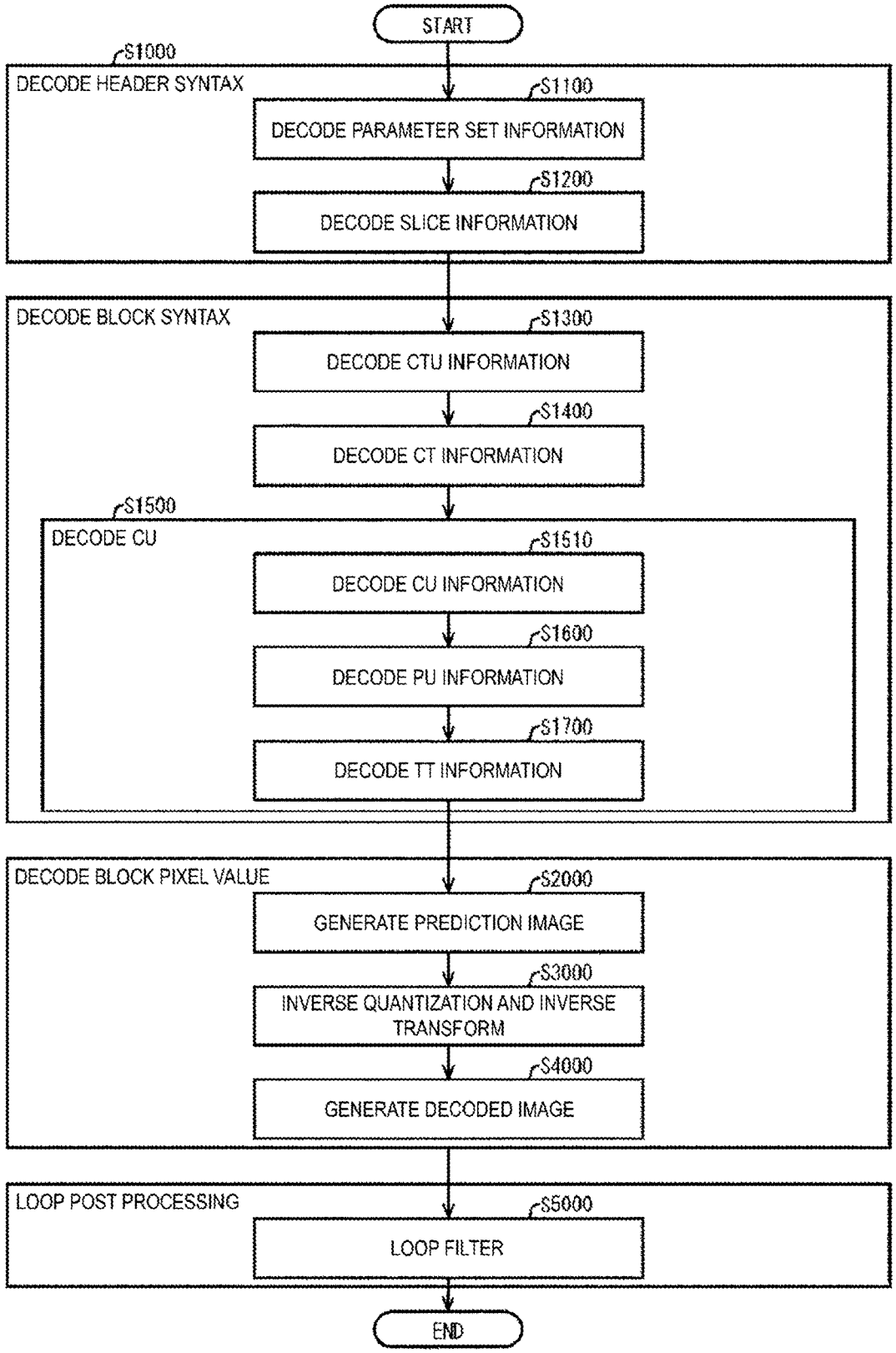
FIG. 5 is a flowchart illustrating general operation of an image decoding apparatus 31 according to an embodiment of the present invention.

FIG. 5 is a flowchart illustrating general operation of the image decoding apparatus 31.

(S1100: Decode parameter set information) The header decoding unit 19 decodes parameter set information such as VPS, SPS, and PPS from coded data.

(S1200: Decode slice information) The header decoding unit 19 decodes the slice header (slice information) from the coded data.

Hereinafter, the image decoding apparatus 31 repeats the processing from S1300 to S5000 on each CTU included in the target picture to derive a decoded image of the CTU.

(S1300: Decode CTU information) The CT information decoding unit 10 decodes coding tree units (CTU) from the coded data.

(S1400: Decode CT information) The CT information decoding unit 10 decodes coding trees (CTs) from the coded data. For the separate coding tree, the CT information decoding unit 10 decodes multiple route coding tree nodes coding_quadtree (x0, y0, log 2CbSize, 0, comp_mode).

(S1500: Decode CUs) The CU decoding unit 20 performs S1510, S1600, and S1700 to decode coding units (CUs) from the coded data.

(S1510: Decode CU information) The CU decoding unit 20 decodes CU information from the coded data.

(S1600: Decode PU information) The PU information decoding unit 12 decodes prediction unit information (PU information PTI) from the coded data.

(S1700: Decode TT information) The TT information decoding unit 13 decodes a transform tree TT from the coded data.

(S2000: Generate prediction image) The prediction image generation unit 308 generates a prediction image Pred, based on PU information PUI for each PU included in the target CU.

(S3000: Inverse quantization and inverse transform) The inverse quantization and inverse transform processing unit 311 performs inverse quantization and inverse transform processing on each TU included in the target CU, based on the TT information TTI.

(S4000: Generate decoded image) The adder 312 generates a decoded image PO for the target CU by adding a prediction image Pred supplied by the prediction image generation unit 308 and prediction residuals D supplied by the inverse quantization and inverse transform processing unit 311.

(S5000: Loop filter) The loop filter 305 applies a loop filter such as a deblocking filter and a sample adaptive filter (SAO) to the decoded image PO to generate a decoded image P.

Decoding Module

General operation of each module will now be described. The decoding module 9 performs decoding processing of decoding syntax values from binary data. More specifically, the decoding module 9 decodes syntax values coded by an entropy coding scheme such as CABAC, based on the coded data and syntax type supplied from the sources, and returns decoded syntax values to the sources.

In the example given below, the sources of the coded data and syntax type are the CT information decoding unit 10 and the CU decoding unit 20 (the PU information decoding unit 12 and the TT information decoding unit 13).

TT Information Decoding Unit

The TT information decoding unit 13 uses the decoding module 9 to decode each TTI (such as TU split flag SP_TU (split_transform_flag) and a CU residual flag CBP_TU (cbf_cb, cbf_cr, cbf_luma), and a TU).

The TT information decoding unit 13 includes the TU decoding unit 22. In a case that a TU includes a residual, the TU decoding unit 22 decodes QP update information (quantization correction value). Note that the QP update information is a value indicating a difference value from a quantization parameter prediction value qPpred, which is a prediction value of a quantization parameter QP. The TU decoding unit 22 decodes a quantization prediction residual (residual_coding).

Processing of CT Information Decoding

Figure 8:
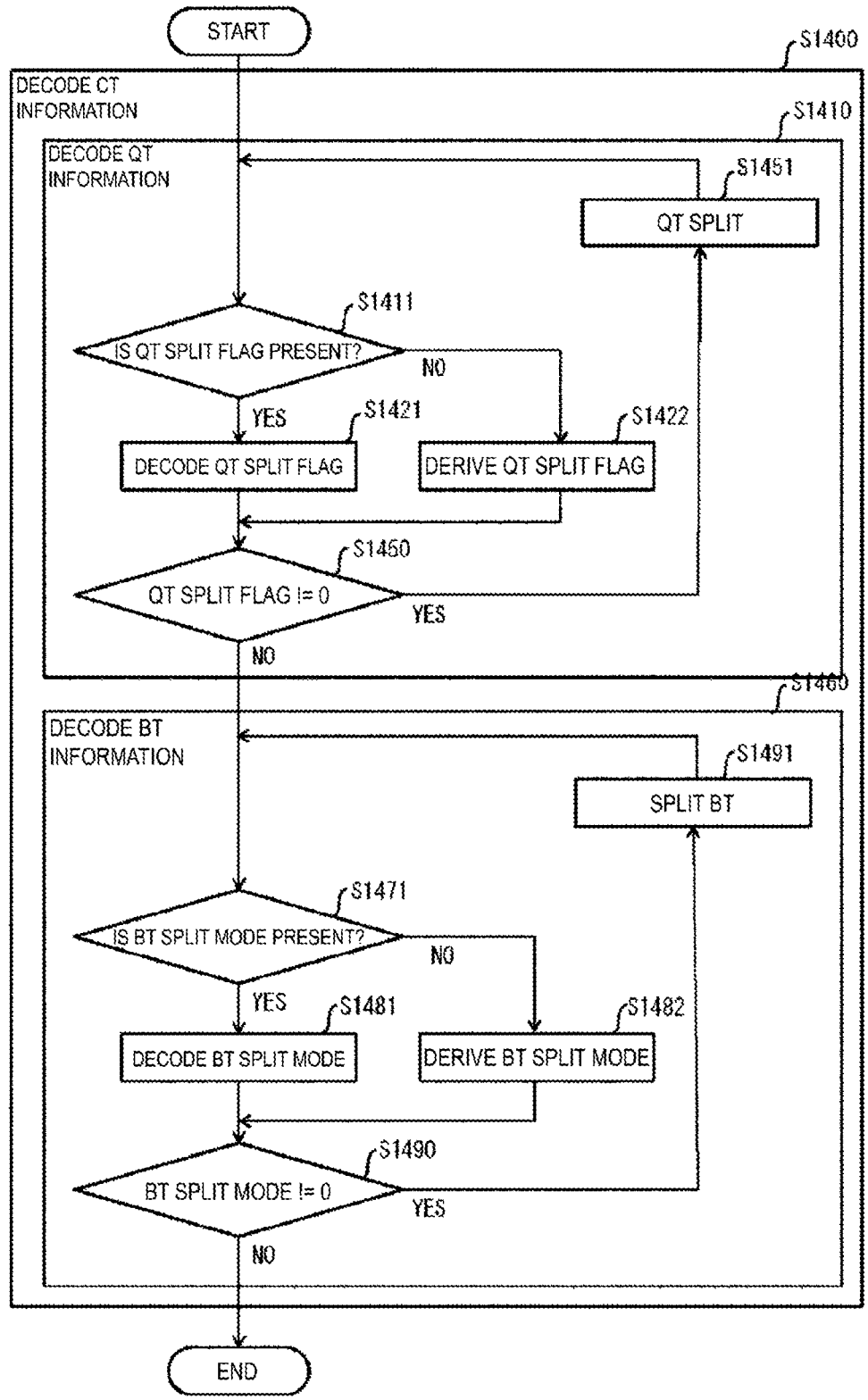
FIG. 8 is a flowchart illustrating operation of a CT information decoding unit according to an embodiment of the present invention.

Hereinafter, processing of CT information decoding will be described with reference to FIGS. 8, 9, and 11. FIG. 8 is a flowchart illustrating operation of the CT information decoding unit 10 according to an embodiment of the present invention. FIG. 9 is a diagram illustrating a configuration example of a syntax table of QT information according to an embodiment of the present invention. FIG. 11 is a diagram illustrating a configuration example of a syntax table of BT information according to an embodiment of the present invention.

First, the CT information decoding unit 10 performs CT information decoding S1400. In a case of the separate coding tree, the CT information decoding unit 10 decodes multiple root coding tree nodes coding_quadtree (x0, y0, log 2CbSize, 0, comp_mode).

In the CT information decoding S1400 performed by the CT information decoding unit 10, QT information decoding and BT information decoding are performed. The QT information decoding and the BT information decoding performed by the CT information decoding unit 10 will be described below in sequence.

The CT information decoding unit 10 decodes CT information from coded data, and recursively decodes a coding tree CT (coding_quadtree). Specifically, the CT information decoding unit 10 decodes QT information, and decodes a target coding tree coding_quadtree (x0, y0, log 2CbSize, cqtDepth, comp_mode). Note that x0, y0 represents upper left coordinates of the target coding tree. log 2CbSize represents a logarithm CT size corresponding to a logarithm to base CT size of 2 corresponding to the size of the coding tree (for example, the logarithm CT size is 6, 7, or 8 respectively in a case that the CT size is 64, 128, or 256). cqtDepth represents a CT depth (QT depth) indicating a hierarchy level of a coding tree. A logarithm value of "X" corresponding to a logarithm to base "X" of 2 is hereinafter referred to as a logarithm X size. comp_mode indicates a target color component.

(S1411) The CT information decoding unit 10 determines whether decoded CT information includes a QT split flag or not. Specifically, the CT information decoding unit 10 determines whether the logarithm CT size log 2CbSize is larger than a logarithm value MinCbLog 2SizeY of a prescribed minimum CT size or not. In a case that the logarithm CT size log 2CbSize is larger than MinCbLog 2SizeY, the CT information decoding unit 10 determines that the QT split flag is present, and the processing transitions to S1421. Otherwise the processing transitions to S1422.

(S1421) In a case of determining that the logarithm CT size log 2CbSize is larger than MinCbLog 2SizeY, the CT information decoding unit 10 decodes the QT split flag (split_cu_flag), which is a syntax element. (This corresponds to SYN1420B and SYN1421 in the syntax table)

(S1422) Otherwise (the logarithm CT size log 2CbSize is equal to or smaller than MinCbLog 2SizeY), in other words, in a case that the QT split flag split_cu_flag is not found in the coded data, the CT information decoding unit 10 omits decoding of the QT split flag split_cu_flag from the coded data, and derives the QT split flag split_cu_flag as 0.

(S1450) In a case that the QT split flag split_cu_flag has a value other than 0 (=1), then the processing transitions to S1451. Otherwise (in a case that the QT split flag split_cu_flag has a value of 0), the processing transitions to S1471. (This corresponds to SYN1450 in the syntax table)

After finishing the processing described above, the CT information decoding unit 10 performs (S1451) described below, and transitions to a hierarchy level immediately below before repeating the processing in (S1411) and subsequent processing.

(S1451) The CT information decoding unit 10 performs a QT split. Specifically, the CT information decoding unit 10 decodes four coding trees CT of the logarithm CN size log 2CbSize−1, at positions at a CT depth cqtDepth+1 (x0, y0), (x1, y0), (x0, y1), and (x1, y1). (This corresponds to SYN1451A, SYN14511B, SYN1451C, and SYN1421D in the syntax table)

coding_quadtree(x0,y0,log 2CbSize−1,cqtDepth+1, comp_mode)

coding_quadtree(x1,y0,log 2CbSize−1,cqtDepth+1, comp_mode)

coding_quadtree(x0,y1,log 2CbSize−1,cqtDepth+1, comp_mode)

coding_quadtree(x1,y1,log 2CbSize−1,cqtDepth+1, comp_mode)

Here, x0, y0 represents the upper left coordinates of a target coding tree. x1, y1 is derived by adding ½ of the CT size (1>>log 2CbSize) to (x0, y0), as in the following expressions.

$x1=x0+(1<<(\log 2CbSize-1))$ $y1=y0+(1<<(\log 2CbSize-1))$

Note that << indicates a left shift. 1<<N has the same value as 2 to the power of N (the same holds true hereinafter). Similarly, >> indicates a right shift.

Then, the CT information decoding unit 10 adds 1 to the CT depth cqtDepth indicating the hierarchy level of the coding tree and updates the logarithm CT size log 2CbSize by subtracting 1 from the logarithm CT size log 2CbSize (multiplying the CT size by ½).

cqtDepth=cqtDepth+1 log 2CbSize=log 2CbSize−1

Even in the lower coding trees CT, the CT information decoding unit 10 continues QT information decoding started at S1401, by using the updated upper left coordinates, logarithm CT size, and CT depth.

After the QT split is ended, the CT information decoding unit 10 decodes CT information from the coded data, and recursively decodes the coding tree CT (coding_binarytree). Specifically, the CT information decoding unit 10 decodes BT information, and decodes a target coding tree coding_quadtree (x0, y0, log 2CbWidth, log 2CbHeight, cqtDepth, cbtDepth, comp_mode). Note that x0, y0 represents the upper left coordinates of the target coding tree, log 2CbWidth represents the logarithm value of the width of the coding tree, log 2CbHeight represents the logarithm value of the height of the coding tree, cqtDepth represents a CT depth (QT depth) indicating the hierarchy level of the coding tree, and cbtDepth represents a CT depth (BT depth) indicating the hierarchy level of the coding tree. comp_mode indicates a target color component.

(S1471) The CT information decoding unit 10 determines whether the decoded CT information includes the BT split mode (split information) or not. Specifically, the CT information decoding unit 10 determines whether the height of the coding tree (1<<log 2CbHeight) is larger than minBTSize or the width (1<<log 2CbWidth) of the coding tree is larger than minBTSize, and the width (1<<log 2CbWidth) of the coding tree is equal to or smaller than maxBTSize, and the height of the coding tree (1<<log 2CbHeight) is equal to or smaller than maxBTSize, and cbtDepth is smaller than maxBTDepth. minBTSize is the minimum BT size (minimum size of a leaf node of a binary tree), maxBTSize is the maximum BT size (maximum size of a root node of the binary tree), and maxBTDepth is the maximum BT depth (maximum value of depth of the binary tree).

In a case that the condition described above is satisfied, the CT information decoding unit 10 determines that the BT split mode is present and transitions to S1481. Otherwise the processing transitions to S1482.

(S1481) In a case that the condition described above is satisfied, the CT information decoding unit 10 decodes the BT split mode split_bt_mode[x0][y0], which is a syntax element. (This corresponds to SYN1471 in the syntax table)

(S1482) Otherwise (in a case that the above-described condition is not satisfied), in other words, in a case that the BT split mode split_bt_mode [x0][y0] does not appear in the coded data, the CT information decoding unit 10 omits decoding of the BT split mode split_bt_mode [x0][y0] from the coded data and derives the BT split mode split_bt_mode [x0][y0] as 0.

(S1490) The CT information decoding unit 10 transitions to S1491 in a case that the BT split mode split_bt_mode [x0][y0] has a value other than 0 (=1 or 2, split_bt_flag [x0][y0] is other than 0). Otherwise (in a case that the BT split mode split_bt_mode [x0][y0] is 0), the CT information decoding unit 10 ends the processing without splitting the target coding tree.

Subsequently, the CT information decoding unit 10 performs (S1491) described below, and transitions to a hierarchy level immediately below before repeating the processing in (S1471) and subsequent processing.

(S1491) The CT information decoding unit 10 performs a BT split. Specifically, in a case that the BT split mode split_bt_mode [x0][y0] is 1, the CT information decoding unit 10 decodes two coding trees CT with a value of logarithmic width of log 2CbWidth and a value of logarithmic height of log 2CbHeight−1 at the positions (x0, y0) and (x0, y1) at the CT depth cbtDepth+1. (This corresponds to SYN1481A, SYN1491A, and SYN1491B in the syntax table)

coding_binarytree (x0, y0, log 2CbWidth, log 2CbHeight−1, cqtDepth, cbtDepth+1, comp_mode)

coding_binarytree (x0, y1, log 2CbWidth, log 2CbHeight−1, cqtDepth, cbtDepth+1, comp_mode)

On the other hand, in a case that the BT split mode split_bt_mode [x0][y0] is 2, the CT information decoding unit 10 decodes two coding trees CT with a value of logarithmic width of log 2CbWidth−1 and a value of logarithmic height of log 2CbHeight at the positions (x0, y0) and (x1, y0) at the CT depth cbtDepth+1. (This corresponds to SYN1481B, SYN1491C, and SYN1491D in the syntax table)

coding_binarytree (x0, y0, log 2CbWidth−1, log 2CbHeight, cqtDepth, cbtDepth+1, comp_mode)

coding_binarytree (x1, y0, log 2CbWidth−1, log 2CbHeight, cqtDepth, cbtDepth+1, comp_mode)

Here, x0, y0 represents the upper left coordinates of the target coding tree. x1, y1 is derived by adding, to (x0, y0), ½ of (1<<log 2CbWidth) and ½ of (1<<log 2CbHeight) as in the following expressions.

$x1=x0+(1<<(\log 2CbWidth-1))$ $y1=y0+(1<<(\log 2CbHeight-1))$

Note that << indicates a left shift. 1<<N has the same value as 2 to the power of N (the same holds true hereinafter). Similarly, >> indicates a right shift.

Then, the CT information decoding unit 10 adds 1 to the CT depth cbtDepth indicating the hierarchy level of the coding tree, and updates log 2CbWidth or log 2CbHeight by subtracting 1 from log 2CbWidth or log 2CbHeight.

cbtDepth=cbtDepth+1 log 2CbWidth=log 2CbWidth−1, or log 2CbHeight=log 2CbHeight−1

The CT information decoding unit 10 also uses the updated upper left coordinates, logarithmic values of the CT width and height, and BT hierarchy level to continue BT information decoding coding_binarytree started at S1471 (x0, y0, log 2CbWidth, log 2CbHeight, cqtDepth, cbtDepth, comp_mode) in the lower coding trees CT.

In a case that the BT split mode split_bt_mode[x0][y0] is 0, that is, in a case that neither a QT split nor a BT split is performed, the CT information decoding unit 10 uses the CU decoding unit 20 to decode the coding unit CU (coding_unit (x0, y0, log 2CbWidth, log 2CbHeight)).

Figure 12:
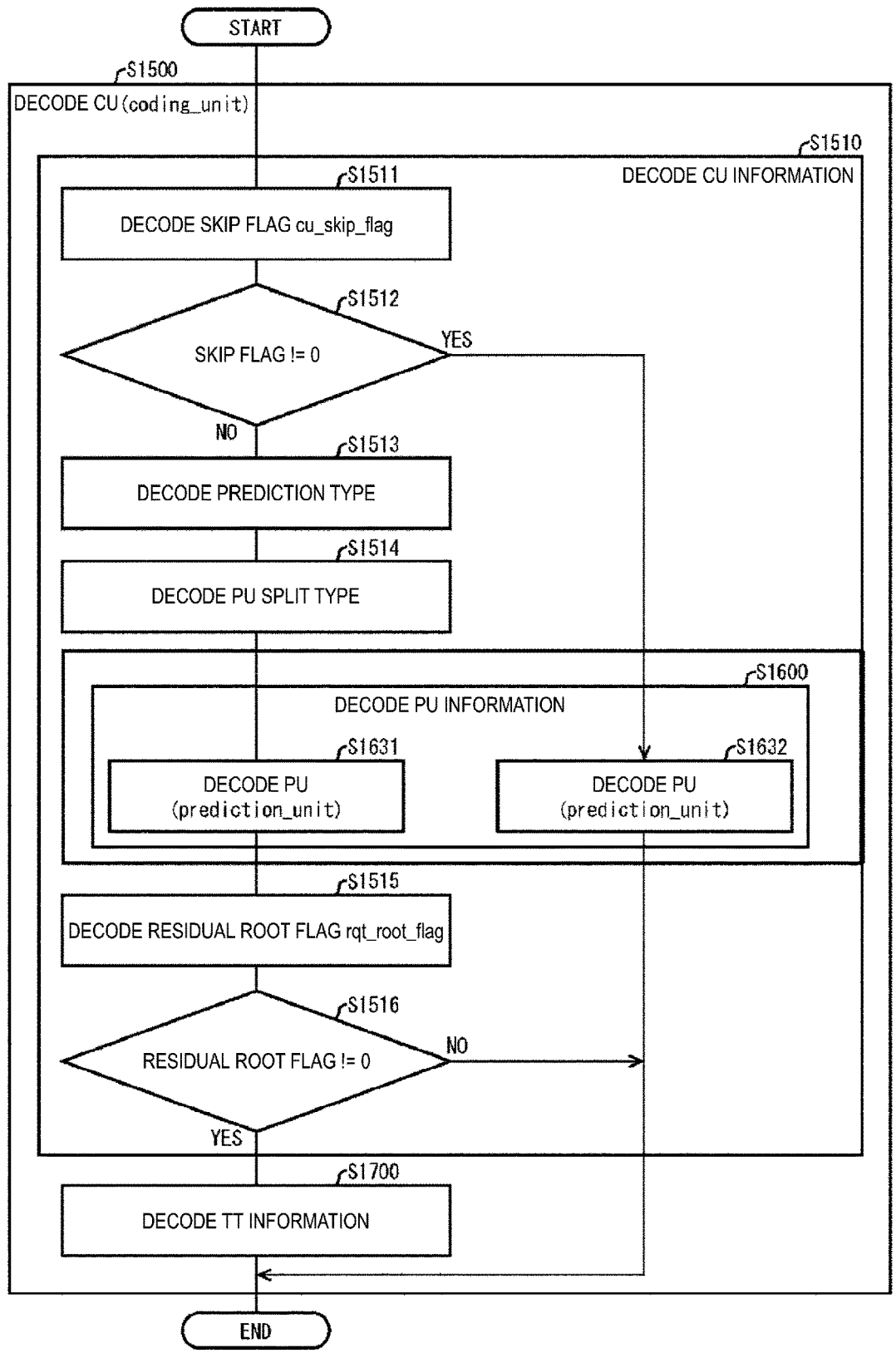
FIG. 12 is a flowchart illustrating general operation of a CU decoding unit (CU decoding S1500), a CU information decoding unit 21 (CU information decoding S1510), a PU information decoding unit (PU information decoding S1600), and a TT information decoding unit (TT information decoding S1700) according to an embodiment of the present invention.

FIG. 12 is a flowchart illustrating general operation of the CU decoding unit 20 (decoding of CUs S1500 and S1510), the PU information decoding unit 12 (decoding of PU information S1600), the TT information decoding unit 13 (decoding of TT information S1700) according to an embodiment of the present invention. FIG. 15 is a diagram illustrating a configuration example of a syntax table of CU information, PT information PTI, and TT information TTI according to an embodiment of the present invention.

CU Decoding Unit (S1500) The CU decoding unit 20 decodes the coding unit CU (coding_unit (x0, y0, log 2CbWidth, log 2CbHeight)). Here x0, y0 represents the upper left coordinates of the coding unit. log 2CbWidth and log 2CbHeight, representing the logarithmic sizes of the coding unit, are notified from the CT information decoding unit 10. The specific processing of the CU decoding unit 20 is as follows.

The CU decoding unit 20 decodes CU information (skip flag, CU prediction scheme information PartMode, PU split type information, and residual route flag) by using the decoding module 9.

(S1511) The CU decoding unit 20 uses the decoding module 9 to decode the skip flag cu_skip_flag from the coded data.

(S1512) The CU decoding unit 20 determines whether the skip flag cu_skip_flag has a value other than 0 (=1) or not. In a case that the skip flag cu_skip_flag has a value other than 0, the CU decoding unit 20 notifies the PU information decoding unit 12 that the skip flag cu_skip_flag has a value other than 0. In a case that the skip flag cu_skip_flag has a value of 0, (S1513) the CU decoding unit 20 decodes the prediction mode information predMode (pred_mode_flag and CuPredMode), and in addition, (S1514) decodes the PU split type information PartMode (part_mode) and notifies the PU information decoding unit 12 of the decoding. Furthermore, (S1515) the CU decoding unit 20 decodes the residual route flag rqt_root_flag (S1516), determines whether the residual root flag has a value other than 0 or not, and in a case that the residual route flag has a value of 0, ends the processing and otherwise notifies the TT information decoding unit 13 that the residual root flag has a value other than 0.

PU Information Decoding Unit

The PU information decoding unit 12 uses the decoding module 9 to perform decoding processing of the PU information PUI. Specifically, the PU information decoding unit 12 decodes the PU information PUI according to the following procedure.

The PU information decoding unit 12 references the PU split type information PartMode configured in advance or otherwise notified by the CU decoding unit 20 to determine the PU split type in the target CU. Subsequently, the PU information decoding unit 12 performs decoding processing of the PU information corresponding to the target PU, with each of the PUs included in the target CU sequentially configured as the target PU.

In other words, the PU information decoding unit 12 performs decoding processing of each parameter used to generate the prediction image Pred from PU information corresponding to the target PU.

The PU information decoding unit 12 supplies the decoded PU information PUI for the target PU to the prediction image generation unit 308.

More specifically, the PU information decoding unit 12 performs the following operation as illustrated in FIG. 12. FIG. 12 is a flowchart illustrating general operation of PU information decoding illustrated at S1600.

(S1631) The PU information decoding unit 12 decodes each piece of the PU information included in the target CU, from the coded data in accordance with the number of PU splits indicated by the PU split type information PartMode.

For example, in a case that the PU split type is 2N×2N, the PU information decoding unit 12 decodes one piece of the PU information PUI described below, with the CU configured as one PU.

prediction_unit(x0,y0,nCbW,nCbH)　　　(SYN1631A)

In a case that the PU split type is 2N×N, the PU information decoding unit 12 decodes two pieces of the PU information PUI described below for splitting the CU in a horizontal direction.

prediction_unit(x0,y0,nCbW,nCbH/2)　　　(SYN1631B)

prediction_unit(x0,y0+(nCbH/2),nCbW,nCbH/2)　　　(SYN1631C)

In the case that the PU split type is N×2N, the PU information decoding unit 12 decodes two pieces of the PU information PUI described below for splitting the CU in a lateral direction.

prediction_unit(x0,y0,nCbW/2,nCbH)　　　(SYN1631D)

prediction_unit(x0+(nCbW/2),y0,nCbW/2,nCbH)　　　(SYN1631E)

In a case that the PU split type is N×N, the PU information decoding unit 12 decodes four pieces of the PU information PUI described below for splitting the CU into four equal portions.

prediction_unit(x0,y0,nCbW/2,nCbH/2)　　　(SYN1631F)

prediction_unit(x0+(nCbW/2),y0,nCbW/2,nCbH/2)　　　(SYN1631G)

prediction_unit(x0,y0+(nCbH/2),nCbW/2,nCbH/2)　　　(SYN1631H)

prediction_unit(x0+(nCbW/2),y0+(nCbH/2),nCbW/2, nCbH/2)　　　(SYN16311)

(S1632) In a case that the skip flag is 1, the PU information decoding unit 12 uses a PU split type of 2N×2N to decode one piece of the PU information PUI.

prediction_unit(x0,y0,nCbW,nCbH)        (SYN1632)

FIG. 16 is a diagram illustrating a configuration example of a syntax table of the PU information PUI according to an embodiment of the present invention. FIG. 16 illustrates an example of a syntax for inter prediction parameters such as merge_flag, inter_pred_idc, refIdxLX, mvp_IX_idx, and mvdLX. An intra prediction parameter is also specified by prediction_unit ( ), but is not illustrated herein. In addition, the syntax table may indicate the intra prediction parameter by using intra_mode ( ).

TT Information Decoding Unit

In a case that the residual root flag rqt_root_cbf decoded in the CU decoding unit 20 has a value other than 0 (=1), the processing transitions to S1700 to decode the TT information TTI, and processing is performed by the TT information decoding unit 13. In a case that the residual route flag rqt_root_cbf has a value of 0, the processing of decoding the TT information TTI of the target CU from the coded data is omitted, and the TT information TTI is derived on the assumption that the target CU includes no TU split and that quantized prediction residuals of the target CU are 0.

The TT information decoding unit 13 uses the decoding module 9 to perform decoding processing of the TT information TTI (TU split information, CU residual flag, AMT flag, and TU). The TT information decoding unit 13 includes the TU decoding unit 22.

Figure 13:
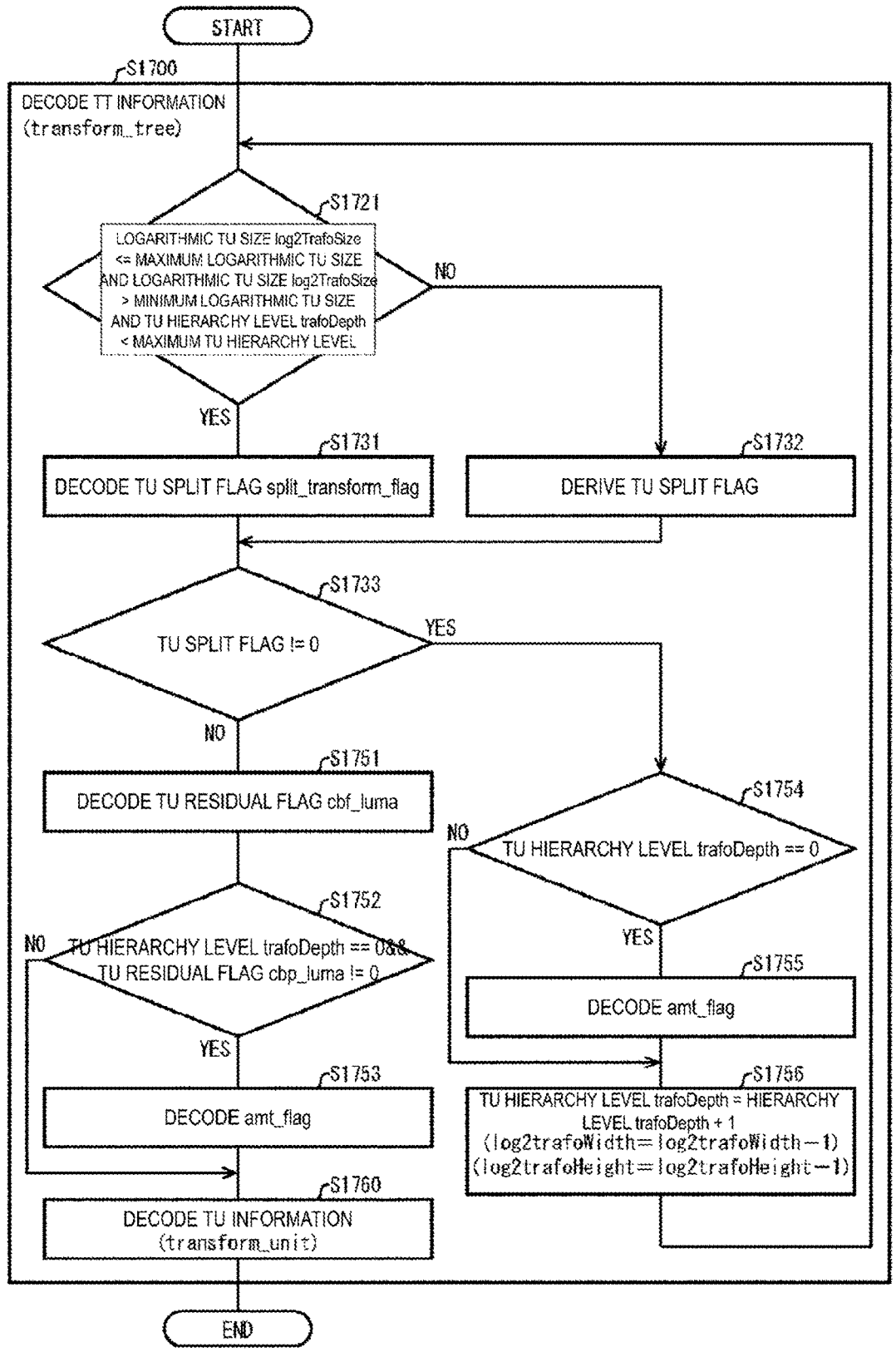
FIG. 13 is a flowchart illustrating general operation of a TT information decoding unit (TT information decoding S1700) according to an embodiment of the present invention.

Hereinafter, processing in which the TT information decoding unit 13 decodes the transform unit TU and the AMT flag amt_flag will be described with reference to FIGS. 13 and 17. FIG. 13 is a flowchart illustrating general operation of TT information decoding unit 13 (TT information decoding S1700) according to an embodiment of the present invention. FIG. 17 is a diagram illustrating a configuration example of a syntax table of the TT information TTI according to an embodiment of the present invention.

(S1731) The TT information decoding unit 13 decodes the TU split flag (split_transform_flag) in a case that a target TU size (e.g., a logarithmic TU size log 2TrafoSize) is within a range of a prescribed transform size (here, the logarithmic TU size is equal to or smaller than a maximum logarithmic TU size MaxTbLog 2SizeY and larger than minimum logarithmic TU size MinTbLog 2SizeY) and that the TU hierarchy level trafoDepth of the target TU is lower than a prescribed hierarchy level (here, lower than a maximum TU hierarchy MaxTrafoDepth). More specifically, in a case that, as illustrated at SYN1721, the logarithmic TU size log 2TrafoSize<maximum logarithmic TU size MaxTbLog 2SizeY and the logarithmic TU size log 2TrafoSize>minimum logarithmic TU size MinTbLog 2SizeY and the TU hierarchy level trafoDepth<maximum TU hierarchy level MaxTrafoDepth (YES at S1721), then the TT information decoding unit 13 proceeds to S1731 and decodes the TU split flag (split_transform_flag) (SYN1731).

(S1732) On the other hand, in a case that split_transform_flag does not appear in the coded data, i.e., the logarithmic TU size log 2TrafoSize>maximum logarithmic TU size MaxTbLog 2SizeY or the logarithmic TU size log 2TrafoSize<minimum logarithmic TU size MinTbLog 2SizeY or the TU hierarchy level trafoDepth<maximum TU hierarchy level MaxTrafoDepth (NO at S1721), the TT information decoding unit 13 derives the TU split flag (split_transform_flag). More specifically, in a case that the logarithmic TU size log 2TrafoSize is larger than the maximum logarithmic TU size MaxTbLog 2SizeY, the TT information decoding unit 13 derives the TU split flag split_transform_flag as a value indicating that a split is to be performed (=1), and otherwise (the logarithmic TU size log 2TrafoSize is equal to the minimum logarithmic TU size MaxTbLog 2SizeY or the TU hierarchy level trafoDepth equals the maximum TU hierarchy level MaxTrafoDepth) derives the TU split flag split_transform_flag as a value indicating that no split is to be performed (=0).

(S1755) The TT information decoding unit 13 decodes the AMT flag amt_flag in a case that the TU split flag split_transform_flag has a value indicating that a split is to be performed (e.g., 1) (YES at S1733) and that the TU hierarchy level trafoDepth is 0 (YES at S1754) (SYN1755). Note that even in a case that the TU split flag split_transform_flag has a value indicating that a split is to be performed (YES at S1733), the TT information decoding unit 13 transitions to S1756 without decoding the AMT flag amt_flag from the coded data in a case that the TU hierarchy level trafoDepth is not 0 (NO at S1754). In this case, the amt_flag decoded in the decoding of the AMT flag in the higher transform tree TT (S1755) is used without any change.

(1756) The TT Information decoding unit 13 uses the following expressions to update the TU hierarchy level trafoDepth+1 indicating the hierarchy level of the transform tree, the four positions (x0, y0), (x1, y0), (x0, y1), and (x1, y1), and the logarithmic CT size log 2TrafoWidth and log 2TrafoHeight, corresponding to the target TU size, and recursively decodes the transform tree TT at the hierarchy level immediately below, using the updated hierarchy level and size.

transform_tree(x0,y0,x0,y0,log 2TrafoWidth−1,log 2TrafoHeight−1 ,trafoDepth+1,0)

transform_tree(x1,y0,x0,y0,log 2TrafoWidth−1,log 2TrafoHeight−1,1)

transform_tree(x0,y1,x0,y0,log 2TrafoWidth−1,log 2TrafoHeight−1,2)

transform_tree(x1,y1,x0,y0,log 2TrafoWidth−1,log 2TrafoHeight−1,3)

Here, x0, y0 represents the upper left coordinates of the target transform tree, and x1, y1 represents coordinates derived by adding ½ of the target TU size (1<<log 2TrafoWidth) and (1<<log 2TrafoHeight) to the transform tree coordinates (x0, y0), as in the following expressions (SYN1756).

x1=x0+(1<<(log 2TrafoWidth−1)

y1=y0+(1<<(log 2TrafoHeight−1)

As described above, before decoding the transform tree transform_tree recursively, the TT information decoding unit 13 adds 1 to the TU hierarchy level trafoDepth, which indicates the hierarchy level of the transform tree TT, and subtracts 1 from the logarithmic CT sizes log 2TrafoWidth and log 2TrafoHeight, corresponding to the target TU size, according to the following expressions.

trafoDepth=trafoDepth+1 log 2TrafoWidth=log 2TrafoWidth−1 log 2TrafoHeight=log 2TrafoHeight−1

(S1751) On the other hand, in a case that the TU split flag split_transform_flag has a value of 0 (NO at S1733), the TT information decoding unit 13 decodes a TU residual flag (e.g. cbf_luma) indicating whether the target TU includes residuals. Here, as the TU residual flag, a luminance residual flag cbf_luma is used that indicates whether the luminance component of the target TU includes residuals. However, no such limitation is intended.

(S1753) The TT information decoding unit 13 decodes the AMT flag amt_flag (SYN1753) in a case that the TU hierarchy level trafoDepth is 0 and that the TU residual flag (e.g. cbf_luma) has a value of 0 (YES at S1752). Otherwise (NO at S1752), amt_flag=0 is configured without decoding amt_flag.

(S1760) The TU decoding unit 22 of the TT information decoding unit 13 decodes a transform unit TUtransform_unit illustrated at SYN1760 (x0, y0, xBase, yBase, log 2TrafoWidth, log 2TrafoHeight, trafoDepth, blkIdx) in a case that the TU split flag split_transform_flag has a value of 0 (NO at S1733).

Figure 14:
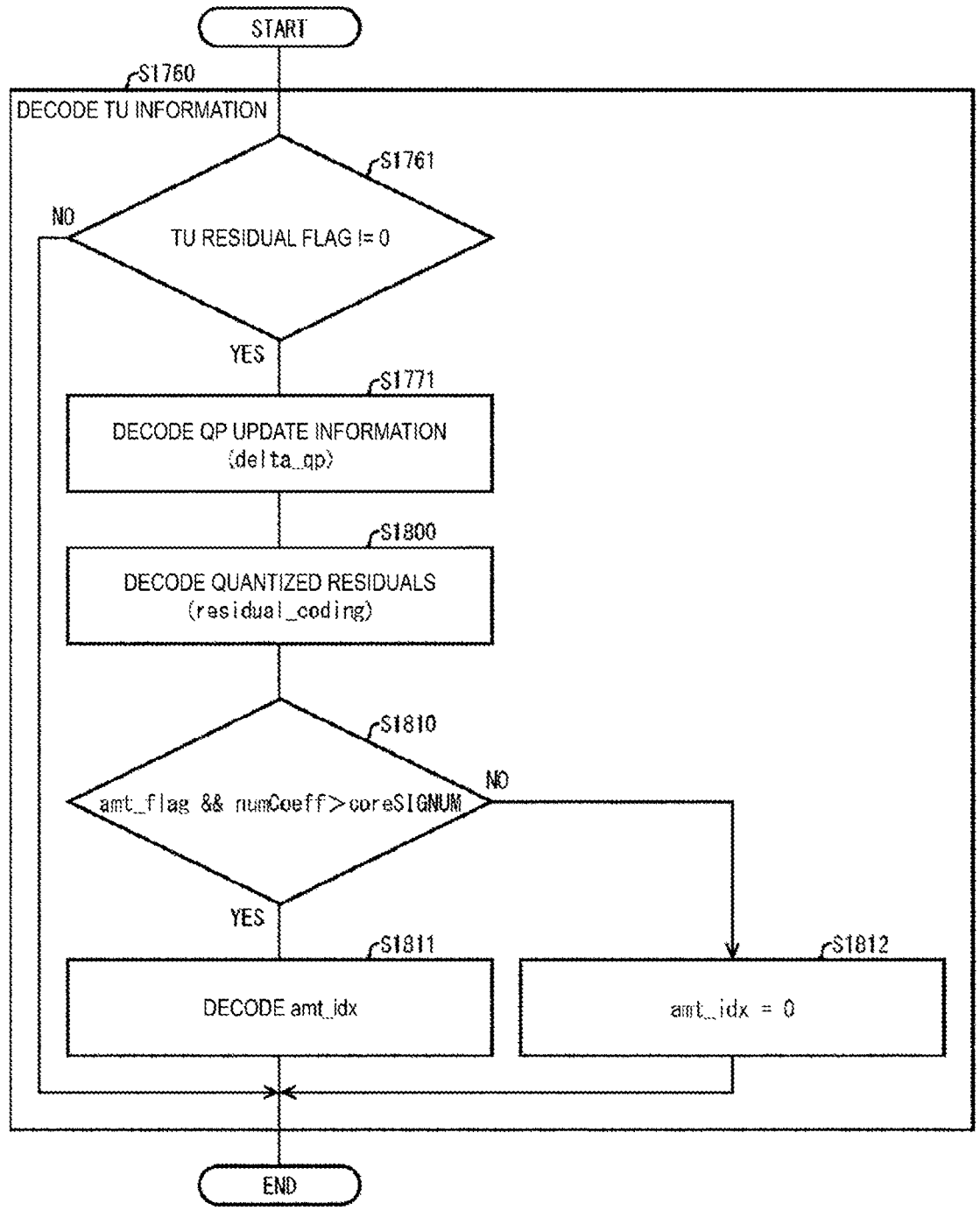
FIG. 14 is a flowchart illustrating general operation of a TU information decoding unit 22 (TU information decoding S1760) according to an embodiment of the present invention.

Now, processing in which the TU decoding unit 22 decodes TU information will be described using FIG. 14 and FIG. 18. FIG. 14 is a flowchart illustrating general operation of the TU decoding unit 22 (decoding of TU information S1760) according to an embodiment of the invention. FIG. 18 is a diagram illustrating a configuration example of a syntax table of the TU information according to an embodiment of the present invention. In a case that a TU includes residuals, the TU decoding unit 22 decodes QP update information (quantization correction value). Note that the QP update information is a value indicating the value of a difference from a quantization parameter prediction value qPred, which is a prediction value for a quantization parameter QP. The TU decoding unit 22 decodes a quantization prediction residual (residual_coding).

(S1761) The TU decoding unit 22 determines whether the TU includes residuals (whether the TU residual flag has a value other than 0 or not). Note that, in SYN1761, whether the TU includes residuals is determined by cbfLuma||cbfChroma derived by the following expression. However, no such limitation is intended. In other words, as the TU residual flag, the luminance residual flag cbf_luma may be used that indicates whether the luminance component of the target TU includes residuals.

cbfLuma=cbf_luma[x0][y0][trafoDepth]

cbfChroma=cbf_cb[xC][yC][cbfDepthC]cbf_cr[xC][yC][cbfDepthC]

Note that cbf_cb and cbf_cr are flags decoded from the coded data, and indicate whether the chrominance components Cb and Cr of the target TU include residuals. denotes a logical sum. Here, the TU residual flag cbfLuma for luminance and the TU residual flag cbfChroma for chrominance are derived from the TU luminance position (x0, y0), the chrominance position (xC, yC), the TU depth trafoDepth, and the syntax elements cbf_luma, cbf_cb, and cbf_cr at cfbDepthC, and the sum (logical sum) of these values is derived as a TU residual flag of the target TU.

(S1771) In a case that the TU includes residuals (the TU residual flag has a value other than 0), the TU decoding unit 22 decodes QP update information (quantization correction value). Here, the QP update information is a value indicating the value of a difference from a quantization parameter prediction value qPpred, which is a prediction value for a quantization parameter QP. Here, the difference value is decoded from an absolute value cu_qp_delta_abs and a code cu_qp_delta_sign_flag as a syntax element of the coded data. However, no such limitation is intended.

(S1800) The TU decoding unit 22 decodes quantized prediction residuals (residual_coding) in a case that the TU residua flag (here, cbfLuma) has a value other than 0. Note that the TU decoding unit 22 may sequentially decode multiple color components as quantized prediction residuals. In the illustrated example, the TU decoding unit 22 decodes luminance quantized prediction residuals (first color component) residual_coding (x0, y0, log 2TrafoWidth, log 2TrafoHeight, 0) in a case that the TU residual flag (here, cbfLuma here) has a value other than 0, decodes residual_coding (x0, y0, log 2TrafoWidthC, log 2TrafoHeightC, 1) in a case that the second color component residual flag cbf_cb has a value other than 0, and decodes the third color components residuals residual_coding (x0, y0, log 2TrafoWidthC, log 2TrafoHeightC, 2) in a case that the third color component residual flag cbf_cr has a value other than 0.

(S1811) The TU decoding unit 22 decodes the AMT index amt_idx in a case that the AMT flag amt_flag has a value other than 0 and the number of non-zero coefficients numCoeff is larger than a prescribed threshold coreSIGNUM (YES at S1810).

(S1812) Otherwise (the AMT flag amt_flag has a value of 0 or the number of non-zero coefficients numCoeffis coreSIGNUM or less) (NO at S1810), TU decoding 22 outputs amt_idx=0 without decoding an AMT index amt_idx from the coded data.

Separate Coding Tree and Shared Coding Tree

The embodiments herein include cases of processing with a "separate coding tree (CTU_SEPARATE_TREES)" in which an image including multiple color components such as YCbCr is processed in units of prescribed rectangular blocks (e.g., CTU units) by using multiple trees and processing with a "shared coding tree (CTU_SHARED_TREE)" in which all color components are processed by using one tree. The case of processing of a single color component using one tree is also referred to as a "single coding tree (CTU_SINGLE_TREE)". A parameter indicating such a tree structure is referred to as a tree mode.

FIG. 22 is a diagram illustrating a tree structure and a partition structure for each color component in the separate coding tree. (a) is a luminance coding tree indicating a luminance coding tree for a certain CTU, (b) is a chrominance coding tree indicating a coding tree for chrominances (Cb and Cr) for the same CTU, (c) is a luminance block split corresponding to (a), and (d) is a block split corresponding to (b). As illustrated in (a) and (b), the separate coding tree includes multiple trees in block (CTU) units, and the trees may be different from one another. Thus, as illustrated in (c) and (d), different block splits (partition structures) can be provided for a region at the same position (the same CTU).

FIG. 23 illustrates a relationship between a parameter ctu_tree_mode indicating the tree mode and the tree structure (Name). (a) illustrates an example in which the single coding tree and the shared coding tree are assigned to a tree mode (ctu_tree_mode) 0, whereas the separate coding tree is assigned to a tree mode 1. (b) illustrates an example in which the single coding tree, the shared coding tree, and the separate coding tree are respectively assigned to tree modes (ctu_tree_mode) 0, 1, and 2.

FIG. 24 is a diagram illustrating a relationship between color spaces and a parameter ChromaArrayType indicating the arrangement of colors. In a case of 4:0:0 and in a case that multiple color components are independently coded, ChromaArrayType is 0. In a case that multiple color components are coded in bundles such as in 4:2:0, 4:2:2, and 4:4:4, then the values of ChromaArrayType are respectively 1, 2, and 3. In a case that ChromaArray=0 corresponds to the single coding tree and that ChromaArray is 1-3, this corresponds to the shared coding tree or the separate coding tree.

Figure 25:
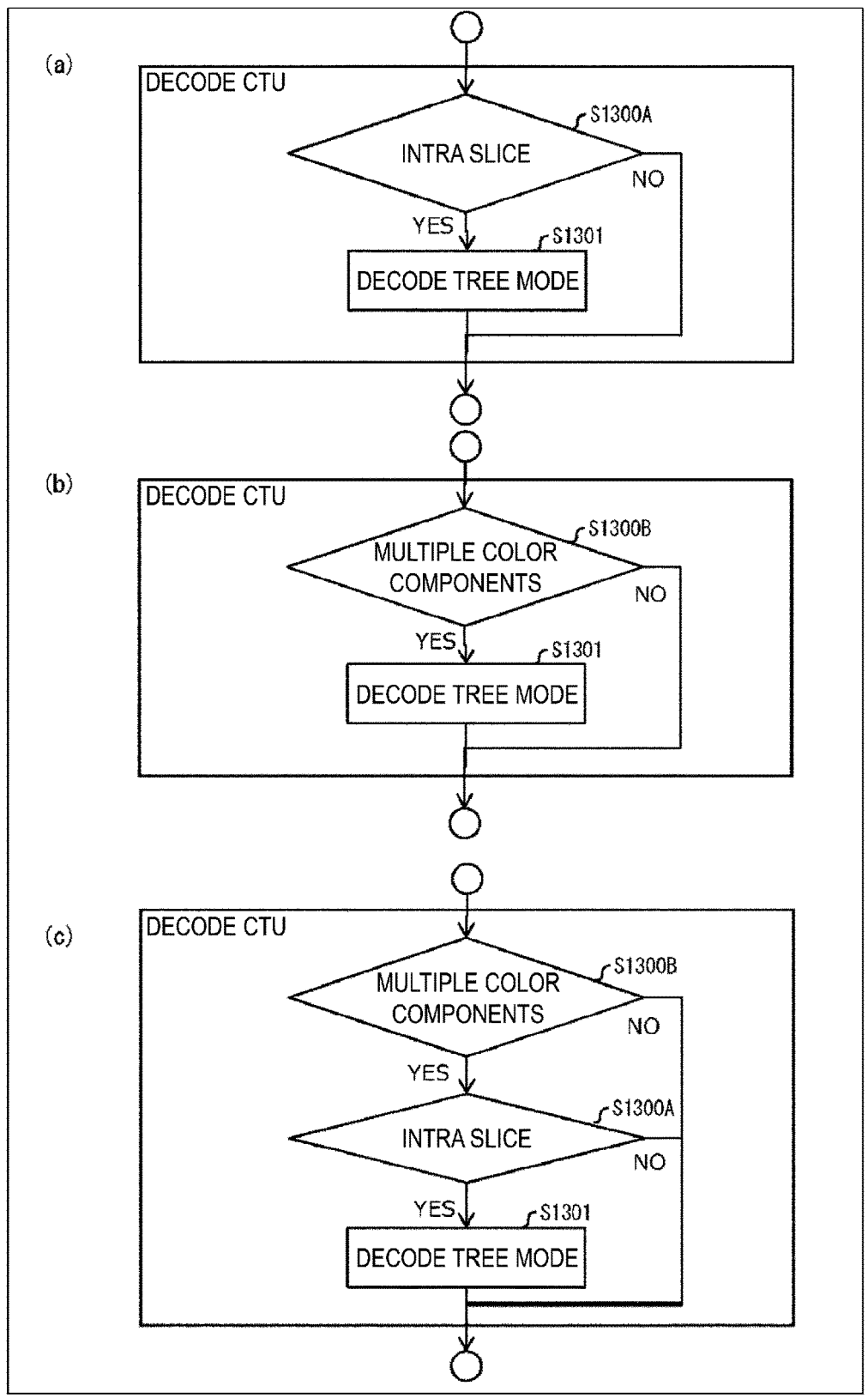
FIG. 25 is a diagram illustrating operation of a CT information decoding unit 11 in a configuration using a separate coding tree.

(b) of FIG. 24 is a diagram illustrating a parameter ctu_comp indicating a color component used in a certain tree. In the single coding tree such as ChromaArray=0, COMP_0 in which only the leading color component is processed is configured in ctu_comp. In the shared coding tree, COMP_012 in which all color components (here, three color components) are processed is configured in ctu_comp. In the separate coding tree, in a case that the leading color component (e.g., luminance) is processed, COMP_0 is configured as ctu_comp. In a case that the second and third color components (e.g., the chrominances Cb and Cr) are processed, COMP_12 is configured in ctu_comp. COMP_012 also means processing of three color components Configuration of Tree Blocks FIG. 25 is a flowchart illustrating operation of the CT information decoding unit 10 in a configuration using the separate coding tree.

FIG. 26 is a diagram illustrating an example of a syntax table in a configuration using the separate coding tree. As illustrated, the CT information decoding unit 10 codes and decodes two root coding tree nodes coding_quadtree in a CTU in the separate coding tree:

coding_quadtree(xCtb,yCtb,CtbLog 2SizeY,0,ctu_comp)

coding_quadtree(xCtb,yCtb,CtbLog 2SizeY,0, COMP_12)

In FIG. 26(a), the CT information decoding unit 10 performs the following processing.

SYN1310: The CT information decoding unit 10 configures the color component ctu_comp to be processed. In a case that the CTU is in the separate coding tree, COMP_0 indicating the leading component is configured, otherwise COMP_012 indicating all components is configured, in ctu_comp.

SYN1311: The CT information decoding unit 10 recursively decodes the CT (coding_quadtree) for the color component indicated in ctu_comp. For example, for the separate coding tree (ctu_comp is COMP_0), the CT information decoding unit 10 recursively decodes the CT (coding_quadtree) for the leading color component. In other words, the CT information decoding unit 10 performs decoding processing by using the block (CTU) of the first color component as the root node (root coding tree node).

SYN1320: For the separate coding tree, the CT information decoding unit 10 configures the color component to be processed next, here COMP_12.

SYN1321. The CT information decoding unit 10 recursively decodes the CT (coding_quadtree) for the color component indicated in ctu_comp. For example, for the separate coding tree (ctu_comp is COMP_12), the CT information decoding unit 10 recursively decodes the CT (coding_quadtree) for the second and third color components.

In other words, the CT information decoding unit 10 performs decoding processing by using the blocks (CTUs) of the second and third color components as the root nodes (root coding tree nodes).

In this example, information ctu_tree_mode indicating whether to use the separate coding tree or the shared coding tree may be determined, based on the flag indicated in the slice header. ctu_tree_mode may be determined depending on a slice type slice_type, for example, the separate tree is used in a case of an intra slice (slice_type==I).

Note that the image coding apparatus and the image decoding apparatus are the same in the flow of processing except for differences between the coding processing and the decoding processing. The CU coder 1130 of the image coding apparatus performs similar operation to that of the CT information decoding unit 10 to code the coding tree.

FIG. 26(b) is another configuration example of the syntax table.

SYN1301: The CT information decoding unit 10 decodes, from the coded data in CTU units, the information ctu_tree_mode indicating whether to use the separate coding tree or the shared coding tree.

FIG. 26(c) is another configuration example of the syntax table. The syntax table corresponds to an example in FIG. 25(a).

SYN1300 and SYN1301: The CT information decoding unit 10 decodes, from the coded data, the information ctu_tree_mode indicating whether to use the separate coding tree or the shared coding tree in a case of an intra slice (slice_type==I). In a case of an inter slice, the shared coding tree is always used.

FIG. 25(b) is another example of operation of the CT information decoding unit 10.

S1300B and S1301: The CT information decoding unit 10 decodes, from the coded data, the information ctu_tree_mode indicating whether to use the separate coding tree or the shared coding tree in a case that the number of color components is two or more. A shared coding tree is always used in a case that the number of color components is one.

FIG. 25(c) is another example of the operation of the CT information decoding unit 10.

S1300A, S1300B, and S1301: The CT information decoding unit 10 decodes, from the coded data, the information ctu_tree_mode indicating whether to use the separate coding tree or the shared coding tree in a case of an intra slice (slice_type==I) and the number of color components being two or more. In a case of an inter slice and the number of color components being one, the shared coding tree is always used.

Block Size Limitation in Separate Coding Tree

In the separate coding tree, individual trees are assigned to luminance and chrominance for processing. For the chrominance, efficient prediction is performed by a DM prediction or a CCLM prediction by using luminance information. However, in a case that no limitation is imposed on the block size, there is a need to wait during luminance processing for one CTU size before chrominance processing is performed. A method for limiting the split flag to limit the block size and a method for limiting the prediction mode will be illustrated below. Preferably, two limitations are simultaneously imposed.

Figure 27:
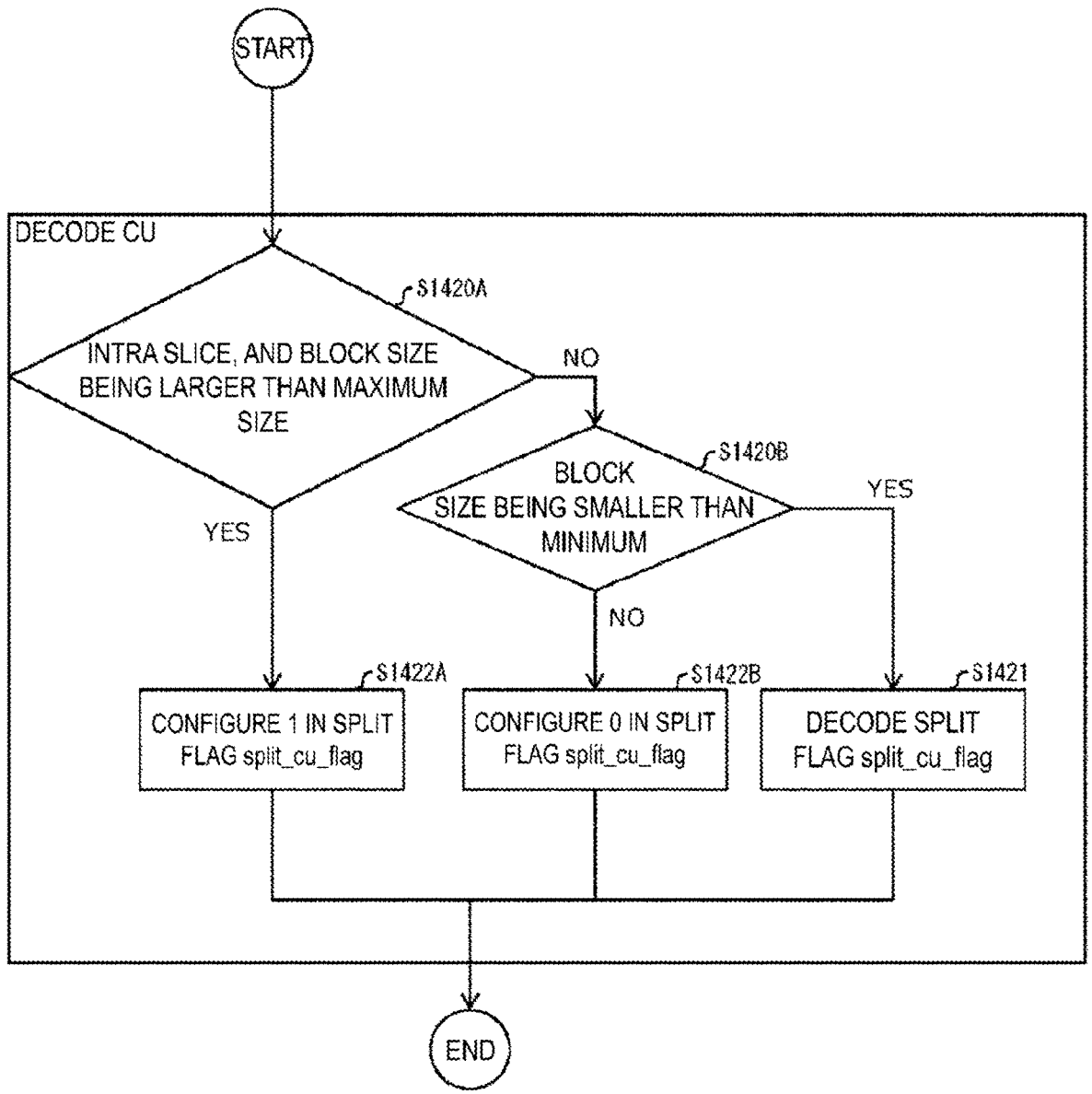
FIG. 27 is a flowchart illustrating operation of a CU decoding unit 20 according to an embodiment of the present invention.

FIG. 27 is a diagram illustrating operation of the image decoding apparatus 31 according to an embodiment of the present invention. In this configuration, in a case of an intra slice and multiple color components, the separate coding tree is used. FIG. 30(a) is a syntax table illustrating a configuration of coded data targeted by the image decoding apparatus 31 according to the present embodiment.

The image decoding apparatus 31 splitting an image into rectangular coding tree blocks (CTUs) for processing includes the CU decoding unit 20 (CT information decoding unit) performing, depending on the coding tree mode, processing of the CTU as the single coding tree using one coding tree CT (root coding tree node) or processing of the CTU as the separate coding tree using two or more coding trees CT (root coding tree nodes). The image decoding apparatus 31 further includes the CU decoding unit 20 decoding the split flag indicating whether to further split the coding tree CT or not and performing recursive block splitting, an intra predictor (intra prediction image generation unit 310 and intra prediction parameter decoding unit 304) using a decoded image of one color component to generate a prediction image of another color component, and a prediction mode decoding unit (CU decoding unit 20) configured to decode a prediction mode indicating whether the prediction mode is an intra mode or an inter mode, and the prediction mode decoding unit does not decode the prediction mode but configures the prediction mode to the intra mode in a case of an intra slice.

(S1422A) The CU decoding unit 20 does not decode the split flag from the coded data but configures 1 (a value indicating a split) in the split flag in a case of an intra slice and the target CT size being larger than a prescribed maximum intra size (YES at S1420A).

(S1422B) In a case other than the above-described case (in a case of a CTU other than an intra slice) (NO at S1420A), and the block size being equal to or smaller than the minimum size (NO at S1420B), the CU decoding unit 20 configures the split flag split_cu_flag to 0 without decoding the coded data.

(S1421) Otherwise (YES at S1420B), the CU decoding unit 20 decodes the split flag split_cu_flag. (This corresponds to SYN1421)

Note that the maximum size of the block size is preferably configured with the maximum size maxIntraBlockSize of the intra block size. For example, maxIntraBlockSize=64.

Note that, as indicated in the syntax table, the determination of whether to decode the split flag or not may further include determination of, for example, whether the target block exceeds a picture boundary. For example, in accordance with a determination expression for x0+(1<<log 2CbSize)<=pic_width_in_luma_samples && y0+(1<<log 2CbSize)<=pic_height_in_luma_samples, the split flag is decoded only in a case that the X coordinate of the right boundary of the target block is equal to or smaller than a picture width and that the Y coordinate of the lower boundary of the target block is equal to or smaller than a picture height, in other words, in a case that the lower right position of the target block is within the picture. Otherwise the coded data is not decoded, with 0 configured in the split flag split_cu_flag. This is also applied to the following embodiments.

The maximum size of the block size may also be configured with a minimum value of a maximum intra block size maxIntraBlockSize, indicating the maximum size of the intra block size, and a maximum transform size maxTransSize of a maximum size of a transform size. For example, for maxIntraBlockSize=64 and maxTransSize=128, the maximum size is configured with maxCUSize=Min (maxIntraBlockSize, maxTransSize)=64.

According to the configuration described above, in a case of the separate coding tree in an intra slice, the luminance block size is inevitably equal to or smaller than the maximum intra block size maxIntraBlockSize. Thus, even in the worst case, the chrominance processing can be started after waiting during processing of an intra block with the maximum intra block size maxIntraBlockSize. Accordingly, the above-described configuration has an effect that reduces the amount of delay in the chrominance processing.

As described in the adaptive core transform, in a case that a transform different from the transform for inter blocks is used for an intra block, limiting the maximum intra block size produces an effect that reduces circuits and transform basis memories for the transform needed for intra blocks.

Note that the image coding apparatus and the image decoding apparatus are the same in the flow of processing except for differences between the coding processing and the decoding processing. The CU coder 1130 of the image coding apparatus configures 1 (a value indicating a split) in the split flag instead of coding the split flag into the coded data in a case of an intra slice and the target CT size being larger than the prescribed maximum intra size.

Figure 28:
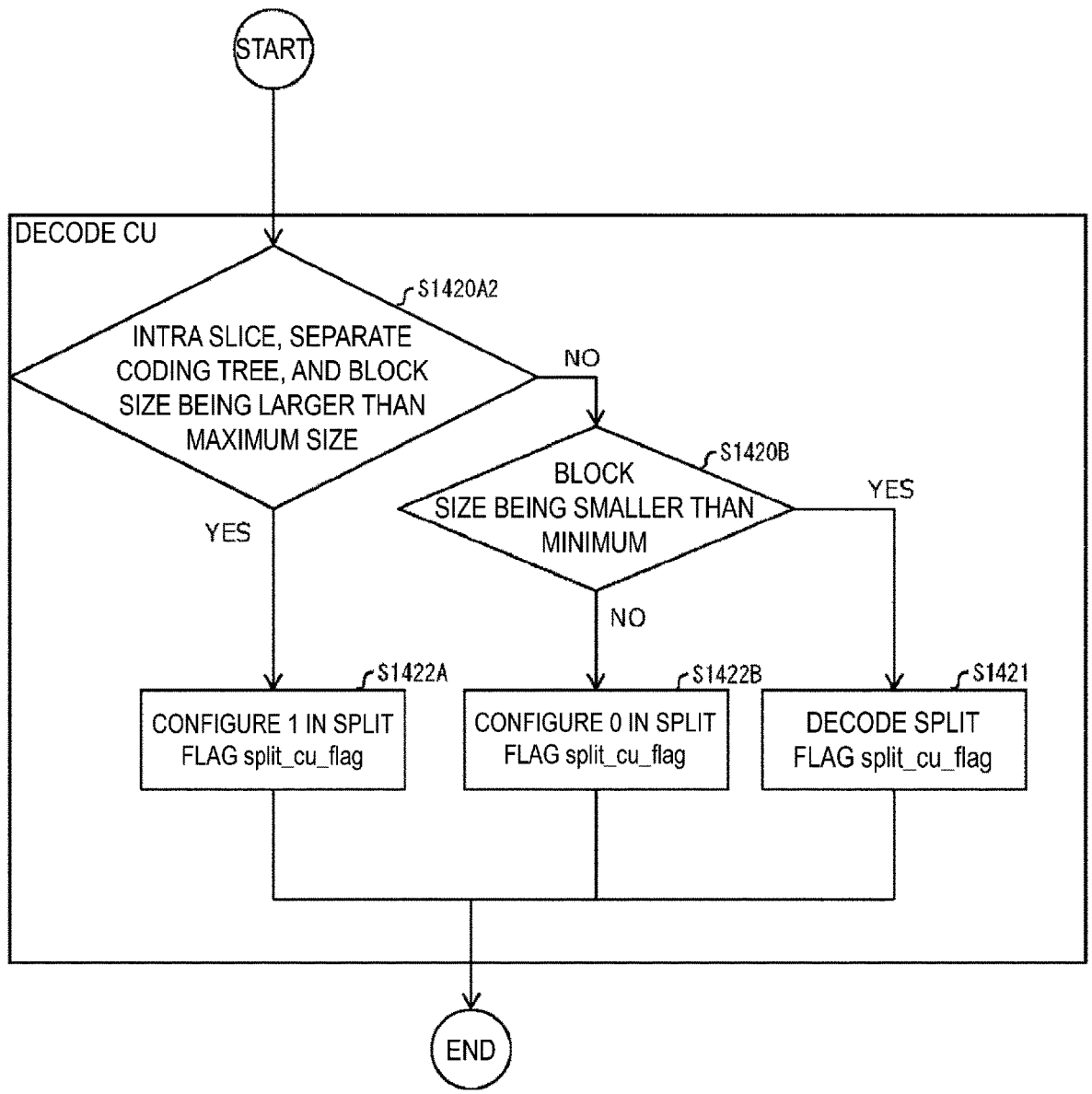
FIG. 28 is a flowchart illustrating operation of another configuration of the CU decoding unit 20 according to an embodiment of the present invention.

FIG. 28 is a diagram illustrating operation of another configuration of the image decoding apparatus 31 according to an embodiment of the present invention. This configuration uses S1420A2 instead of S1420A. FIG. 30(b) is a syntax table illustrating the configuration of the coded data targeted by the image decoding apparatus 31 according to the present embodiment. In this configuration, information indicating whether to use the single coding tree or the separate coding tree for processing may be decoded from the coded data in the CTU units.

(S1422A2) The CU decoding unit 20 does not decode the split flag from the coded data but configures 1 (a value indicating a split) in the split flag in a case of an intra slice, and the separate coding tree, and the target CT size being larger than the prescribed maximum intra size (YES at S1420A2).

In this configuration, even in a case of an intra slice and one of the shared coding tree and the separate coding tree being selectable, the luminance block size is inevitably equal to or smaller than the maximum intra block size maxIntraBlockSize in a case of an intra slice and the separate coding tree. Thus, even in the worst case, the chrominance processing can be started after waiting during processing of an intra block with the maximum intra block size maxIntraBlockSize. Accordingly, the above-described configuration has an effect that reduces the amount of delay in the chrominance processing.

Note that the image coding apparatus and the image decoding apparatus are the same in the flow of processing except for differences between the coding processing and the decoding processing. The CU coder 1130 of the image coding apparatus configures 1 (a value indicating a split) in the split flag instead of coding the split flag into the coded data in a case of an intra slice, the separate coding tree, and the target CT size being larger than the prescribed maximum intra size.

Figure 29:
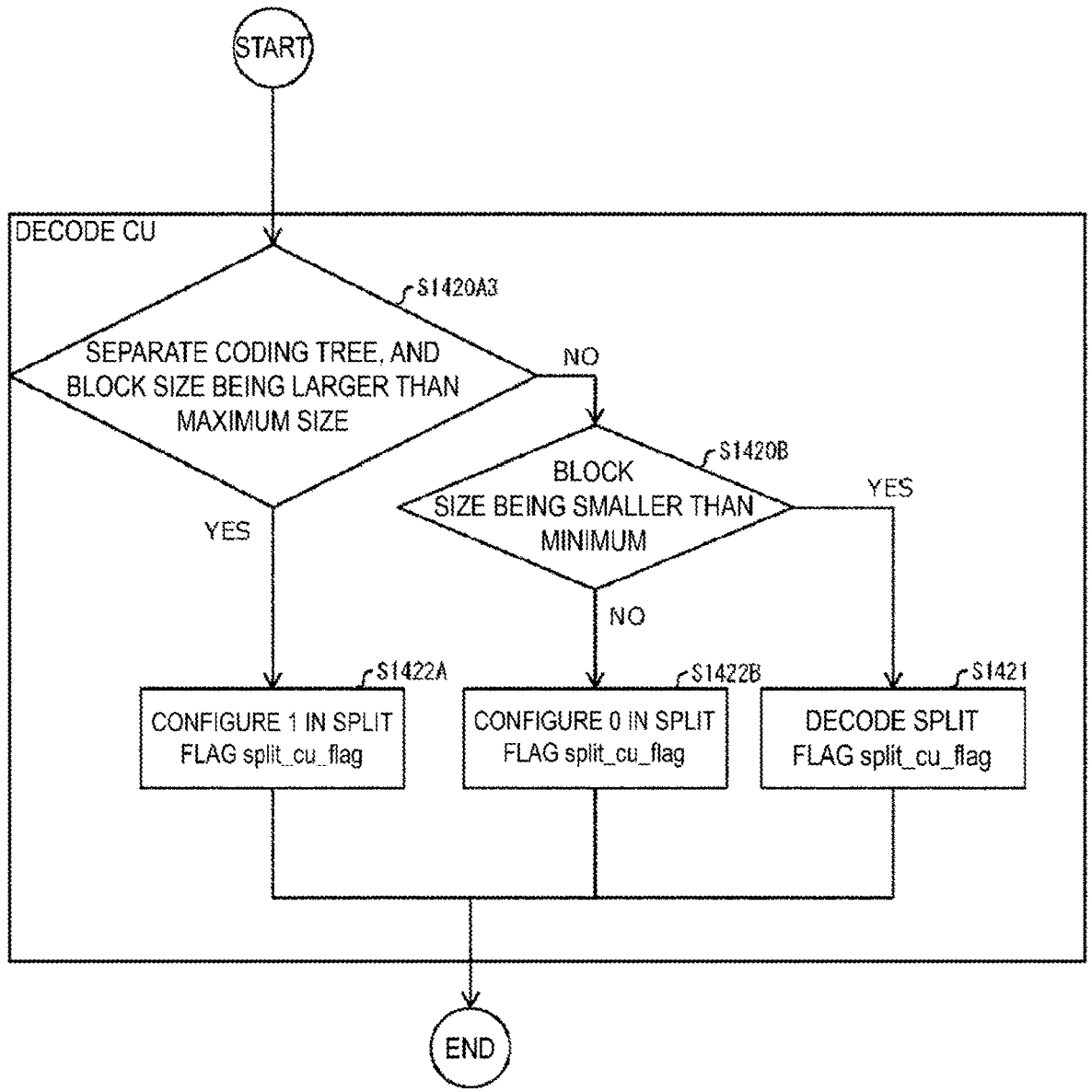
FIG. 29 is a flowchart illustrating operation of another configuration of the CU decoding unit 20 according to an embodiment of the present invention.

FIG. 29 is a diagram illustrating operation of another configuration of the image decoding apparatus 31 according to an embodiment of the invention. FIG. 30(c) is a syntax table illustrating a configuration of coded data targeted by the image decoding apparatus 31 according to the present embodiment. This configuration uses S1420A3 instead of S1420A. In this configuration, information indicating whether to use the single coding tree or the separate coding tree for processing may be decoded from the coded data in the CTU units.

(S1422A) The CU decoding unit 20 does not decode the split flag from the coded data but configures 1 (a value indicating a split) in the split flag in a case of the separate coding tree and the target CT size being larger than the prescribed maximum intra size (YES at S1420A3).

In this configuration, even in a case that the separate coding tree can be selected, the luminance block size is inevitably equal to or smaller than the maximum intra block size maxIntraBlockSize. Thus, even in the worst case, the chrominance processing can be started after waiting during processing of a block with the maximum intra block size maxIntraBlockSize. Accordingly, the above-described configuration has an effect that reduces the amount of delay in the chrominance processing.

Figure 31:
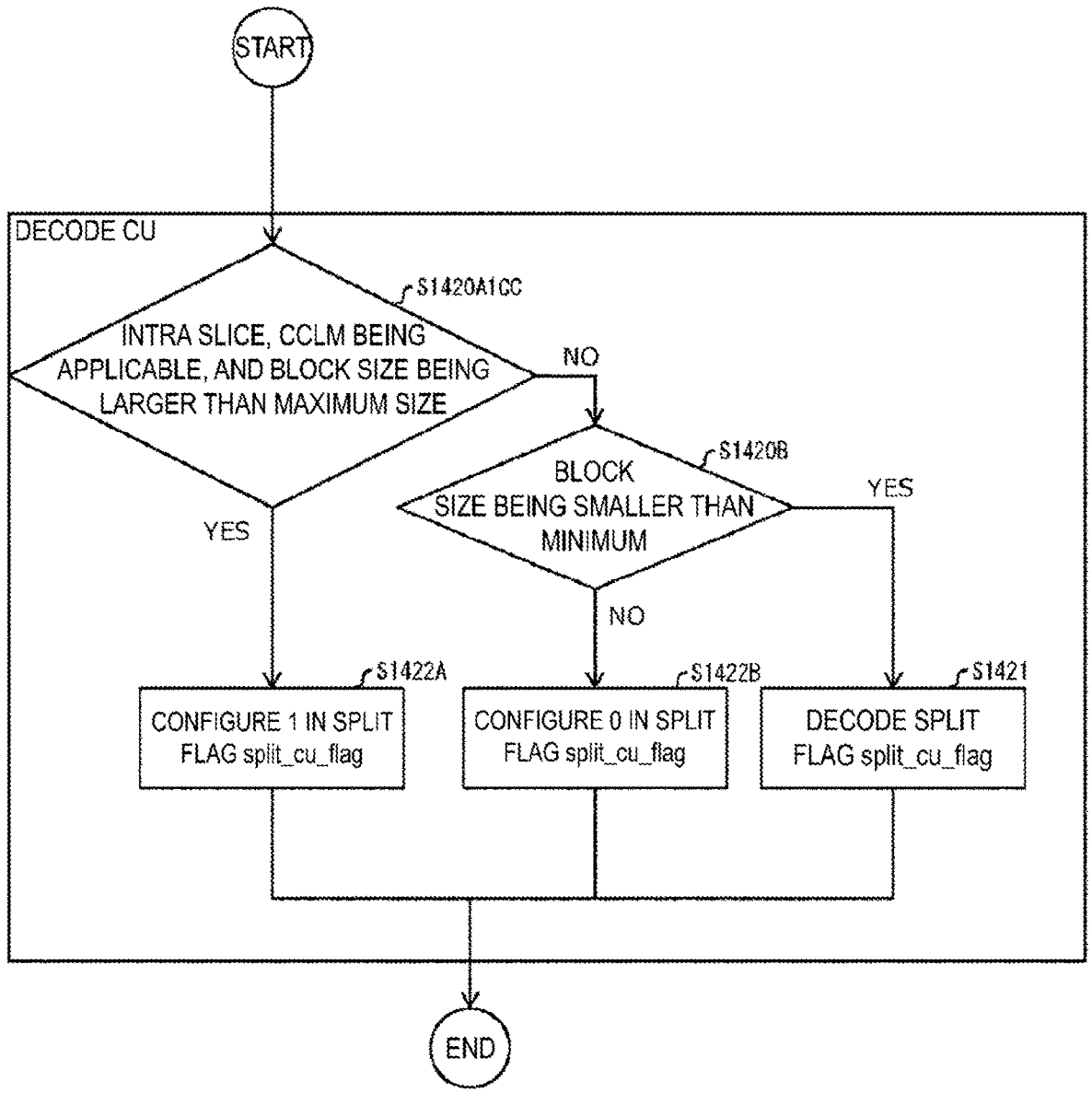
FIG. 31 is a flowchart illustrating operation of another configuration of the CU decoding unit 20 according to an embodiment of the present invention.

FIG. 31 is a diagram illustrating operation of another configuration of the image decoding apparatus 31 according to an embodiment of the present invention. FIG. 32 is a syntax table illustrating the configuration of the coded data targeted by the image decoding apparatus 31 according to the present embodiment. This configuration uses one of S1420A1CC, S1420A2CC, and S1420A3CC instead of S1420A. In this configuration, in a case that a luminance and chrominance prediction for predicting a chrominance from luminance can be performed, the block size is limited to the maximum intra block size or less.

In this configuration, information indicating whether to use the single coding tree or the separate coding tree for processing may be decoded from the coded data in the CTU units.

(S1422A) In FIG. 32(a), the CU decoding unit 20 does not decode the split flag from the coded data but configures 1 (a value indicating a split) in the split flag in a case of CCLM being applicable (cclm_enabled_flag=1), an intra slice, and the target CT size being larger than the prescribed maximum intra size (YES at S1420A1CC). (This corresponds to SYN1420A1CC)

(S1422A) In FIG. 32(b), the CU decoding unit 20 does not decode the split flag from the coded data but configures 1 (a value indicating a split) in the split flag in a case of CCLM being applicable (cclm_enabled_flag=1), an intra slice, the separate coding tree, and the target CT size being larger than the prescribed maximum intra size (YES at S1420A2CC). (This corresponds to SYN1420A2CC)

Alternatively, (S1422A) in FIG. 32(c), the CU decoding unit 20 does not decode the split flag from the coded data but configures 1 (a value indicating a split) in the split flag in a case of CCLM being applicable (cclm_enabled_flag=1), the separate coding tree, and the target CT size being larger than the prescribed maximum intra size (YES at S1420A3CC). (This corresponds to SYN1420A3CC)

Figure 33:
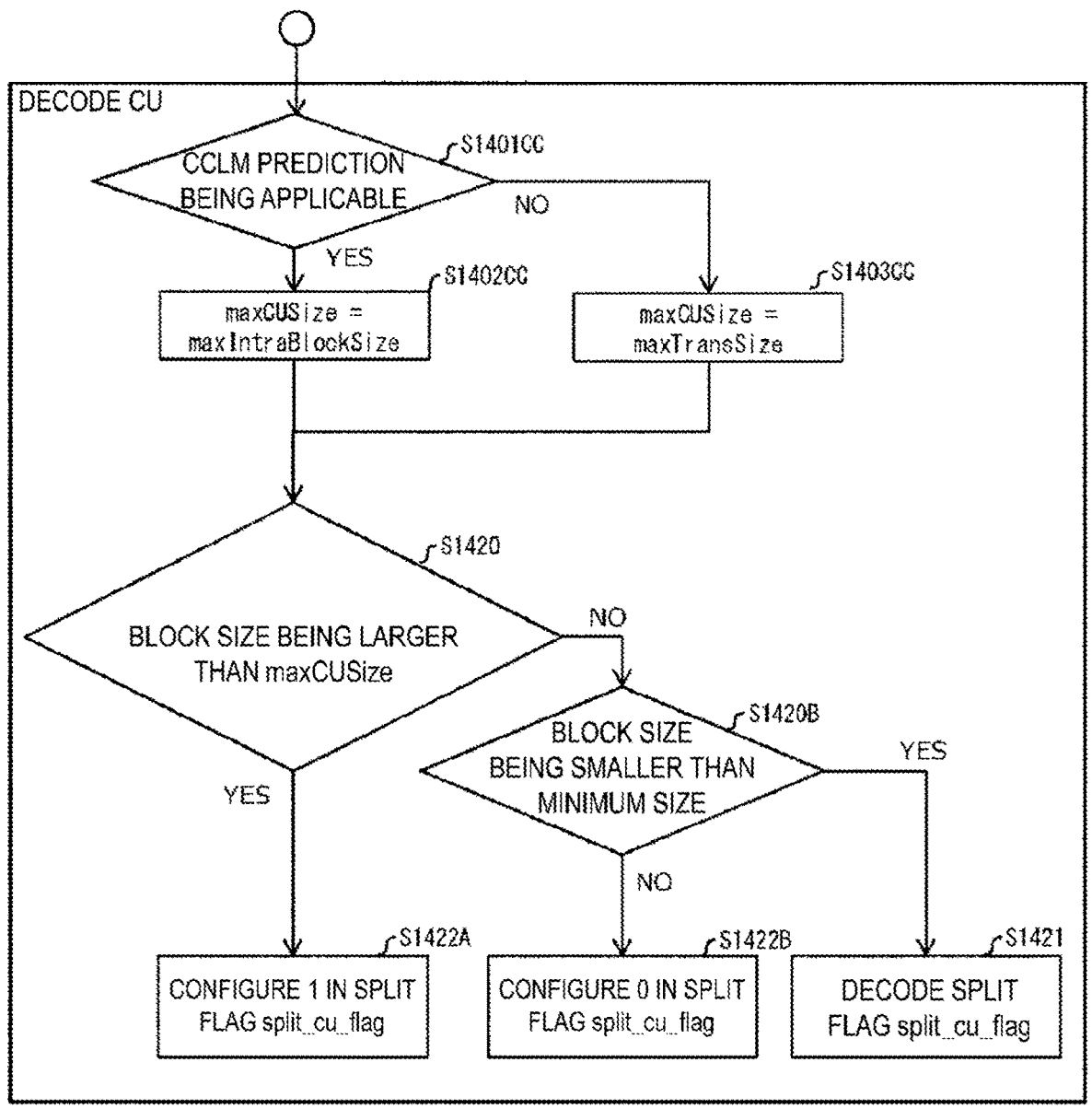
FIG. 33 is a flowchart illustrating operation of another configuration of the CU decoding unit 20 according to an embodiment of the present invention.

As illustrated in FIG. 33, the maximum size of the block size can be configured depending on CCLM applicability (cclm_enabled_flag=1).

(S1422A) The CU decoding unit 20 does not decode the split flag from the coded data but configures 1 (a value indicating a split) in the split flag in a case that the target CT size is larger than the prescribed maximum size (YES at S1420).

In this configuration, in a case that the maximum block size is exceeded as in the case of S1420, 1 is configured in the split flag and is thus forcibly split. However, as illustrated at S1401CC, the maximum block size maxCUSize is set equal to the maximum intra block size in a case that CCLM is applicable (cclm_enabled_flag=1) (YES at S1401CC), and is otherwise set equal to the maximum transform size.

if (CCLM applicable) S1401CC
  maxCUSize=maxIntraBlockSize S1402CC
  else
  maxCUSize=maxTransSize S1403CC In a case of CCLM being applicable (cclm_enabled_flag=1), the maximum block size maxCUSize may be set equal to the minimum value of the maximum intra block size and the maximum transform size, and may otherwise be set equal to the maximum transform size.

if (CCLM applicable) S1411CC
  maxCUSize=Min (maxIntraBlockSize, maxTransSize) S1412CC2
  else
  maxCUSize=maxTransSize S1413CC In this configuration, the luminance block size is limited to the maximum intra block size maxIntraBlockSize or less depending on CCLM applicability (cclm_enabled_flag=1). Thus, in a case that the chrominance needs to wait during luminance processing by using the luminance and chrominance predictions, even in the worst case, the chrominance processing can be started after waiting during processing of an intra block with the maximum intra block size maxIntraBlockSize. Accordingly, the above-described configuration has an effect that reduces the amount of delay in the chrominance processing.

Note that the image coding apparatus and the image decoding apparatus are the same in the flow of processing except for differences between the coding processing and the decoding processing. The CU coder 1130 of the image coding apparatus does not code the split flag in the coded data but configures 1 (a value indicating a split) in the split flag in a case of the CCLM prediction being applicable (cclm_enabled_flag=1), the separate coding tree, and the target CT size being larger than the prescribed maximum intra size.

Limitation of Prediction Mode in Shared Tree

The shared tree uses a tree shared between luminance and chrominance. However, in a case that the prediction mode predMode indicates an intra prediction, then for the chrominance, luminance information is used to perform a DM prediction or a CCLM prediction, leading to efficient prediction. In a case that no limitation is imposed on the block size, there is a need to wait during luminance processing for one CTU size before chrominance processing is performed. Hereinafter, for a reduction in the latency of luminance processing in the worst case, the prediction mode is limited in a case that the block size for processing is exceeded. Specifically, in a case that the prescribed block size is exceeded, only the inter prediction is permitted and the intra prediction is prohibited.

Figure 34:
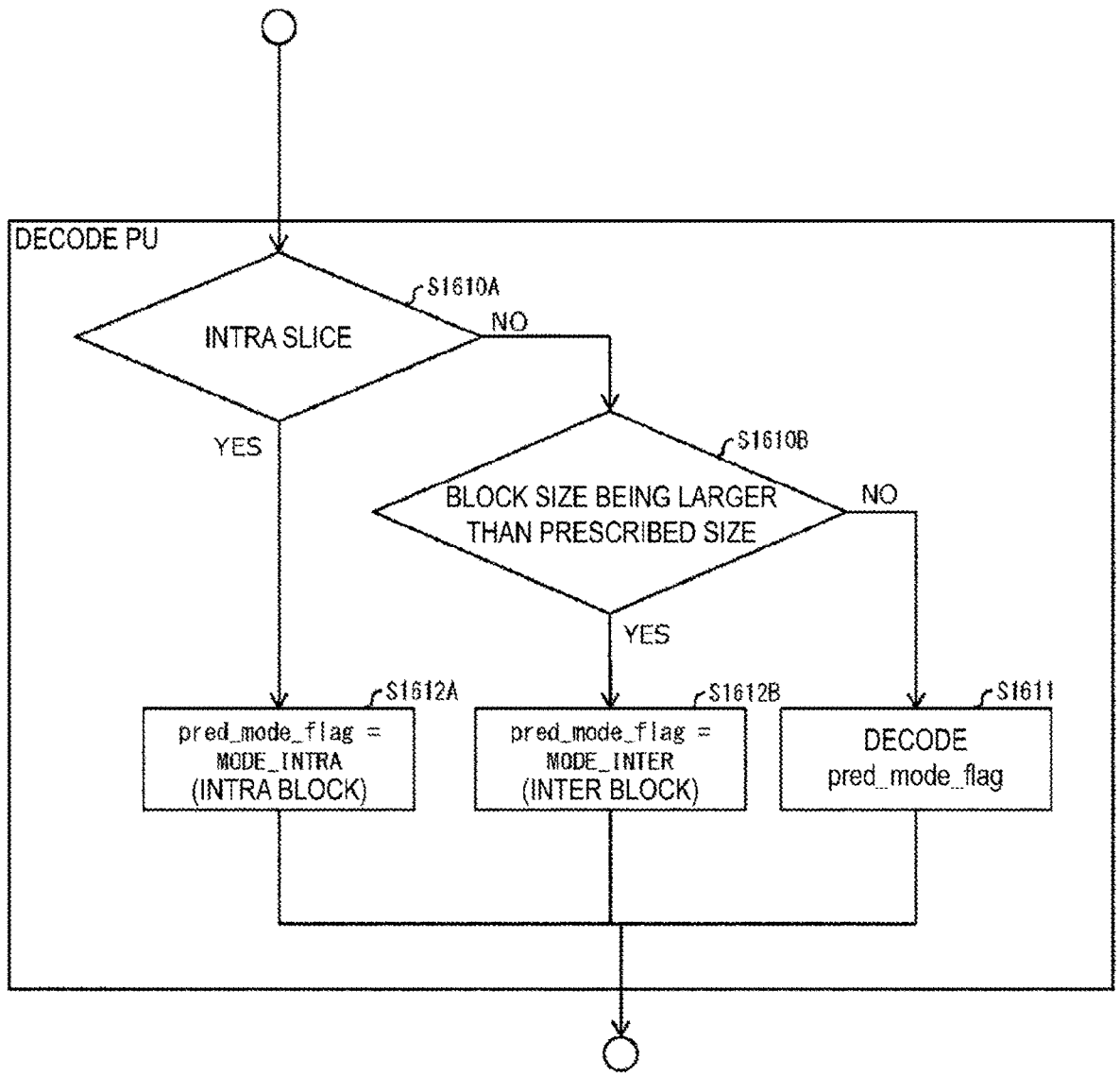
FIG. 34 is a flowchart illustrating operation of a configuration of a PU information decoding unit 12 according to an embodiment of the present invention.

FIG. 34 is a schematic diagram illustrating operation of the configuration of the image decoding apparatus 31 according to the present embodiment. FIG. 37(b) is a syntax table illustrating a configuration of coded data targeted by the image decoding apparatus 31 according to the present embodiment.

The image decoding apparatus splitting an image into rectangular coding tree units (CTUs) for processing includes the CU decoding unit 20 splitting each of the CTUs to a coding tree CTs, decoding the split flag indicating whether to further split each of the CTs or not, and performing recursive block splitting, the intra predictor using a decoded image of one color component to generate a prediction image of another color component (intra prediction image generation unit 310 and intra prediction parameter decoding unit 304), and the CU decoding unit 20 decoding the prediction mode indicating the intra mode or the inter mode.

Operation of the CU decoding unit 20 is as follows.

(S1612A) In a case of an intra slice (slice_type==I) (YES at S1610A), the prediction mode pred_mode_flag is not decoded from the coded data, with the intra mode (MODE_INTRA) configured for the prediction mode pred_mode_flag.

(S1612B) Otherwise (NO at S1610A), with the block size being larger than a prescribed size (maximum intra size) (YES at S1610B), the prediction mode pred_mode_flag is not decoded from the coded data, with the inter mode (MODE_INTER) being configured for the prediction mode pred_mode_flag.

Here, whether the sum of the width and the height of the block size exceeds the maximum size maxIntraBlockSize*2 or not can be used for the determination of whether the block size is equal to a prescribed size or not.

(S1611) Otherwise (NO at S1610B), the flag pred_mode_flag indicating the intra mode or the inter mode is decoded from the coded data. (This corresponds to SYN1611 in FIG. 37(b))

According to the above-described configuration, the luminance block size is inevitably equal to or smaller than the maximum intra block size. Thus, even in the worst case, the chrominance processing can be started after waiting during processing of an intra block with the maximum intra block size. Accordingly, the above-described configuration has an effect that reduces the amount of delay in the chrominance processing.

Note that the image coding apparatus and the image decoding apparatus are the same in the flow of processing except for differences between the coding processing and the decoding processing. In a case that the block size is larger than a prescribed size (maximum intra size), the CU coder of the image coding apparatus configures the inter mode (MODE_INTER) for the prediction mode pred_mode_flag without coding the prediction mode pred_mode_flag.

Figure 35:
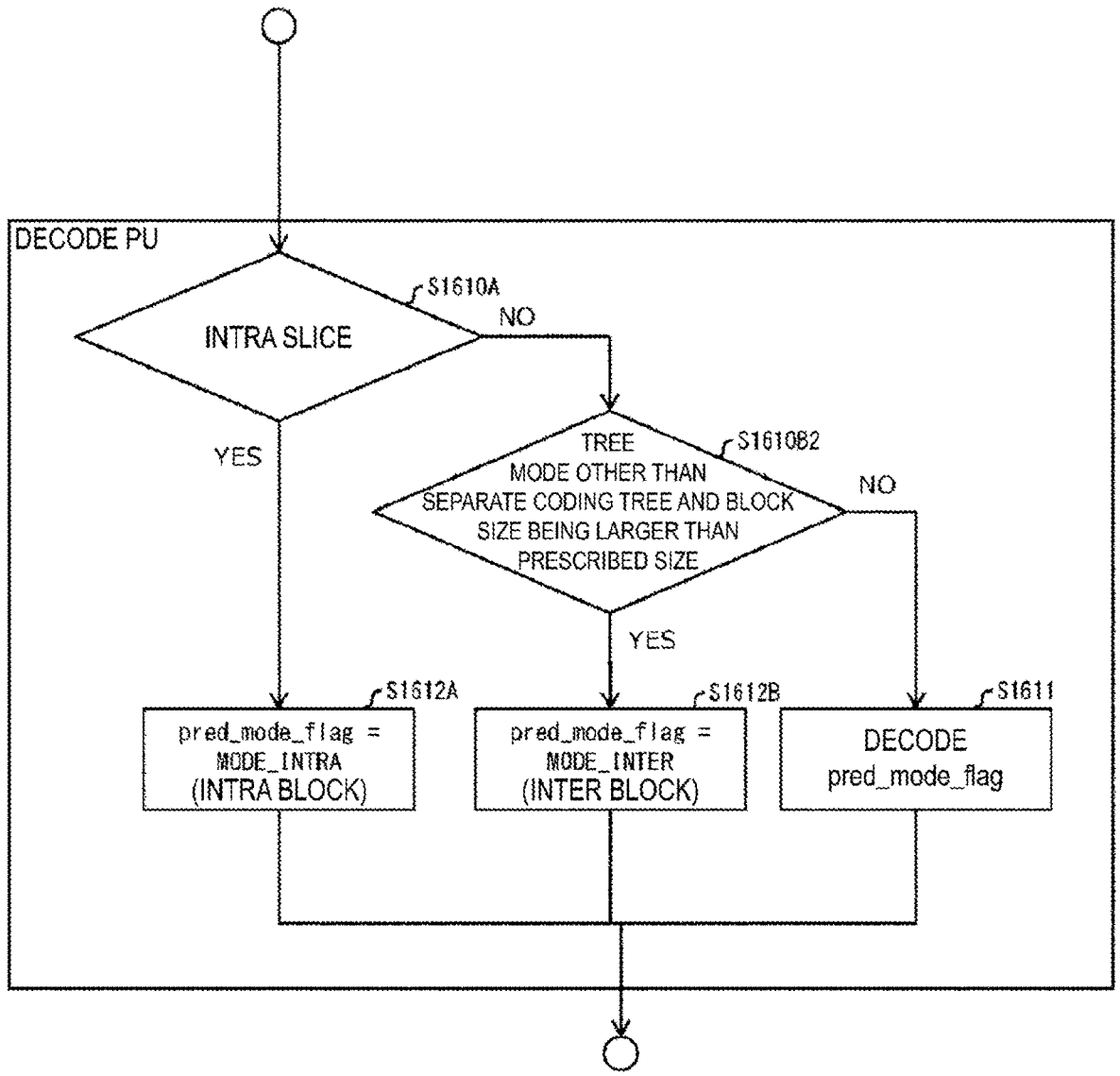
FIG. 35 is a flowchart illustrating operation of another configuration of the PU information decoding unit 12 according to an embodiment of the present invention.

FIG. 35 is a diagram illustrating operation of another configuration of the image decoding apparatus 31 according to an embodiment of the invention. This configuration uses S1611B2 instead of S1611B. FIG. 37(a) is a syntax table illustrating a configuration of coded data targeted by the image decoding apparatus 31 according to the present embodiment.

(S1612B) In a case other than an intra slice (NO at S1610A), and in a case of the tree mode being other than the separate coding tree, and the block size being larger than a prescribed size (maximum intra size) (YES at S1610B2), the prediction mode pred_mode_flag is not decoded from the coded data, with the inter mode (MODE_INTER) being configured for the prediction mode pred_mode_flag.

According to the above-described configuration, in a case of a tree mode being other than the separate coding tree (that is, the shared coding tree), the luminance block size is inevitably equal to or smaller than the maximum intra block size. Thus, even in the worst case, the chrominance processing can be started after waiting during processing of an intra block with the maximum intra block size. Accordingly, the above-described configuration has an effect that reduces the amount of delay in the chrominance processing.

Note that the image coding apparatus and the image decoding apparatus are the same in the flow of processing except for differences between the coding processing and the decoding processing. In a case other than an intra slice, and in a case of the tree mode being other than the separate coding tree, and the block size being equal to or larger than the prescribed size (maximum intra size), the CU coder of the image coding apparatus does not code the prediction mode pred_mode_flag but configures the inter mode (MODE_INTER) for the prediction mode pred_mode_flag.

Figure 36:
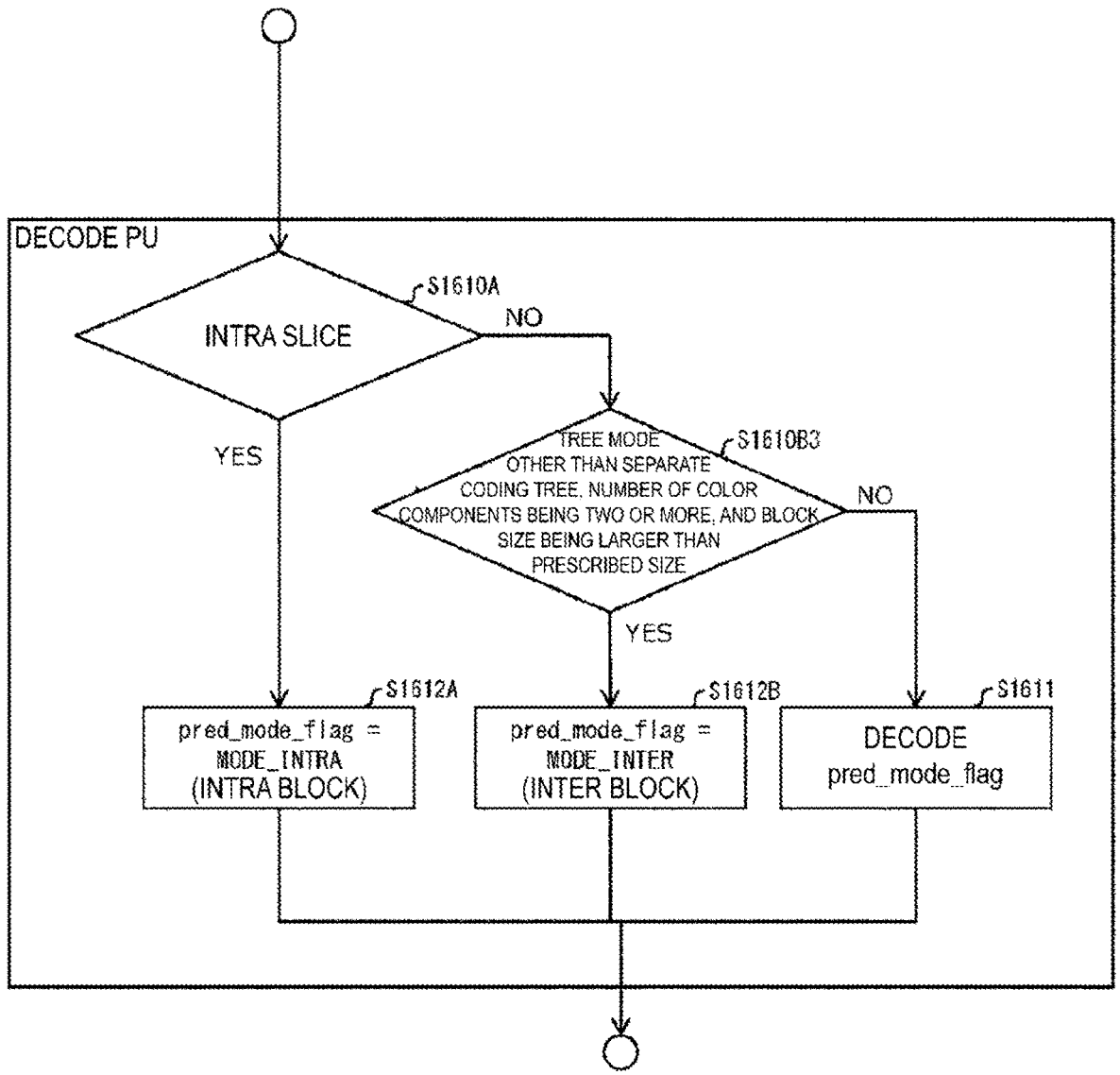
FIG. 36 is a flowchart illustrating operation of another configuration of the PU information decoding unit 12 according to an embodiment of the present invention.

FIG. 36 is a diagram illustrating operation of another configuration of the image decoding apparatus 31 according to an embodiment of the present invention. This configuration uses S1610B3 instead of S1610B.

(S1612B) In a case other than the intra slices (NO at S1610A), and in a case of the tree mode being other than the separate coding tree, the number of color components being two or more, and the block size being larger than the prescribed size (maximum intra size) (YES at S1610B3), the prediction mode pred_mode_flag is not decoded from the coded data, with the inter mode (MODE_INTER) being configured for the prediction mode pred_mode_flag.

The number of color components being two or more means exclusion of a case where the number of color components is one. The case where the number of color components is one refers to, for example, a case where an independent color component is used for coding ChromaArrayType=0 or a case of the single coding tree. In this case, no prediction with color components (e.g., between luminance and chrominance) is performed, and thus the prediction mode need not be limited depending on the maximum intra block size.

According to the above-described configuration, in a case of a tree mode being other than the separate coding tree (i.e., the shared coding tree) and the prediction between color components being performed, the luminance block size is inevitably equal to or smaller than the maximum intra block size. Thus, even in the worst case, the chrominance processing can be started after waiting during processing of an intra block with the maximum intra block size. Accordingly, the above-described configuration has an effect that reduces the amount of delay in the chrominance processing.

Note that the image coding apparatus and the image decoding apparatus are the same in the flow of processing except for differences between the coding processing and the decoding processing. In a case other than an intra slice, and in a case of the tree mode being other than the separate coding tree, the number of color components being two or more, and the block size being equal to or larger than the prescribed size (maximum intra size), the image coding apparatus does not codes the prediction mode pred_mode_flag but configures the inter mode (MODE_INTER) for the prediction mode pred_mode_flag.

Selection of Maximum Block Size in Accordance with CCLM Prediction

Figure 38:
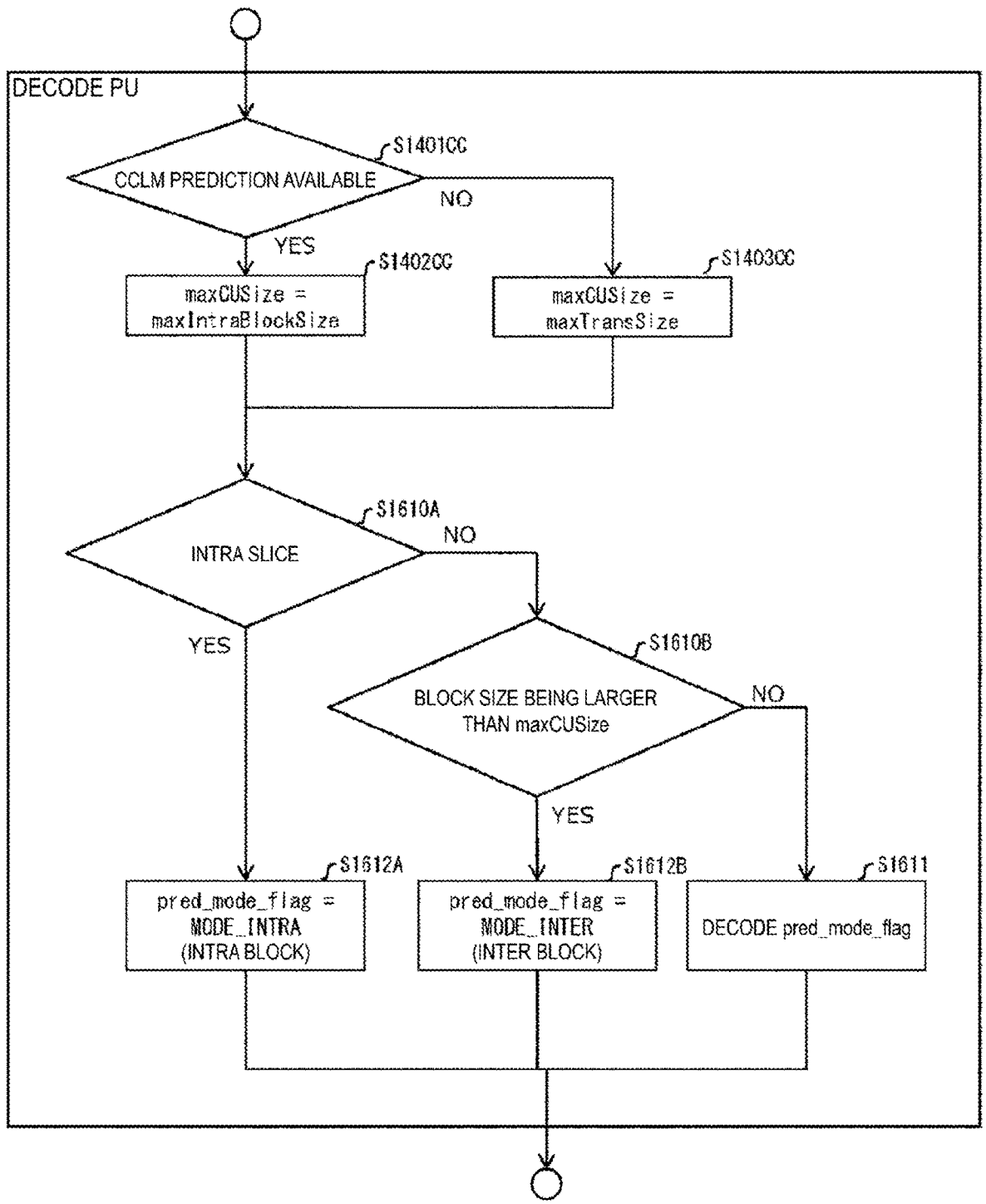
FIG. 38 is a flowchart illustrating operation of another configuration of the PU information decoding unit 12 according to an embodiment of the present invention.

As illustrated in FIG. 38, the maximum size of the block size may be configured depending on CCLM applicability (cclm_enabled_flag=1).

(S1612B) In a case other than an intra slice (NO at 51610A) and in a case of the block size being larger than the prescribed size maxCUSize (YES at S1610B), the prediction mode pred_mode_flag is not decoded from the coded data, with the inter mode (MODE_INTER) being configured for the prediction mode pred_mode_flag.

In this configuration, as described in S1401CC, S1402CC, and S1403CC, the maximum block size maxCUSize is set equal to the maximum intra block size in a case that CCLM is applicable (cclm_enabled_flag=1), and is otherwise set equal to the maximum transform size.

The maximum block size maxCUSize may be set equal to the minimum value of the maximum intra block size and the maximum transform size in the case that CCLM is applicable (cclm_enabled_flag=1), and may otherwise be set equal to the maximum transform size.

In this configuration, depending on CCLM applicability (cclm_enabled_flag=1), the luminance block size is limited to the maximum intra block size maxIntraBlockSize or less. Thus, even in a case that the chrominance needs to wait during luminance processing by using the luminance and chrominance predictions, the luminance block size is equal to or smaller than the maximum intra block size. Thus, even in the worst case, the chrominance processing can be started after waiting during processing of an intra block with the maximum intra block size. Accordingly, the above-described configuration has an effect that reduces the amount of delay in the chrominance processing.

Note that the image coding apparatus and the image decoding apparatus are the same in the flow of processing except for differences between the coding processing and the decoding processing and that the maximum block size maxCUSize is set equal to the maximum intra block size in the case that CCLM is applicable (cclm_enabled_flag=1), and is otherwise set equal to the maximum transform size.

Block Size Limitation and Prediction Mode Limitation

As already mentioned above, it is appropriate to combine one of the above-described block size limitations and one of the above-described prediction mode limitations. For example, the image decoding apparatus that splits an image into rectangular coding tree units (CTUs) for processing includes the CT information decoding unit 10 configure to split each of the CTUs into coding trees CTs and to process one CTU as the single coding tree using one coding tree CT (root coding tree node) or process one CTU as the separate coding tree using two or more coding trees CT (root coding tree nodes), the CU decoding unit 20 configured to decode the split flag indicating whether to further split each of the CTs or not and recursively perform block splitting, and the intra predictor configured to use the intra prediction mode for one color component to predict the intra prediction mode for another color component, and further includes the intra predictor configured to use a decoded image of one color component to generate a prediction image of another color component, the prediction mode decoding unit (CU decoding unit 20) does not decode the coded data but configures the intra mode for the prediction mode in a case of an intra slice, and does not decode the coded data but configures the inter mode for the prediction mode in a case other than an intra slice and in a case of the target CT size being larger than the prescribed maximum intra size, and the CU decoding unit 20 does not decode the split flag from the coded data but configures 1 (a value indicating a split) in the split flag in a case of an intra slice, the separate coding tree, and the target CT size being larger than the prescribed maximum intra size and otherwise decodes the split flag from the coded data.

Intra Mode Limitation for Separate Coding Tree Coding

As illustrated in FIG. 26(b), a configuration can be provided in which whether to use the separate coding tree or the shared coding tree is selected with ctb_tree_mode coded/decoded in CTU units. Using the inter mode in a case that the separate coding tree is used requires motion vectors for luminance and chrominance to be different, and this increases processing loads. Thus, only the intra mode is used.

Figure 39:
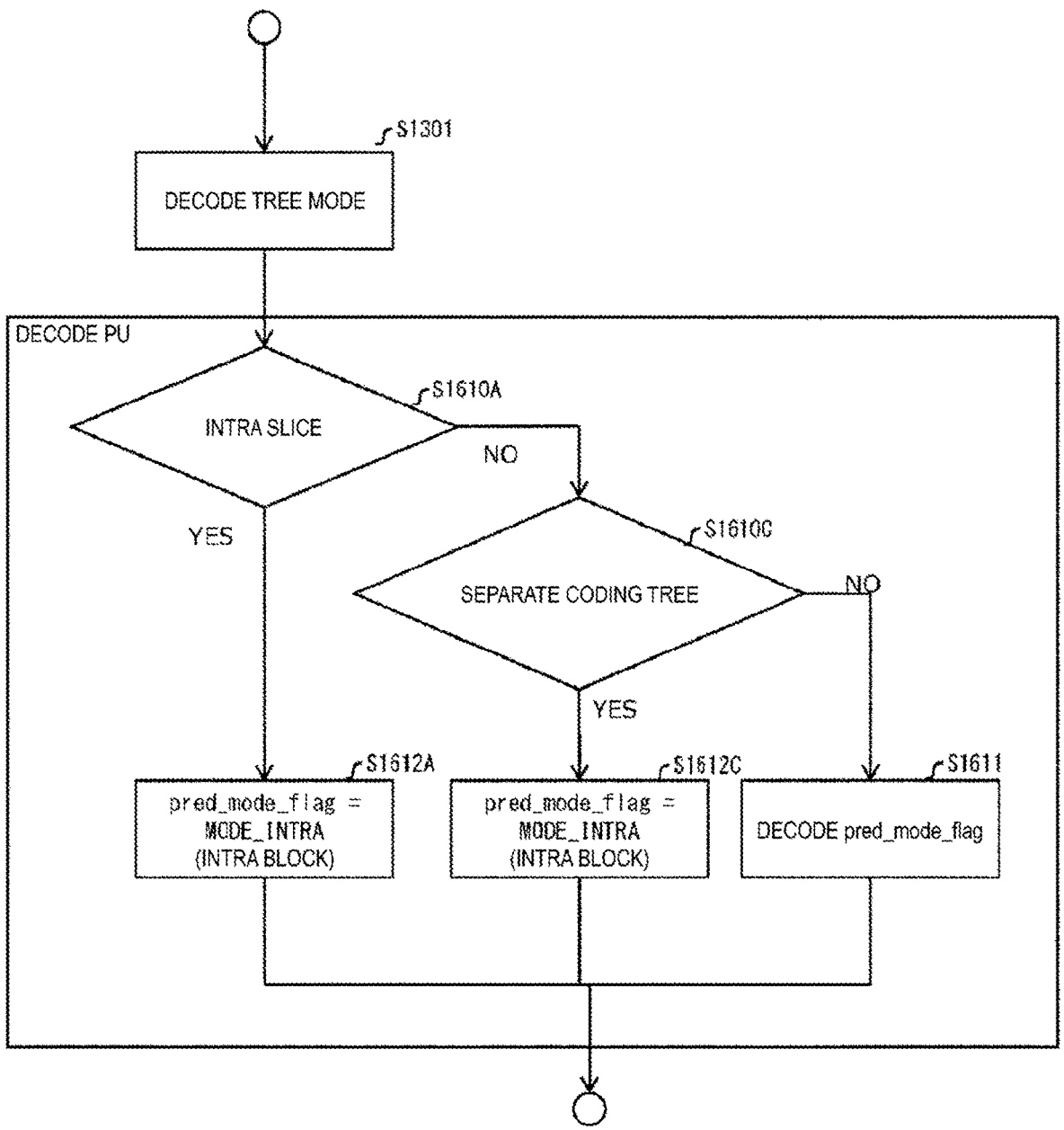
FIG. 39 is a flowchart illustrating operation of a configuration of the PU information decoding unit 12 according to an embodiment of the present invention.

FIG. 39 is a diagram illustrating operation of a configuration of the image decoding apparatus 31 according to the present embodiment. FIG. 41(a) is a syntax table illustrating a configuration of coded data targeted by the image decoding apparatus 31 according to the present embodiment.

The image decoding apparatus that splits an image into rectangular coding tree units (CTUs) for processing includes the CT information decoding unit 10 configured to split each of the CTUs into coding trees CTs and to process one CTU using one coding tree CT (root coding tree node) as a single coding tree or process one CTU as the separate coding tree using two or more coding trees CT (root coding tree nodes) depending on the coding tree mode, the CU decoding unit 20 configured to decode the split flag indicating whether to further split each of the CTs or not and recursively perform block splitting, the intra predictor configured to use a decoded image of one color component to generate a prediction image of another color component, and the PU information decoding unit 12 configured to decode the prediction mode indicating the intra mode or the inter mode. Furthermore, the PU information decoding unit 12 performs the following processing.

(S1301) The CT information decoding unit 10 decodes, from the coded data, information from coded data indicating whether to perform processing using a single coding tree or a separate coding tree.

(S1612A) In a case of an intra slice (slice_type==I) (YES at S1610A), the prediction mode pred_mode_flag is not decoded from the coded data, with the intra mode (MODE_INTRA) being configured for the prediction mode pred_mode_flag.

(S1610C) In a case other than the above-described case (NO at S1610A) and the separate coding tree (YES at S1610C), the prediction mode pred_mode_flag is not decoded from the coded data, with the intra mode (MODE_INTRA) being configured for the prediction mode pred_mode_flag.

(S1611) Otherwise (NO at S1610C), the flag pred_mode_flag indicating the intra mode or the inter mode is decoded from the coded data. (This corresponds to SYN1611)

Note that a skip mode is also a type of inter mode and thus that, in a case that limitation to the intra mode is imposed, the skip mode needs to be prohibited. Accordingly, in a case of an intra slice (slice_type==I) or the separate coding tree, a value (0) indicating that the prediction mode is not the skip mode is preferably configured instead of decoding a flag cu_skip_flag indicating whether the prediction mode is skip mode or not. In contrast, in a case other than an intra slice (slice_type !=I) and in a case of the tree mode being other than the separate coding tree, cu_skip_flag is decoded. (This corresponds to SYN1500A, SYN1510C, and SYN1511)

According to the above-described configuration, in a case of the separate coding tree, the prediction mode is inevitably the intra mode. Hence, the above-described configuration produces an effect that avoids a processing load causing the motion vector to vary between luminance and chrominance.

Note that the image coding apparatus and the image decoding apparatus are the same in the flow of processing except for differences between the coding processing and the decoding processing and that, in a case of the separate coding tree, the prediction mode pred_mode_flag is not decoded from the coded data, with the intra mode configured for the prediction mode pred_mode_flag.

Figure 40:
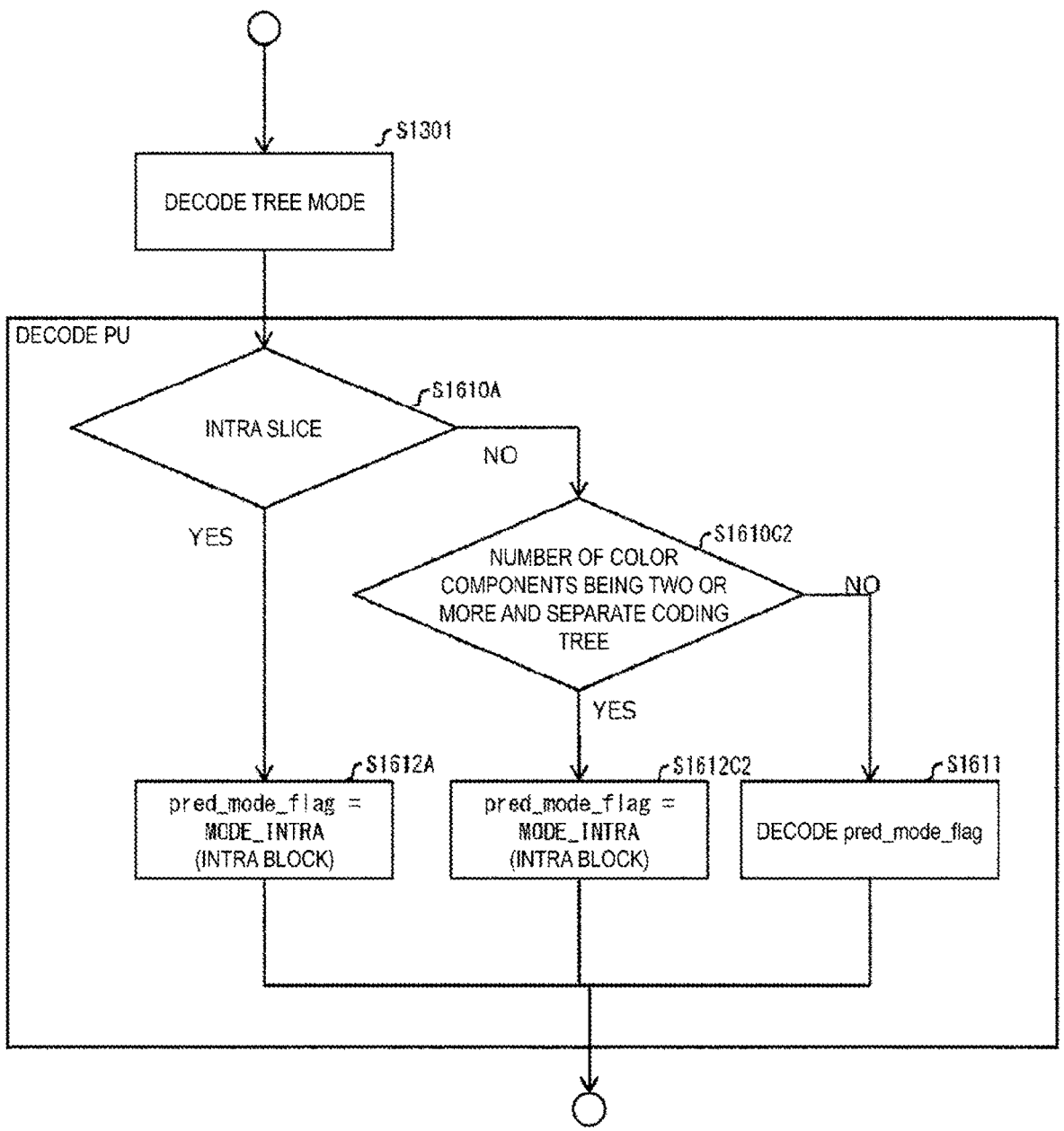
FIG. 40 is a flowchart illustrating operation of another configuration of the PU information decoding unit 12 according to an embodiment of the present invention.

FIG. 40 is a diagram illustrating operation of another configuration of the image decoding apparatus 31 according to an embodiment of the invention. FIG. 41(b) is a syntax table illustrating a configuration of coded data targeted by the image decoding apparatus 31 according to the present embodiment.

This configuration uses S1610C2 instead of Sl610C.

(S1612C2) In a case other than an intra slice (NO at S1610A), and in a case of the number of color components being two or more, and the separate coding tree (YES at S1610C2), the prediction mode pred_mode_flag is not decoded from the coded data, with the intra mode (MODE_INTRA) configured for the prediction mode pred_mode_flag.

In the syntax table, decoding of the skip mode is indicated at SYN1510A, SYN1510C2, and SYN1511.

The above-described configuration produces an effect that avoids a processing load such as motion vectors of luminance and chrominance being different even in a case that the number of color components is two or more.

Split Flag Limitation and Prediction Mode Limitation

A forced block split method in the separate coding and an intra mode limitation method in the separate coding tree have been described. However, these methods may be combined as follows.

The CU decoding unit 20 does not decode the split flag from the coded data but configures the split flag to 1 (a value indicating the split) in a case of an intra slice, the separate coding tree, and the target CT size being larger than a prescribed maximum intra size, and further the CU decoding unit 20 does not decode the prediction mode pred_mode_flag from the coded data but configures the inter mode (MODE_INTER) for the prediction mode pred_mode_flag in a case other than an intra slice and in a case of the separate coding tree.

In both a case of an intra slice and a case other than an intra slice, the intra block size in the separate coding tree is limited, and this produces an effect that reduces the time for which the chrominance processing waits during the luminance processing.

Another Example of Split Flag Limitation and Prediction Mode Limitation

Furthermore, in a case other than an intra slice and in a case of the separate coding tree, the CU decoding unit 20 does not decode the prediction mode pred_mode_flag from the coded data but configures the intra mode (MODE_INTRA) for the prediction mode pred_mode_flag. Furthermore, in a case that the block size is equal to the prescribed size (equal to or larger than the maximum intra size), the CU decoding unit 20 does not decode the prediction mode pred_mode_flag from the coded data but configures the inter mode (MODE_INTER) for the prediction mode pred_mode_flag.

In both a case of an intra slice and a case other than an intra slice, the intra block size in the separate coding tree is limited, and this produces an effect that reduces the time for which the chrominance processing waits during the luminance processing.

Palette Prediction

FIG. 42 according to the present embodiment is a block diagram illustrating a configuration of a palette predictor 31045 according to the present embodiment and a diagram illustrating operation of palette prediction. As illustrated in FIG. 42(*a*), the palette predictor 31045 includes a palette configuration unit 10451, a palette memory 10452, and a palette copy unit 10453. In palette coding, a table (palette) for colors of pixels in a coding target block is prepared, and a pixel or each pixel in a block is represented in table number (index). Indexes in the block and the table are coded. Furthermore, an index (Escape Mode) indicating each color outside the palette is also prepared in the palette, and signal values for pixel components belonging to the index are quantized and coded. Before starting the processing of the target block, in the image coding apparatus, the palette configuration unit 10451 configures the table (palette) of palette elements in a palette memory, and in the image decoding apparatus, decodes information regarding the palette elements from the coded data and configures the palette in the palette memory. Here, the palette element is a set of values (Yi, Cbi, Cri) including multiple color components (e.g., YCbCr and RGB). Here, i is a palette number. The palette copy unit 10453 copies table values (pixels) in the palette memory 10452 or the neighboring pixel on the left of the target pixel or the neighboring pixel above the target pixel are copied to generate a pixel row. The pixel column forms coded pixels or decoded pixels.

A right arrow and a down arrow in FIG. 42(*b*) represent copy processing of the palette copy unit. The palette copy unit 10453 codes or decodes pixels by copying an indicated number (number of times) of elements or neighboring pixels (reference pixels) in the palette. The right arrow represents copying of the left neighboring pixels in the direction of scan order, and the down arrow represents copying of the upper neighboring pixel in the direction of scan order.

FIG. 43 is an example of a syntax table of palette information to be decoded by the palette predictor 31045 of the present embodiment. copy_above_palette_indices_flag is a flag indicating whether copying is performed from above or not, and palette_run_prefix and palette_run_suffix are parameters indicating run lengths over which copying is to be performed. palette_escape_val is a pixel value for a certain quantized color component to be coded in the Escape Mode.

The palette predictor 31045 in the image coding apparatus is also identical to the palette predictor described above, but a syntax for the palette information is coded instead of being decoded from the coded data.

Shared Coding Tree Limitation in Palette Mode

In particular, for screen contents, a palette mode is used that simultaneously indicates multiple color components to apply a certain color to a wide range. Hereinafter, a configuration will be described that is related to the palette mode in the image decoding apparatus to which the separate coding tree and the shared coding tree can be applied.

Figure 44:
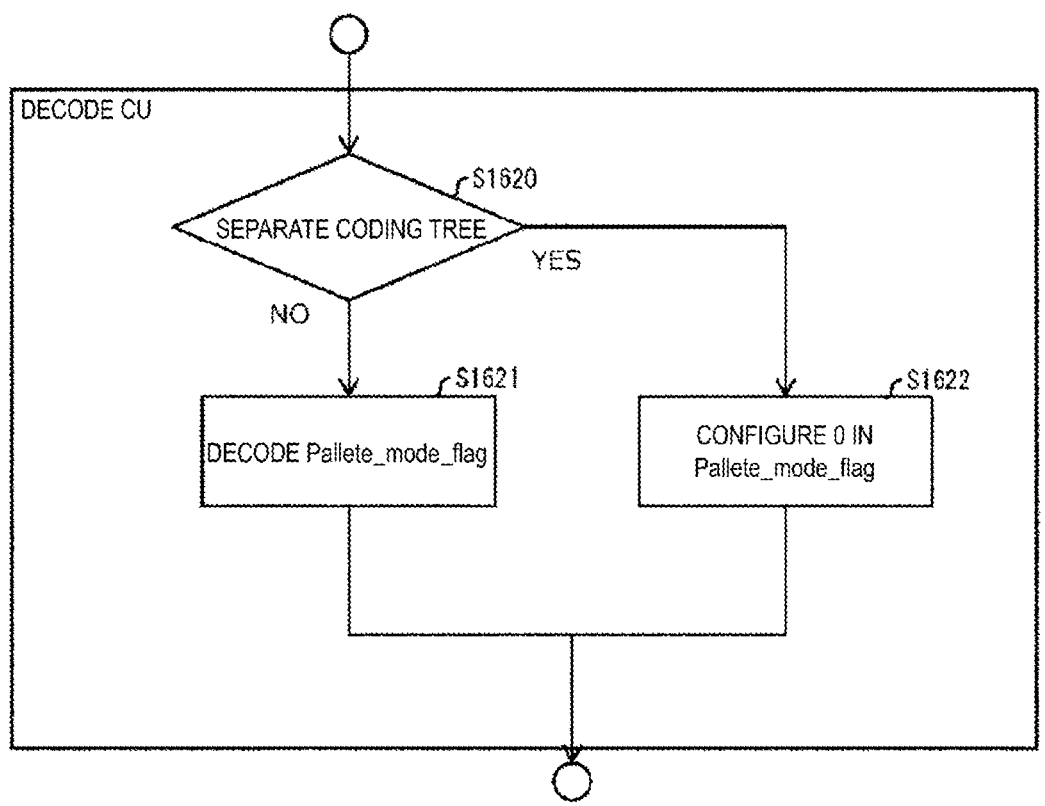
FIG. 44 is a flowchart illustrating operation of a configuration of the CU decoding unit 20 according to an embodiment of the present invention.

FIG. 44 is a diagram illustrating operation of a configuration of the image decoding apparatus 31 according to an embodiment of the present invention. FIG. 45 is a syntax table illustrating a configuration of coded data targeted by the image decoding apparatus 31 according to the present embodiment.

The image decoding apparatus that splits an image into rectangular coding tree units (CTUs) for processing includes the CT information decoding unit configured to split each of the CTUs into coding trees CTs and to process one CTU as the single coding tree using one coding tree CT (root coding tree node) or process one CTU as the separate coding tree using two or more coding trees CT (root coding tree nodes) depending on the coding tree mode, the CU decoding unit 20 configured to decode the split flag indicating whether to further split each of the CTs or not and recursively perform block splitting, and the CU decoding unit 20 configured to decode the prediction mode indicating the intra mode or the inter mode.

(S1620) The CU decoding unit 20 transitions to S1621 in a case of the intra mode (CuPredMode[x0][y0]==MODE_INTRA) and the tree mode being other than the separate coding tree (ctu_tree_mode !=CTU_SEPARATE), and otherwise transitions to S1622. As illustrated in SYN1620, the determination may be performed under additional conditions such as a palette mode availability flag palette_mode_enabled_flag=1 or the block size being equal to or smaller than the prescribed size (log 2CbSize<=MaxTbLog 2SizeY).

(S1621) The decoding unit 20 decodes the palette mode flag palette_mode_flag from the coded data. (SYN1621)

(S1622) In a case of not decoding the palette mode flag from the coding mode, the CU decoding unit 20 configures 0 (mode other than the palette mode) in the palette mode flag.

(S1623) In a case that palette_mode_flag is 1, then the processing transitions to S1624. (SYN1623)

(S1624) In a case that palette_mode_flag is 1, the palette information palettee_mode( ) regarding the target block is decoded. (SYN1624)

According to the above-described configuration, in the separate coding tree, the palette mode flag is not decoded, and the palette mode is turned off. Thus, the above-described configuration produces an effect that avoids inefficient processing that has a large amount of processing such as filling color independently for luminance and for chrominance. The overhead of code amount of the palette mode flag can be avoided.

Note that the image coding apparatus and the image decoding apparatus are the same in the flow of processing except for differences between the coding processing and the decoding processing. In the separate coding tree, the CU coder 1120 of the image coding apparatus does not code the palette mode flag palette_mode_flag and turns off the palette mode.

Cross Component Residual Prediction

Figure 46:
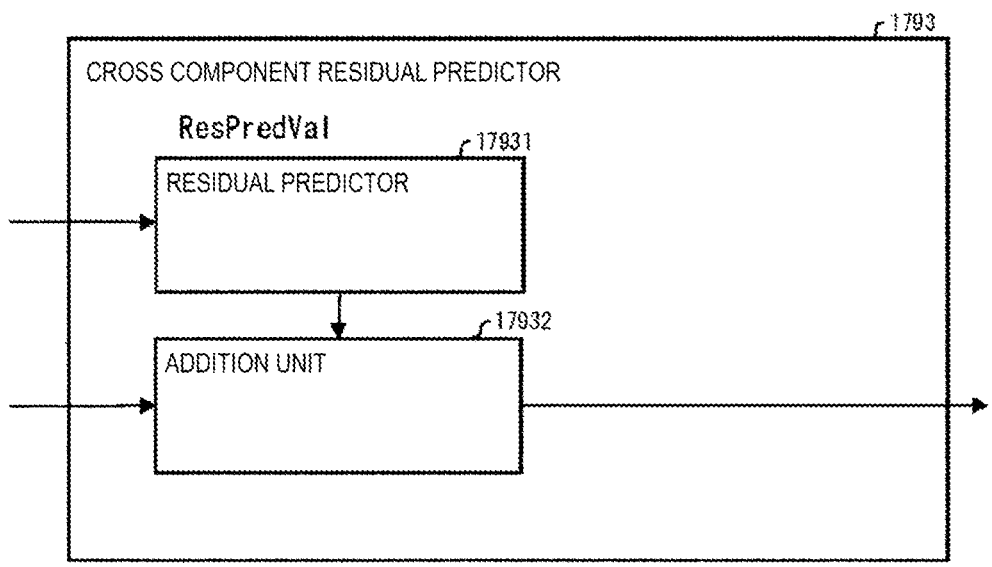
FIG. 46 is a diagram illustrating a configuration of a cross component residual predictor according to the present embodiment.

In particular, for screen contents, a cross component residual prediction is used for coding residual information regarding one color component as residual information regarding another color component. FIG. 46 is a block diagram illustrating a configuration of a cross component residual prediction. FIG. 47 is an example of a syntax table for the cross component residual prediction. The TU decoding unit 22 decodes log 2_res_scale_abs_plus1, indicating the absolute value of linear prediction, and a code res_scale_sign_flag to derive a residual prediction parameter ResScaleVal.

if (log 2_res_scale_abs_plus1==0)
ResScaleVal=0
else $$ResScaleVal = (1 << \log 2\_res\_scale\_abs\_plus1 - 1) * (1 - 2 * res\_scale\_sign\_flag)$$

Furthermore, a residual predictor 17931 of the cross component residual predictor 1793 illustrated in FIG. 46 uses the product of the derived residual prediction parameter ResScaleVal and a luminance residual difference rY[x][y] to derive the residual difference prediction value ResPred. Furthermore, an addition unit 17932 adds the residual difference prediction value ResPred to chrominance residual r[x][y]. Note that, as represented by the expression below, a shift such as a chrominance bit depth BitDepthC or a luminance bit depth BitDepthY may be applied before or after the product.

$$ResPred = (ResScaleVal * ((rY[x][y] << BitDepthC) BitDepthY) >> 3 r[x][y] += ResPred$$

The application of the residual prediction ResPred may be processed as follows.

$$r[x][y] = r[x][y] - ResPred$$

Note that, also in the image coding apparatus, the residual difference prediction ResPred is derived as described above and that the difference between the chrominance residual r[x][y] and the residual prediction value ResPred is derived as the chrominance residual r[x][y] by using the following expression, and the chrominance residual r[x][y] is coded.

$$r[x][y] -= ResPred$$

The application of a residual prediction ResPred may be the following processing.

$$r[x][y] = r[x][y] - ResPred$$

Shared Coding Tree Limitation for Cross Component Residual Prediction

Figure 48:
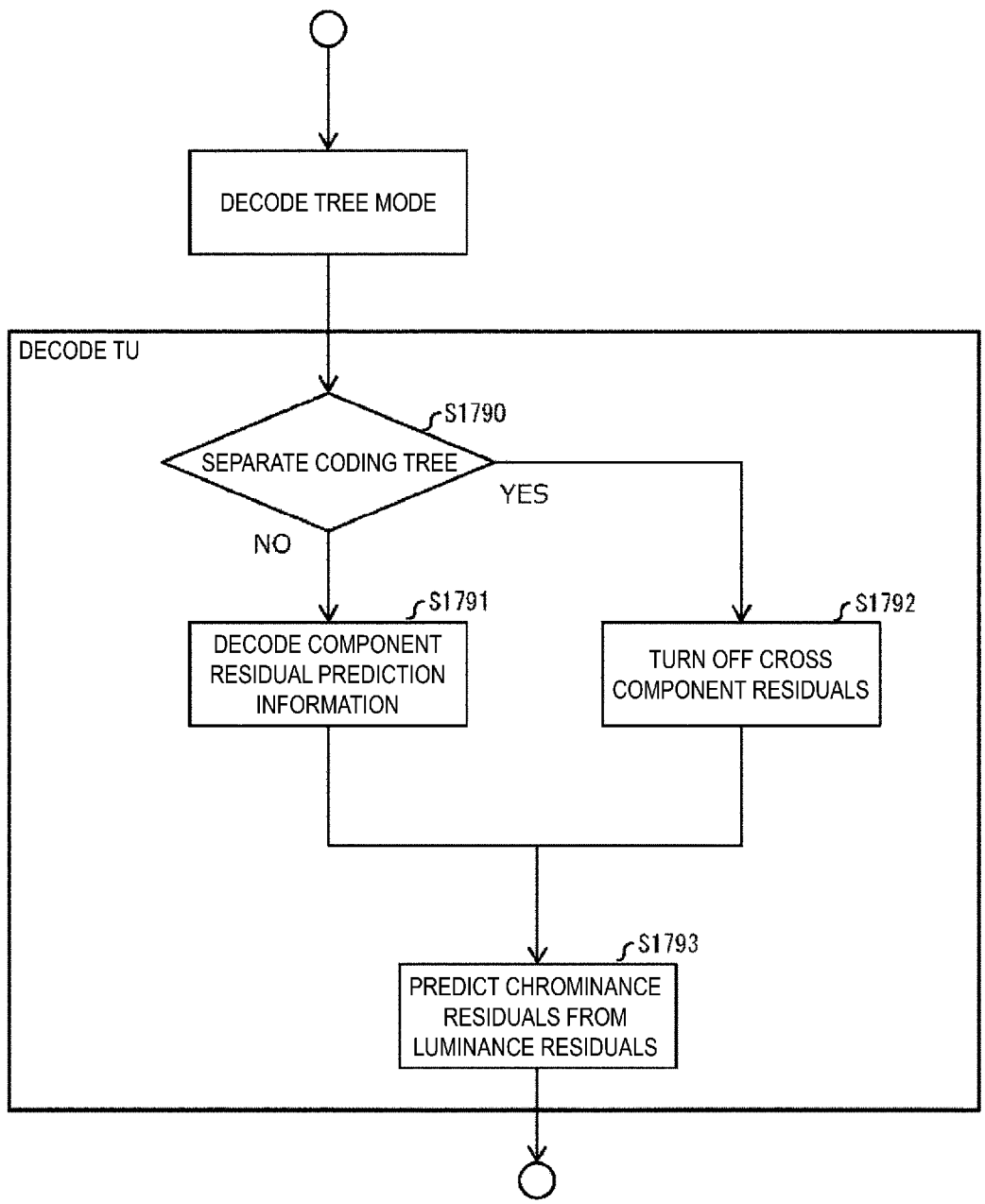
FIG. 48 is a flowchart illustrating operation of the TU decoding unit 22 according to an embodiment of the present invention.

By using FIG. 48, a configuration will be described that is related to a cross component residual prediction in the image decoding apparatus to which the separate coding tree and the shared coding tree can be applied.

(S1790) In a case of the intra mode, the TU decoding unit 22 transitions to S1791 in a case of a tree mode being other than the separate coding tree and otherwise transitions to S1792.

(S1791) In a case of the tree mode being other than the separate coding tree (NO at S1790), the TU decoding unit 22 decodes cross component residual prediction information cross_comp_pred( ) from the coded data.

(S1792) In a case of the separate coding tree (YES in S1790), the TU decoding unit 22 does not decode the syntax log 2_res_scale_abs_plus1, indicating the absolute value of the linear prediction, from the coded data, but configure the syntax log 2_res_scale_abs_plus1 to 0 (cross component residual prediction off).

(S1793) The cross component residual predictor 1793 uses the cross component residual prediction information to predict chrominance residuals from luminance residuals.

According to the configuration described above, in the separate coding tree, the cross component residual prediction information is not decoded, with the cross component residual prediction processing being turned off. Accordingly, in the separate coding tree, which is a tree that is independent of luminance and chrominance, the above-described configuration produces an effect that avoids the cross component residual prediction processing, which is inefficient and has a large amount of processing. Furthermore, the overhead of code amount of the cross component residual prediction information can be avoided.

Note that the image coding apparatus and the image decoding apparatus are the same in the flow of processing except for differences between the coding processing and the decoding processing. In the separate coding tree, the TU coder of the image coding apparatus does not code the cross component residual prediction information cross_comp_pred( ) but turns off the cross component residual prediction processing.

Note that as illustrated in FIG. 49, in the case of a separate coding tree, an intra mode is employed, and hence the flag cu_skip_flag indicating whether or not it is the skip mode is not decoded, and a value (0) indicating it is not the skip mode may be configured (SYN1511). Furthermore, in the case of a separate coding tree, an intra mode is employed, and hence the flag pred_mode_flag indicating either intra mode or inter mode is not decoded, and the intra mode (MODe_INTRA) may be configured (SYN1611).

Configuration of Image Coding Apparatus

Figure 2:
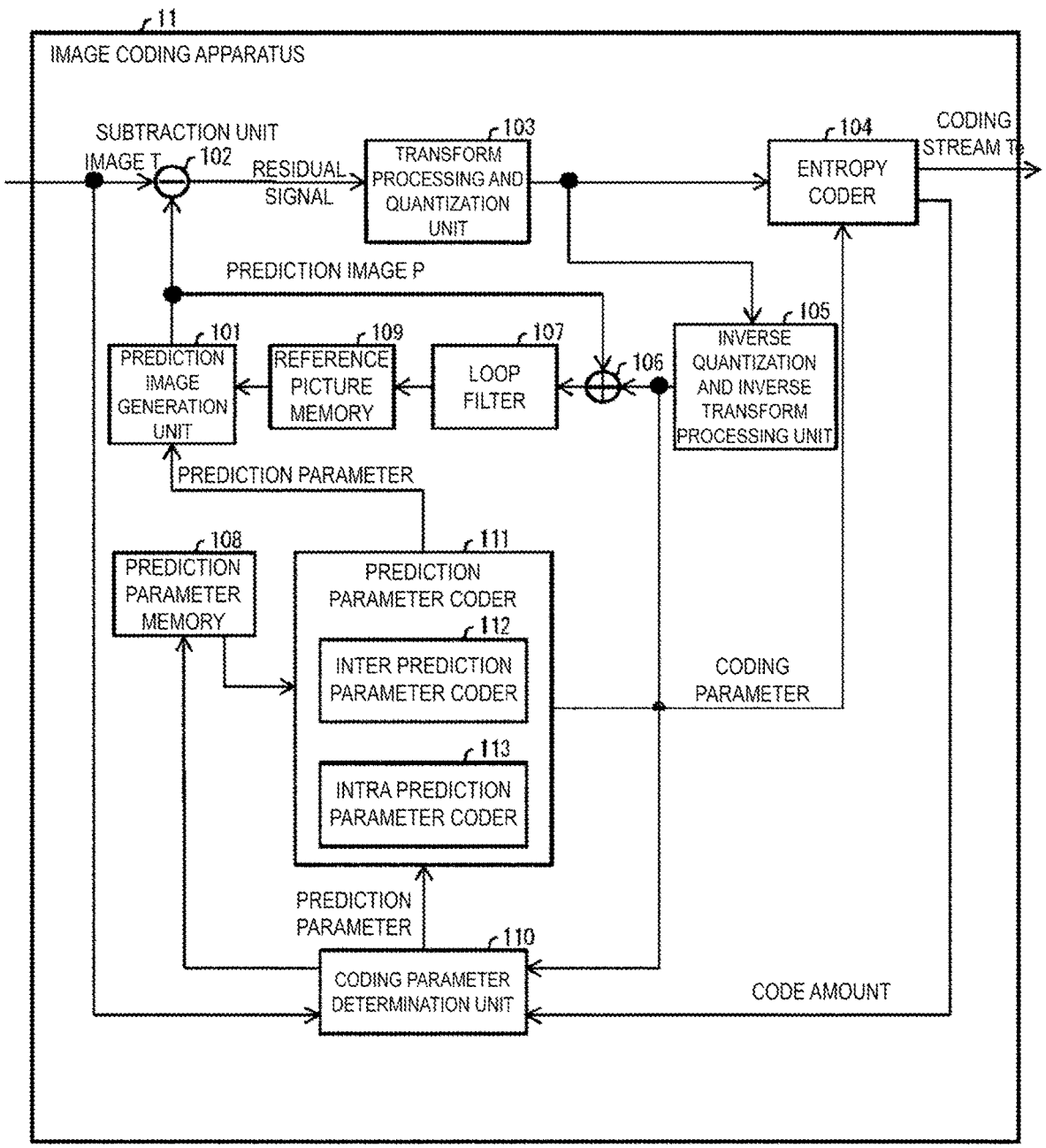
FIG. 2 is a block diagram illustrating a configuration of an image coding apparatus according to the present embodiment.

A configuration of the image coding apparatus 11 will now be described. A configuration of an image coding apparatus 11 will be described below as an example with reference to FIG. 2. FIG. 2 is a block diagram illustrating a configuration of the image coding apparatus 11 according to the present embodiment. The image coding apparatus 11 includes a prediction image generation unit 101, a subtraction unit 102, a transform processing and quantization unit 103, an entropy coder 104, an inverse quantization and inverse transform processing unit 105, an addition unit 106, a loop filter 107, a prediction parameter memory (a prediction parameter storage unit and a frame memory) 108, a reference picture memory (a reference image storage unit and a frame memory) 109, a coding parameter determination unit 110, and a prediction parameter coder 111 (a CU coder 1130, a prediction mode coder, and a CU coder 1120). The prediction parameter coder 111 includes an inter prediction parameter coder 112 and an intra prediction parameter coder 113. Note that the image coding apparatus 11 need not include the loop filter 107.

For each picture of an image T, the prediction image generation unit 101 generates a prediction image P of a prediction unit PU for each coding unit CU that is a region obtained by splitting the picture. Here, the prediction image generation unit 101 reads a block that has been decoded from the reference picture memory 109, based on a prediction parameter input from the prediction parameter coder 111. For example, in a case of an inter prediction, the prediction parameter input from the prediction parameter coder 111 is a motion vector. The prediction image generation unit 101 reads a block located at a position on a reference picture indicated by a motion vector starting from a target PU. In a case of an intra prediction, the prediction parameter is, for example, an intra prediction mode. The prediction image generation unit 101 reads a pixel value of an adjacent PU used in an intra prediction mode from the reference picture memory 109, and generates the prediction image P of a PU. The prediction image generation unit 101 generates the prediction image P of a PU by using one prediction scheme among multiple prediction schemes for the read reference picture block. The prediction image generation unit 101 outputs the generated prediction image P of a PU to the subtraction unit 102.

Note that the prediction image generation unit 101 is an operation same as the prediction image generation unit 308 already described.

The prediction image generation unit 101 generates the prediction image P of a PU, based on a pixel value of a reference block read from the reference picture memory, by using a parameter input by the prediction parameter coder. The prediction image generated by the prediction image generation unit 101 is output to the subtraction unit 102 and the addition unit 106.

The intra prediction image generation unit (not illustrated) included in the prediction image generation unit 101 performs the same operation as that of the intra prediction image generation unit 310 already described.

The subtraction unit 102 subtracts a signal value of a prediction image P of a PU input from the prediction image generation unit 101, from a pixel value of a corresponding PU position in an image T, and generates a residual signal. The subtraction unit 102 outputs the generated residual signal to the transform processing and quantization unit 103.

The transform processing and quantization unit 103 performs a frequency transform on a prediction residual signal input from the subtraction unit 102, and calculates a transform coefficient. The transform processing and quantization unit 103 quantizes the calculated transform coefficient to calculate a quantization transform coefficient. The transform processing and quantization unit 103 outputs the calculated quantization transform coefficient to the entropy coder 104 and the inverse quantization and inverse transform processing unit 105. The transform processing and quantization unit 103 may include a cross component residual predictor 1793 for further predicting residuals, and performing addition or subtraction on the residuals for coding.

To the entropy coder 104, quantization coefficients from the transform processing and quantization unit 103 are input, and prediction parameters from the prediction parameter coder 111 are input. For example, input prediction parameters include codes such as a reference picture index ref_Idx_iX, a prediction vector index mvp_IX_idx, a difference vector mvdLX, a prediction mode pred_mode_flag, and a merge index merge_idx.

The entropy coder 104 performs entropy coding on input split information, prediction parameters, quantization coefficients, and the like to generate a coding stream Te, and outputs the generated coding stream Te to the outside.

The inverse quantization and inverse transform processing unit 105 is the same as the inverse quantization and inverse transform processing unit 311 (FIG. 3) in the image decoding apparatus 31, and inversely quantizes a quantization transform coefficient input from the transform processing and quantization unit 103 to determine a transform coefficient. The inverse quantization and inverse transform processing unit 105 performs an inverse transform on the calculated transform coefficient to calculate a residual signal. The inverse quantization and inverse transform processing unit 105 outputs the calculated residual signal to the addition unit 106.

The addition unit 106 adds, for each pixel, the signal value for the prediction image P of the PU input from the prediction image generation unit 101 and the signal value for the residual signal input from the inverse quantization and inverse transform processing unit 105, and generates a decoded image. The addition unit 106 stores the generated decoded image in the reference picture memory 109.

The loop filter 107 applies a deblocking filter 114, a sample adaptive offset (SAO) 115, and an adaptive loop filter (ALF) 116 to the decoded image generated by the addition unit 106. Note that the loop filter 107 need not necessarily include the above-described three types of filters, and may exclusively include only the deblocking filter 114, for example.

The prediction parameter memory 108 stores the prediction parameters generated by the coding parameter determination unit 110 for each picture and CU of the coding target in a prescribed position.

The reference picture memory 109 stores as decoded image generated by the loop filter 107 for each picture and CU of the coding target in a prescribed position.

The coding parameter determination unit 110 selects one set among multiple sets of coding parameters. The coding parameter is the above-described QT or BT split parameter or prediction parameter or a parameter generated in association with the split or prediction parameter and intended for coding. The prediction image generation unit 101 generates the prediction image P of the PUs by using each of the sets of these coding parameters.

The coding parameter determination unit 110 calculates an RD cost value indicating the magnitude of an information quantity and a coding error for each of the multiple sets. For example, the RD cost value is the sum of a code amount and a value resulting from multiplication of a square error by a coefficient X. The code amount is an information quantity of the coding stream Te obtained by performing entropy coding on quantization residuals and a coding parameter. The square error is the sum of square values of residual values of residual signals of pixels calculated in the subtraction unit 102. The coefficient X is a real number that is larger than a pre-configured zero. The coding parameter determination unit 110 selects a set of coding parameters by which the calculated RD cost value is minimized. With this configuration, the entropy coder 104 outputs the selected set of coding parameters as the coding stream Te to the outside, and does not output sets of coding parameters that are not selected. The coding parameter determination unit 110 stores the determined coding parameters in the prediction parameter memory 108.

The prediction parameter coder 111 derives a format for coding from parameters input from the coding parameter determination unit 110, and outputs the format to the entropy coder 104. A derivation of a format for coding is, for example, to derive a difference vector from a motion vector and a prediction vector. The prediction parameter coder 111 derives parameters necessary to generate a prediction image from parameters input from the coding parameter determination unit 110, and outputs the parameters to the prediction image generation unit 101. For example, parameters necessary to generate a prediction image are a motion vector of a subblock unit.

The inter prediction parameter coder 112 derives inter prediction parameters such as a difference vector, based on prediction parameters input from the coding parameter determination unit 110. The inter prediction parameter coder 112 includes a partly identical configuration to a configuration by which the inter prediction parameter decoding unit 303 derives inter prediction parameters, as a configuration to derive parameters necessary for generation of a prediction image to be output to the prediction image generation unit 101.

The intra prediction parameter coder 113 includes a partly identical configuration to a configuration by which the intra prediction parameter decoding unit 304 derives intra prediction parameters, as a configuration to derive prediction parameters necessary for generation of a prediction image to be output to the prediction image generation unit 101.

The intra prediction parameter coder 113 derives a format for coding (for example, MPM_idx, rem_intra_luma_pred_mode, and the like) from the intra prediction mode IntraPredMode input from the coding parameter determination unit 110.

As already described in the image decoding apparatus 31 about the operation of an image coding apparatus, the image coding apparatus 11 includes the CU coder 1130 configured to split a CTU into coding trees CTs and to process one or more color components as the single coding tree using one coding tree CT (root coding tree node) or process two or more color components as the separate coding tree using two or more coding trees CT (root coding tree nodes) depending on the tree mode, the CU coder 1120 configured to code the split flag indicating whether to further split each of the CTs or not and recursively perform block splitting, and the intra predictor configured to use a local decoded image of one color component to generate a prediction image of another color component, and includes the prediction mode coder configured to code the prediction mode indicating the intra mode or the inter mode, the CU coder 1120 may configure 1 (a value indicating a split) in the split flag instead of coding the split flag in a case of an intra slice and the target CT size being larger than the prescribed maximum intra size.

Implementation Examples by Software

Note that, part of the image coding apparatus 11 and the image decoding apparatus 31 in the above-mentioned embodiments, for example, the entropy decoding unit 301, the prediction parameter decoding unit 302, the loop filter 305, the prediction image generation unit 308, the inverse quantization and inverse transform processing unit 311, the addition unit 312, the prediction image generation unit 101, the subtraction unit 102, the transform processing and quantization unit 103, the entropy coder 104, the inverse quantization and inverse transform processing unit 105, the loop filter 107, the coding parameter determination unit 110, and the prediction parameter coder 111, may be realized by a computer. In that case, this configuration may be realized by recording a program for realizing such control functions on a computer-readable recording medium and causing a computer system to read the program recorded on the recording medium for execution. Note that it is assumed that the "computer system" mentioned here refers to a computer system built into either the image coding apparatus 11 or the image decoding apparatus 31, and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system. Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Part or all of the image coding apparatus 11 and the image decoding apparatus 31 in the embodiments described above may be realized as an integrated circuit such as a Large Scale Integration (LSI). Each function block of the image coding apparatus 11 and the image decoding apparatus 31 may be individually realized as processors, or part or all may be integrated into processors. The circuit integration technique is not limited to LSI, and the integrated circuits for the functional blocks may be realized as dedicated circuits or a multi-purpose processor. In a case that with advances in semiconductor technology, a circuit integration technology with which an LSI is replaced appears, an integrated circuit based on the technology may be used.

The embodiment of the present invention has been described in detail above referring to the drawings, but the specific configuration is not limited to the above embodiments, and various amendments can be made to a design that fall within the scope that does not depart from the gist of the present invention.

Application Examples

The above-mentioned image coding apparatus 11 and the image decoding apparatus 31 can be utilized being installed to various apparatuses performing transmission, reception, recording, and regeneration of videos. Note that, videos may be natural videos imaged by cameras or the like, or may be artificial videos (including CG and GUI) generated by computers or the like.

First, as described below with reference to FIG. 19, the above-mentioned image coding apparatus 11 and image decoding apparatus 31 can be utilized for transmission and reception of videos.

Figure 19:
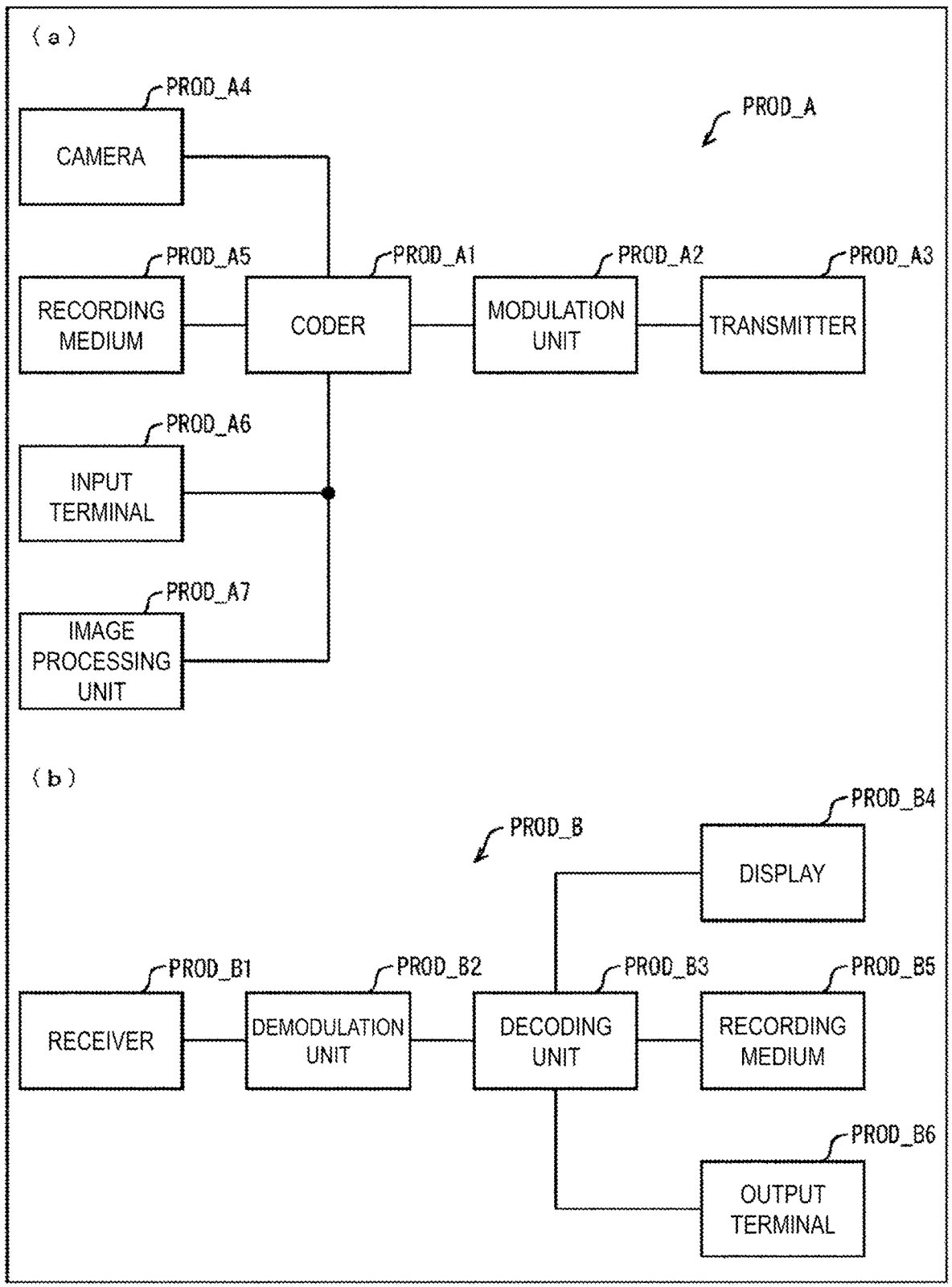
FIG. 19 is a diagram illustrating configurations of a transmitting apparatus equipped with the image coding apparatus and a receiving apparatus equipped with the image decoding apparatus, according to the present embodiment. (a) illustrates the transmitting apparatus equipped with the image coding apparatus, and (b) illustrates the receiving apparatus equipped with the image decoding apparatus.

(a) of FIG. 19 is a block diagram illustrating a configuration of a transmitting apparatus PROD_A installed with the image coding apparatus 11. As illustrated in (a) of FIG. 19, the transmitting apparatus PROD_A includes an coder PROD_A1 which obtains coded data by coding videos, a modulation unit PROD_A2 which obtains modulating signals by modulating carrier waves with the coded data obtained by the coder PROD_A1, and a transmitter PROD_A3 which transmits the modulating signals obtained by the modulation unit PROD_A2. The above-mentioned image coding apparatus 11 is utilized as the coder PROD_A1.

The transmitting apparatus PROD_A may further include a camera PROD_A4 imaging videos, a recording medium PROD_A5 recording videos, an input terminal PROD_A6 to input videos from the outside, and an image processing unit PRED_A7 generating or processing images, as sources of supply of the videos input into the coder PROD_A1. In (a) of FIG. 19, although the configuration that the transmitting apparatus PROD_A includes these all is exemplified, a part may be omitted.

Note that the recording medium PROD_A5 may record videos which are not coded, or may record videos coded in a coding scheme for recording different from a coding scheme for transmission. In the latter case, a decoding unit (not illustrated) to decode coded data read from the recording medium PROD_A5 according to coding scheme for recording may be interleaved between the recording medium PROD_A5 and the coder PROD_A1.

(b) of FIG. 19 is a block diagram illustrating a configuration of a receiving apparatus PROD_B installed with the image decoding apparatus 31. As illustrated in (b) of FIG. 19, the receiving apparatus PROD_B includes a receiver PROD_B1 which receives modulating signals, a demodulation unit PROD_B2 which obtains coded data by demodulating the modulating signals received by the receiver PROD_B1, and a decoding unit PROD_B3 which obtains videos by decoding the coded data obtained by the demodulation unit PROD_B2. The above-mentioned image decoding apparatus 31 is utilized as the decoding unit PROD_B3.

The receiving apparatus PROD_B may further include a display PROD_B4 displaying videos, a recording medium PROD_B5 to record the videos, and an output terminal PROD_B6 to output videos outside, as supply destination of the videos output by the decoding unit PROD_B3. In (b) of FIG. 19, although the configuration in which the receiving apparatus PROD_B includes these all is exemplified, a part may be omitted.

Note that the recording medium PROD_B5 may record videos which are not coded, or may record videos which are coded in a coding scheme for recording different from a coding scheme for transmission. In the latter case, an coder (not illustrated) to code videos acquired from the decoding unit PROD_B3 according to a coding scheme for recording may be interleaved between the decoding unit PROD_B3 and the recording medium PROD_B5.

Note that the transmission medium transmitting modulating signals may be wireless or may be wired. The transmission aspect to transmit modulating signals may be broadcasting (here, referred to as the transmission aspect where the transmission target is not specified beforehand) or may be telecommunication (here, referred to as the transmission aspect that the transmission target is specified beforehand). Thus, the transmission of the modulating signals may be realized by any of radio broadcasting, cable broadcasting, radio communication, and cable communication.

For example, broadcasting stations (broadcasting equipment, and the like)/receiving stations (television receivers, and the like) of digital terrestrial television broadcasting is an example of transmitting apparatus PROD_A/receiving apparatus PROD_B transmitting and/or receiving modulating signals in radio broadcasting. Broadcasting stations (broadcasting equipment, and the like)/receiving stations (television receivers, and the like) of cable television broadcasting are an example of transmitting apparatus PROD_A/receiving apparatus PROD_B transmitting and/or receiving modulating signals in cable broadcasting.

Servers (work stations, and the like)/clients (television receivers, personal computers, smartphones, and the like) for Video On Demand (VOD) services, video hosting services using the Internet and the like are an example of transmitting apparatus PROD_A/receiving apparatus PROD_B transmitting and/or receiving modulating signals in telecommunication (usually, any of radio or cable is used as transmission medium in the LAN, and cable is used for as transmission medium in the WAN). Here, personal computers include a desktop PC, a laptop type PC, and a graphics tablet type PC. Smartphones also include a multi-functional portable telephone terminal.

Note that a client of a video hosting service has a function to code a video imaged with a camera and upload the video to a server, in addition to a function to decode coded data downloaded from a server and to display on a display. Thus, a client of a video hosting service functions as both the transmitting apparatus PROD_A and the receiving apparatus PROD_B.

Next, as described below with reference to FIG. 20, the above-mentioned image coding apparatus 11 and image decoding apparatus 31 can be utilized for recording and regeneration of videos.

Figure 20:
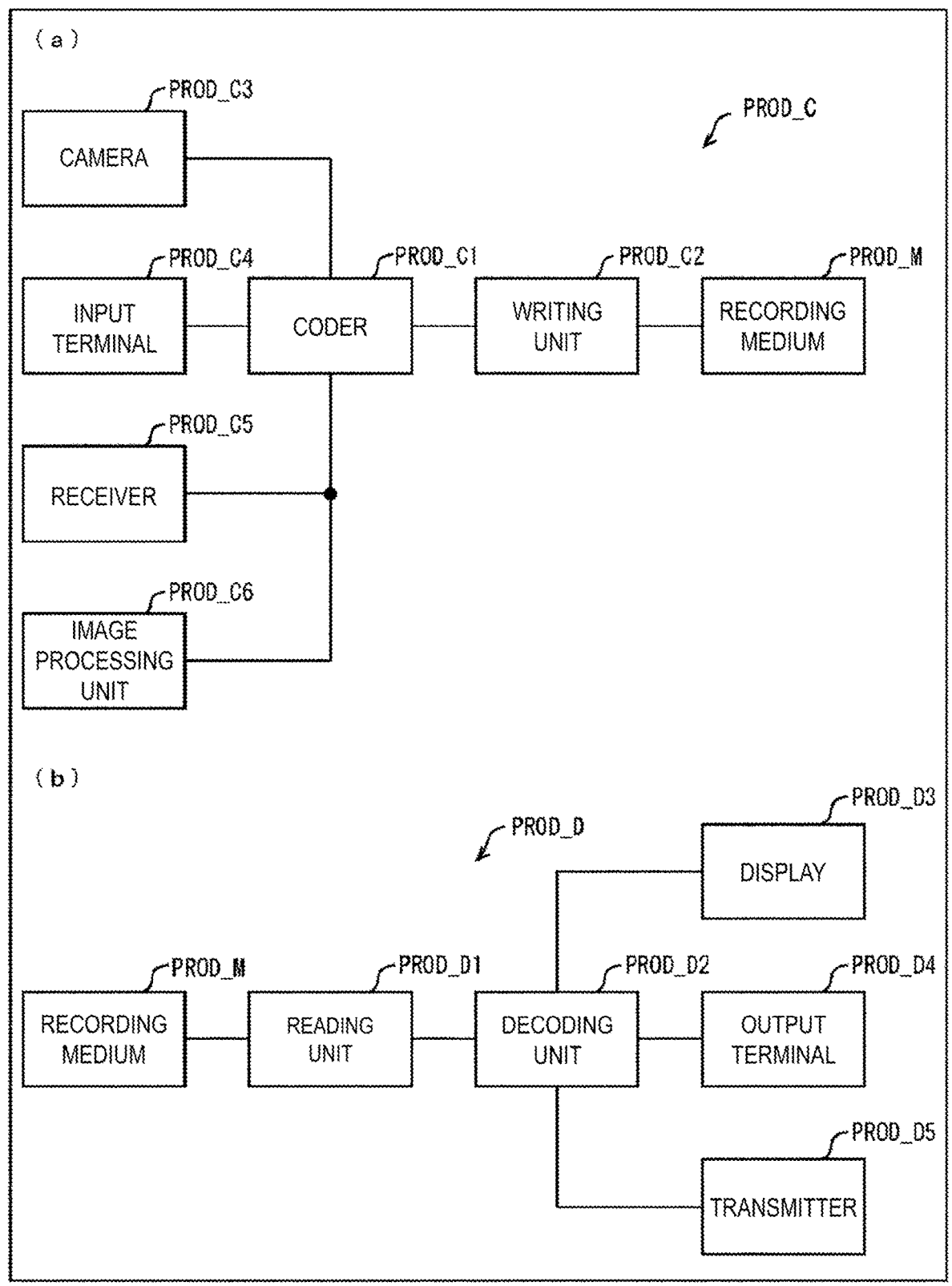
FIG. 20 is a diagram illustrating configurations of a recording apparatus equipped with the image coding apparatus and a regeneration apparatus equipped with the image decoding apparatus, according to the present embodiment. (a) illustrates the recording apparatus equipped with the image coding apparatus, and (b) illustrates the regeneration apparatus equipped with the image decoding apparatus.

(a) of FIG. 20 is a block diagram illustrating a configuration of a recording apparatus PROD_C installed with the above-mentioned image coding apparatus 11. As illustrated in (a) of FIG. 20, the recording apparatus PROD_C includes an coder PROD_C1 which obtains coded data by coding a video, and a writing unit PROD_C2 which writes the coded data obtained by the coder PROD_C1 in a recording medium PROD_M. The above-mentioned image coding apparatus 11 is utilized as the coder PROD_C1.

Note that the recording medium PROD_M may be (1) a type built in the recording apparatus PROD_C such as Hard Disk Drive (HDD) or Solid State Drive (SSD), may be (2) a type connected to the recording apparatus PROD_C such as an SD memory card or a Universal Serial Bus (USB) flash memory, and may be (3) a type loaded in a drive apparatus (not illustrated) built in the recording apparatus PROD_C such as Digital Versatile Disc (DVD) or Blu-ray Disc (BD: trade name).

The recording apparatus PROD_C may further include a camera PROD_C3 imaging a video, an input terminal PROD_C4 to input the video from the outside, a receiver PROD_C5 to receive the video, and an image processing unit PROD_C6 which generates or processes images, as sources of supply of the video input into the coder PROD_C1. In (a) of FIG. 20, although the configuration in which the recording apparatus PROD_C includes these all is exemplified, a part may be omitted.

Note that the receiver PROD_C5 may receive a video which is not coded, or may receive coded data coded in a coding scheme for transmission different from a coding scheme for recording. In the latter case, a decoding unit (not illustrated) for transmission to decode coded data coded in a coding scheme for transmission may be interleaved between the receiver PROD_C5 and the coder PROD_C1.

Examples of such recording apparatus PROD_C include a DVD recorder, a BD recorder, a Hard Disk Drive (HDD) recorder, and the like (in this case, the input terminal PROD_C4 or the receiver PROD_C5 is the main source of supply of a video). A camcorder (in this case, the camera PROD_C3 is the main source of supply of a video), a personal computer (in this case, the receiver PROD_C5 or the image processing unit C6 is the main source of supply of a video), a smartphone (in this case, the camera PROD_C3 or the receiver PROD_C5 is the main source of supply of a video), or the like is an example of such recording apparatus PROD_C.

(b) of FIG. 20 is a block diagram illustrating a configuration of a regeneration apparatus PROD_D installed with the above-mentioned image decoding apparatus 31. As illustrated in (b) of FIG. 20, the regeneration apparatus PROD_D includes a reading unit PROD_D1 which reads coded data written in the recording medium PROD_M, and a decoding unit PROD_D2 which obtains a video by decoding the coded data read by the reading unit PROD_D1. The above-mentioned image decoding apparatus 31 is utilized as the decoding unit PROD_D2.

Note that the recording medium PROD_M may be (1) a type built in the regeneration apparatus PROD_D such as HDD or SSD, may be (2) a type connected to the regeneration apparatus PROD_D such as an SD memory card or a USB flash memory, and may be (3) a type loaded in a drive apparatus (not illustrated) built in the regeneration apparatus PROD_D such as DVD or BD.

The regeneration apparatus PROD_D may further include a display PROD_D3 displaying a video, an output terminal PROD_D4 to output the video to the outside, and a transmitter PROD_D5 which transmits the video, as the supply destination of the video output by the decoding unit PROD_D2. In (b) of FIG. 20, although the configuration in which the regeneration apparatus PROD_D includes these all is exemplified, a part may be omitted.

Note that the transmitter PROD_D5 may transmit a video which is not coded, or may transmit coded data coded in a coding scheme for transmission different than a coding scheme for recording. In the latter case, an coder (not illustrated) to code a video in a coding scheme for transmission may be interleaved between the decoding unit PROD_D2 and the transmitter PROD_D5.

Examples of such regeneration apparatus PROD_D include a DVD player, a BD player, an HDD player, and the like (in this case, the output terminal PROD_D4 to which a television receiver, and the like is connected is the main supply target of the video). A television receiver (in this case, the display PROD_D3 is the main supply target of the video), a digital signage (also referred to as an electronic signboard or an electronic bulletin board, and the like, the display PROD_D3 or the transmitter PROD_D5 is the main supply target of the video), a desktop PC (in this case, the output terminal PROD_D4 or the transmitter PROD_D5 is the main supply target of the video), a laptop type or graphics tablet type PC (in this case, the display PROD_D3 or the transmitter PROD_D5 is the main supply target of the video), a smartphone (in this case, the display PROD_D3 or the transmitter PROD_D5 is the main supply target of the video), or the like is an example of such regeneration apparatus PROD_D.

Realization as Hardware and Realization as Software
Each block of the above-mentioned image decoding apparatus 31 and image coding apparatus 11 may be realized as a hardware by a logical circuit formed on an integrated circuit (IC chip), or may be realized as a software using a Central Processing Unit (CPU).

In the latter case, each apparatus includes a CPU performing a command of a program to implement each function, a Read Only Memory (ROM) having stored thereon the program, a Random Access Memory (RAM) developing the program, and a storage apparatus (recording medium) such as a memory storing the program and various data, and the like. The purpose of the embodiments of the present invention can be achieved by supplying, to each of the apparatuses, the recording medium recording readably the program code (execution form program, intermediate code program, source program) of the control program of each of the apparatuses which is a software implementing the above-mentioned functions with a computer, and reading and performing the program code that the computer (or a CPU or a MPU) records in the recording medium.

For example, as the recording medium, a tape such as a magnetic tape or a cassette tape, a disc including a magnetic disc such as a floppy (trade name) disk/a hard disk and an optical disc such as a Compact Disc Read-Only Memory (CD-ROM)/Magneto-Optical disc (MO disc)/Mini Disc (MD)/Digital Versatile Disc (DVD)/CD Recordable (CD-R)/Blu-ray Disc (trade name), a card such as an IC card (including a memory card)/an optical card, a semiconductor memory such as a mask ROM/Erasable Programmable Read-Only Memory (EPROM)/Electrically Erasable and Programmable Read-Only Memory (EEPROM: trade name)/a flash ROM, or a Logical circuits such as a Programmable logic device (PLD) or a Field Programmable Gate Array (FPGA) can be used.

Each of the apparatuses is configured connectably with a communication network, and the program code may be supplied through the communication network. This communication network may be able to transmit a program code, and is not specifically limited. For example, the Internet, the intranet, the extranet, Local Area Network (LAN), Integrated Services Digital Network (ISDN), Value-Added Network (VAN), a Community Antenna television/Cable Television (CATV) communication network, Virtual Private Network, telephone network, a mobile communication network, satellite communication network, and the like are available. A transmission medium constituting this communication network may also be a medium which can transmit a program code, and is not limited to a particular configuration or a type. For example, a cable communication such as Institute of Electrical and Electronic Engineers (IEEE) 1394, a USB, a power line carrier, a cable TV line, a phone line, an Asymmetric Digital Subscriber Line (ADSL) line, and a radio communication such as infrared ray such as Infrared Data Association (IrDA) or a remote control, BlueTooth (trade name), IEEE 802.11 radio communication, High Data Rate (HDR), Near Field Communication (NFC), Digital Living Network Alliance (DLNA: trade name), a cellular telephone network, a satellite channel, and a terrestrial digital broadcast network are available. Note that the embodiments of the present invention can be also realized in the form of computer data signals embedded in a carrier wave where the program code is embodied by electronic transmission.

The embodiments of the present invention are not limited to the above-mentioned embodiments, and various modifications are possible within the scope of the claims. Thus, embodiments obtained by combining technical means modified appropriately within the scope defined by claims are included in the technical scope of the present invention.

INDUSTRIAL APPLICABILITY

The embodiments of the present invention can be preferably applied to an image decoding apparatus to decode coded data where graphics data is coded, and an image coding apparatus to generate coded data where graphics data is coded. The embodiments of the present invention can be preferably applied to a data structure of coded data generated by the image coding apparatus and referred to by the image decoding apparatus.

CROSS-REFERENCE OF RELATED APPLICATION

This application is a continuation of U.S. patent application Ser. No. 17/472,398, filed Sep. 10, 2021, which is a continuation of U.S. patent application Ser. No. 16/753,736, filed Apr. 3, 2020, which claims the benefit of priority from the corresponding Japanese Patent Application No. 16/753736, filed on Oct. 6, 2017, the entire contents of which are incorporated herein by reference.

REFERENCE SIGNS LIST

9 Decoding module
10 CT information decoding unit
11 Image coding apparatus
13 TT information decoding unit
19 Header decoding unit
20 CU decoding unit (prediction mode decoding unit)
31 Image decoding apparatus
302 Prediction parameter decoding unit (CT information decoding unit and prediction
mode decoding unit)
303 Inter prediction parameter decoding unit
304 Intra prediction parameter decoding unit
305 Loop filter
306 Reference picture memory
307 Prediction parameter memory
308 Prediction image generation unit
309 Inter prediction image generation unit
310 Inter prediction image generation unit (intra predictor)
313 Deblocking filter
315 Adaptive loop filter
31041 Planar predictor
31042 DC predictor
31043 Angular predictor
31044 CCLM predictor
4401 CCLM parameter derivation unit
4402 CCLM prediction filter unit
31045 Palette predictor
311 Inverse quantization and inverse transform processing unit
11 Image coding apparatus
101 Prediction image generation unit
102 Subtracting unit
103 Transform processing and quantization unit
104 Entropy coder
105 Inverse quantization and inverse transform processing unit
106 Addition unit
107 Loop filter
108 Prediction parameter memory (prediction parameter storage unit and frame memory)
109 Reference picture memory (reference image storage unit and frame memory)
110 Coding parameter determination unit
111 Prediction parameter coder (CT information coder, prediction mode coder, and CU
coder)
112 Inter prediction parameter coder
113 Intra prediction parameter coder
1120 CU coder
1793 Component residual predictor
17931 Residual predictor
17932 Addition unit

The invention claimed is:

1. An image decoding apparatus for decoding an image having coding tree units (CTUs) that are rectangular for processing, the image decoding apparatus comprising:
a decoding circuit configured to decode a tree mode parameter indicating whether a coding tree unit (CTU) is split by a single coding tree using one coding tree or is split by a separate coding tree using two or more coding trees; and
a splitting circuit configured to split a coding tree (CT) having a CT size in a case that a slice type is an intra slice, a value of the tree mode parameter indicates to use the separate coding tree, and the CT size is greater than a prescribed maximum size,
wherein the decoding circuit sets a color component parameter indicating a target color component used in a certain coding tree,
if the separate coding tree is used in the CTU, the color component parameter for a first coding tree is set equal to a parameter indicating a luminance and the color component parameter for a second coding tree is set equal to a parameter indicating chrominances Cb and Cr,
if the single coding tree is used in the CTU, the color component parameter is set equal to a parameter indicating the luminance, and the chrominances Cb and Cr.

* * * * *